(12) United States Patent
Sakai et al.

(10) Patent No.: US 7,229,198 B2
(45) Date of Patent: Jun. 12, 2007

(54) PLANAR LIGHT SOURCE DEVICE AND DISPLAY DEVICE USING THE SAME

(75) Inventors: Seiji Sakai, Tokyo (JP); Akihiro Mori, Kumamoto (JP); Takashi Yamaguchi, Tokyo (JP); Toshiyuki Yoneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/560,529

(22) PCT Filed: Jun. 14, 2004

(86) PCT No.: PCT/JP2004/008328

§ 371 (c)(1),
(2), (4) Date: Dec. 13, 2005

(87) PCT Pub. No.: WO2004/111532

PCT Pub. Date: Dec. 23, 2004

(65) Prior Publication Data

US 2006/0181901 A1 Aug. 17, 2006

(30) Foreign Application Priority Data

Jun. 16, 2003 (JP) .............................. 2003-170443
Oct. 10, 2003 (JP) .............................. 2003-352590

(51) Int. Cl.
*F21V 33/00* (2006.01)

(52) U.S. Cl. ..................... 362/560; 362/561; 362/555; 362/249; 362/225

(58) Field of Classification Search ................ 362/555, 362/560, 561, 608, 609, 610, 612, 613, 632, 362/249, 225, 224, 31
See application file for complete search history.

(56) References Cited

U.S. PATENT DOCUMENTS 5,453,855 A * 9/1995 Nakamura et al. ............ 349/58

(Continued)

FOREIGN PATENT DOCUMENTS

JP 2-32320 2/1990

(Continued)

*Primary Examiner*—Laura K. Tso
(74) *Attorney, Agent, or Firm*—Oblon, Spivak, McClelland, Maier & Neustadt, P.C.

(57) ABSTRACT

To obtain a planar light source which is free from brightness variations or chromaticity variations by using a point light source having a high directivity for emitted light, and to provide a liquid crystal display device capable of obtaining superior display characteristics by using this planar light source device. A planar light source device having an opening in the upper surface comprises a hollow box, a diffusion plate disposed in the opening, a reflecting plate disposed on the bottom of the hollow region of the box, and a plurality of point light sources disposed in a row along at least one side surface of the box. This planar light sources device is characterized by including a refracting element disposed parallel to the row of point light sources and between the point light sources and the hollow region for refracting the light from the point light sources, whereby the light at an incident angle at which the brightness is greatest in the luminous intensity distribution of the light radiated to the irradiation subject surface of the refracting element is refracted to the bottom surface of the box by the refracting element.

12 Claims, 53 Drawing Sheets

U.S. PATENT DOCUMENTS 6,024,462 A * 2/2000 Whitehead ................. 362/618
6,893,135 B2 * 5/2005 Wright et al. ............... 362/632

FOREIGN PATENT DOCUMENTS

| JP | 15006/1994 | 2/1994 |
| JP | 7-72815 | 3/1995 |
| JP | 8-184829 | 7/1996 |
| JP | 2001-126523 | 5/2001 |
| JP | 2002-289023 | 10/2002 |
| JP | 2002-319308 | 10/2002 |
| JP | 2003-132722 | 5/2003 |
| JP | 2003-157711 | 5/2003 |

* cited by examiner

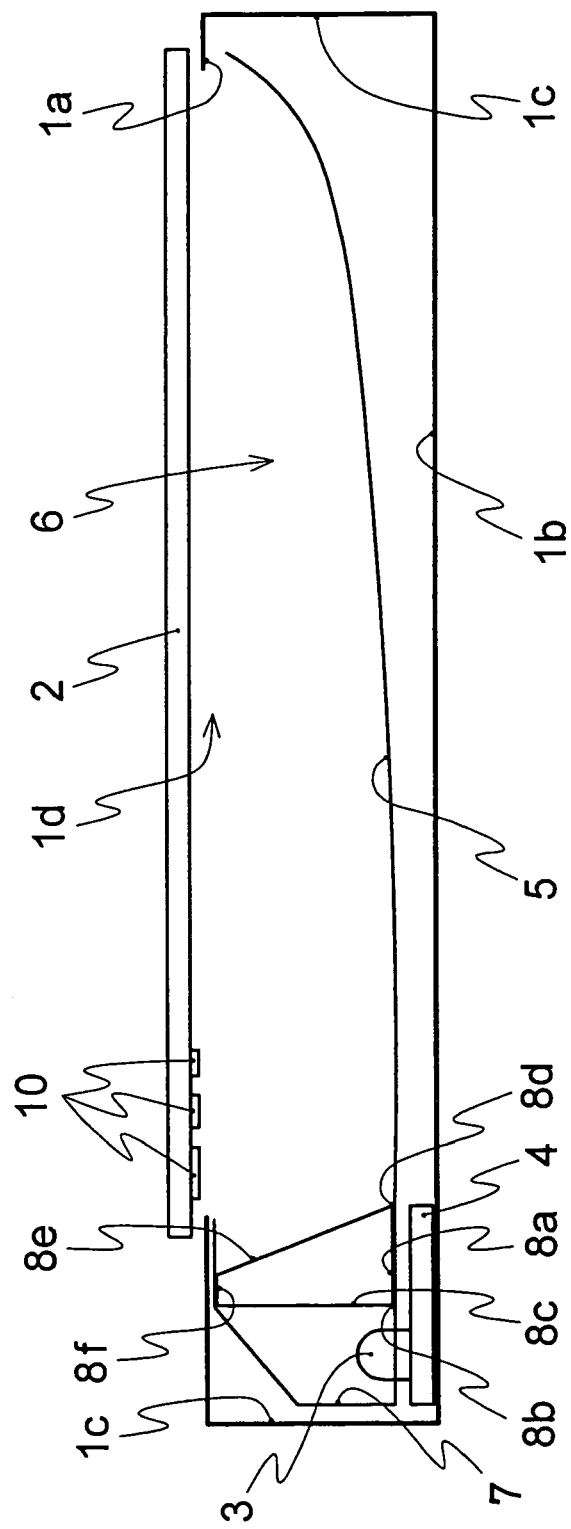

28c  28  28e 28c  28  28e

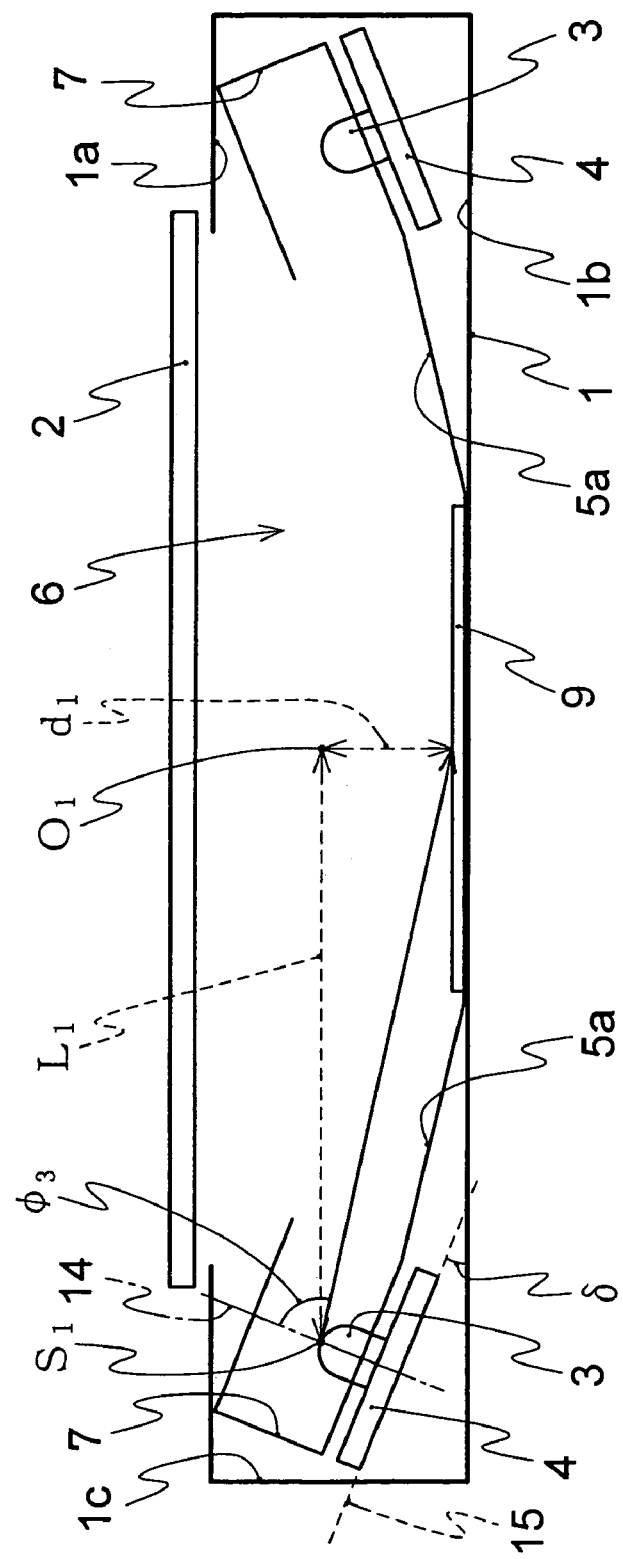

PLANAR LIGHT SOURCE DEVICE AND DISPLAY DEVICE USING THE SAME

TECHNICAL FIELD

The present invention relates to a hollow type planar light source device which does not employ light guiding plate. More specifically, the present invention relates to a planar light source device using a plurality of point light sources such as light emitting diodes which emit monochromatic lights such as R (red), G (green) and B (blue), and a display device using the device.

BACKGROUND ART

In a conventional planar light source device, the portion of light radiated from a cold-cathode tube and light which is radiated from the cold-cathode tube and reflected on the cylindrical surface of a light source cover becomes parallel light with a focus lens and radiated on the reflection plane of a reflecting plate, and the reflected light is scattered from a scattering plate to be radiated (for example, refer to Japanese Unexamined Patent Publication No. 54625/1996 (page 3, line 18 of the left column to line 45 of the right column, FIG. 2)).

Further, other conventional planar light source device is composed of a light distribution means, light emitting diodes, a reflection means which is provided so as to face the light distribution means, a hollow space which is formed between the light distribution means and the reflection means, and a reflector (for example, refer to Japanese Unexamined Patent Publication No. 258764/2002 (page 4, line 3 of the left column to page 5, line 43 of the left column, FIG. 1)).

Since cold-cathode tubes having low directivity as a light source are used in a conventional planar light source device, there has been a problem that the quality of display is lowered, since focusing property at a condenser lens is low, luminance nearby the light source comes to be higher in comparison with luminance at a position far from the light source, the unevenness of luminance and the unevenness of chromaticity are generated in display.

Further, when light emitting diodes having high directivity are used as a light source, there has been a problem that the quality of display is lowered, since the unevenness of luminance and the unevenness of chromaticity are generated in display in accordance with the light distribution of point light sources.

The present invention is achieved in order to solve the problems, and it is the purpose of the invention is to provide a planar light source device which does not generate the unevenness of luminance and the unevenness of chromaticity in case of using point light sources having the high directivity of radiating light, and a liquid crystal display device capable of obtaining superior display property by using the planar light source device.

DISCLOSURE OF INVENTION

An aspect of the present invention is a planar light source device including a housing having an opening portion on a top face and having a hollow space, a scattering plate provided at the opening portion, a reflecting plate provided at the bottom portion of the hollow space of the housing, a plurality of point light sources arranged in series along at least one side of the housing, and a refractive element, arranged in parallel with the plurality of point light sources and between the plurality of point light sources and the hollow space, that refracts irradiating light from the plurality of point light sources, and the refractive element refracts light with an incident angle at which luminance is the maximum among light distribution of irradiating light against an irradiated planes of the refractive element, to a bottom face side of the housing.

BRIEF DESCRIPTION OF THE DRAWINGS

FIG. 16 is a partial section view of other planar light source device related to Embodiment 1 in which the substrate of point light sources is provided only at one side of the housing;

FIG. 21(a) is a luminance distribution chart in the partial section view of the II—II line of the planar light source device shown in FIG. 1 when the refractive element is not provided, FIG. 21(b) is a luminance distribution chart in the partial section view of the II—II line of the planar light source device shown in FIG. 1 when the refractive element having a shape shown in FIG. 2 is provided, and FIG. 21(c) is a luminance distribution chart in the partial section view of the II—II line of the planar light source device shown in FIG. 1 when the refractive element having a shape shown in FIG. 17(c) is provided;

FIG. 22(a) is an illustration view for illustrating a case of dividing it with a plane perpendicular to the direction of length hand of the refractive element shown in FIG. 17(a), FIG. 22(b) is an illustration view for illustrating a case of dividing it with a plane oblique to the direction of length hand of the refractive element shown in FIG. 17(a), and FIG. 22(c) is an illustration view for illustrating a case of dividing so that the section of the direction of length hand of the refractive element shown in FIG. 17(a) is formed with a plurality of planes;

FIG. 29(a) is a top view viewed from the top face side of the housing, and FIG. 29(b) is a frontal view viewed from the hollow space side;

FIG. 31(a) is a top view viewed from the top face side of the housing, FIG. 31(b) is a frontal view viewed from the hollow space side, and FIG. 31(c) is a side view viewed from the direction of length hand of the refractive element;

FIG. 37(a) is a frontal view viewed from the hollow space side, and FIG. 37(b) is a side view viewed from the direction of length hand of the refractive element;

FIG. 58 is a partial section view of a planar light source device related to Embodiment 11 of the present invention;

BEST MODE FOR CARRYNG OUT OF THE INVENTION

EMBODIMENT 1

Figure 1:
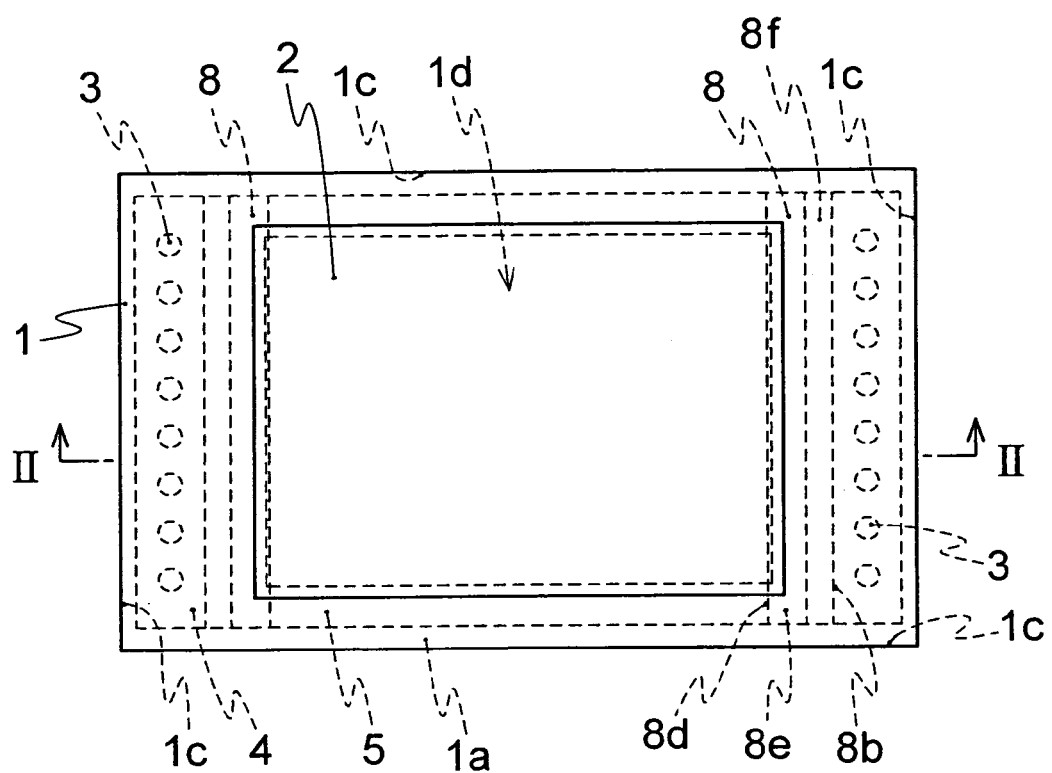
FIG. 1 is a plan view showing the schematic composition of a planar light source device related to Embodiment 1 of the present invention.
Figure 2:
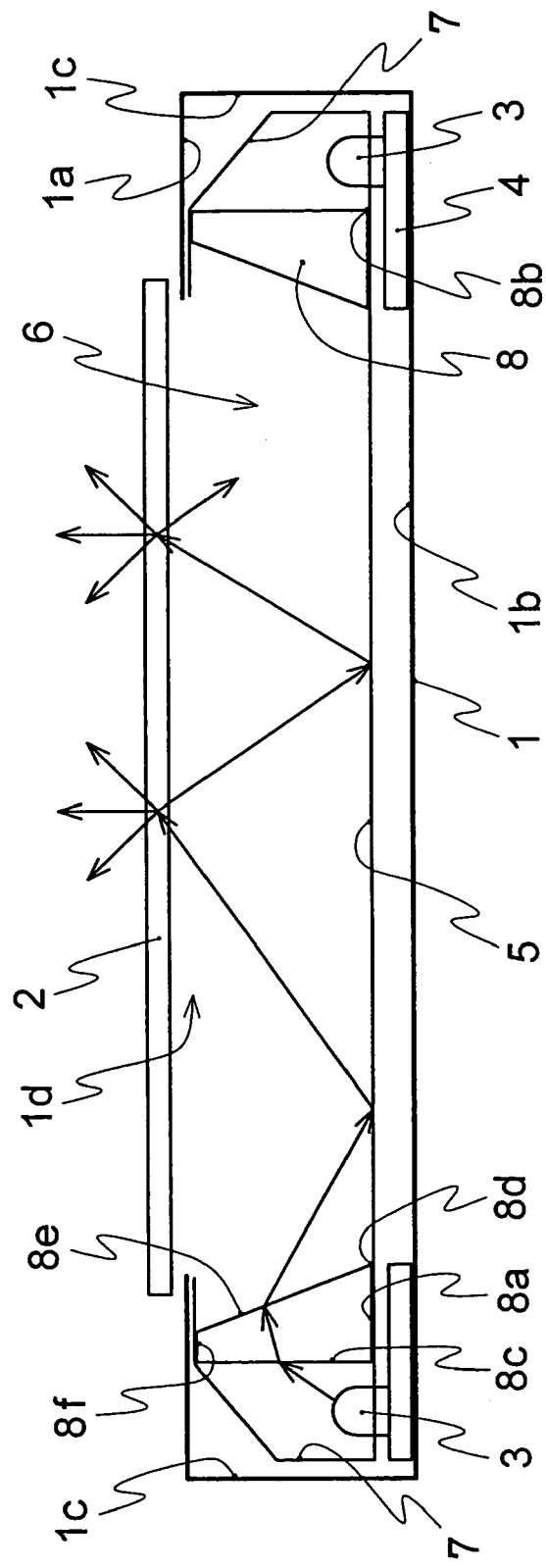
FIG. 2 is a partial section view of the II—II line of a planar light source device shown in FIG. 1.
Figure 3:
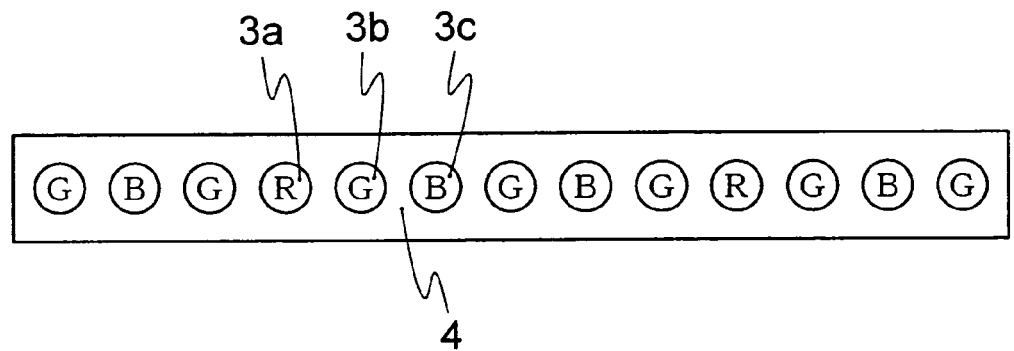
FIG. 3 is an LED arrangement chart showing one example of the arrangement of LEDs.
Figure 4:
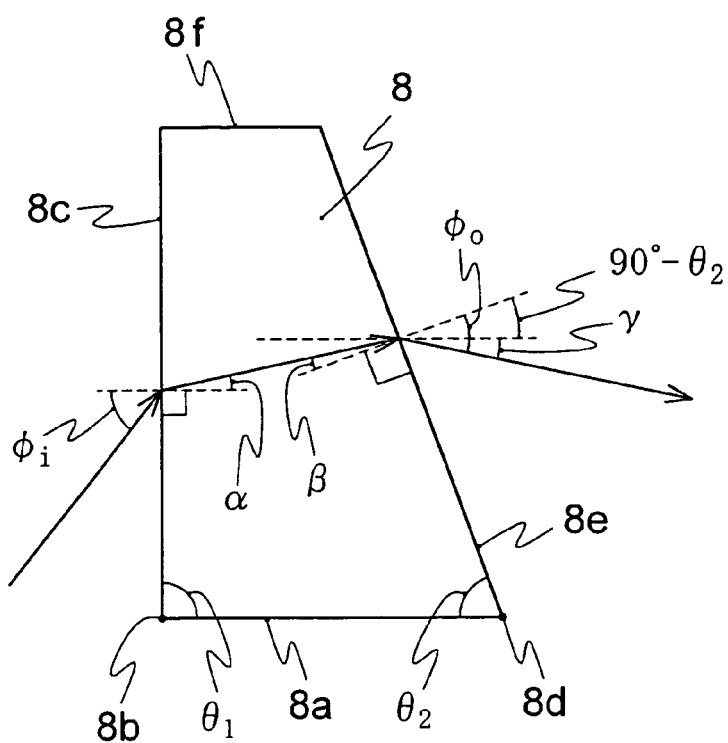
FIG. 4 is a magnified view of a substantial part for illustrating the light path of light passing the refractive element.
Figure 5:
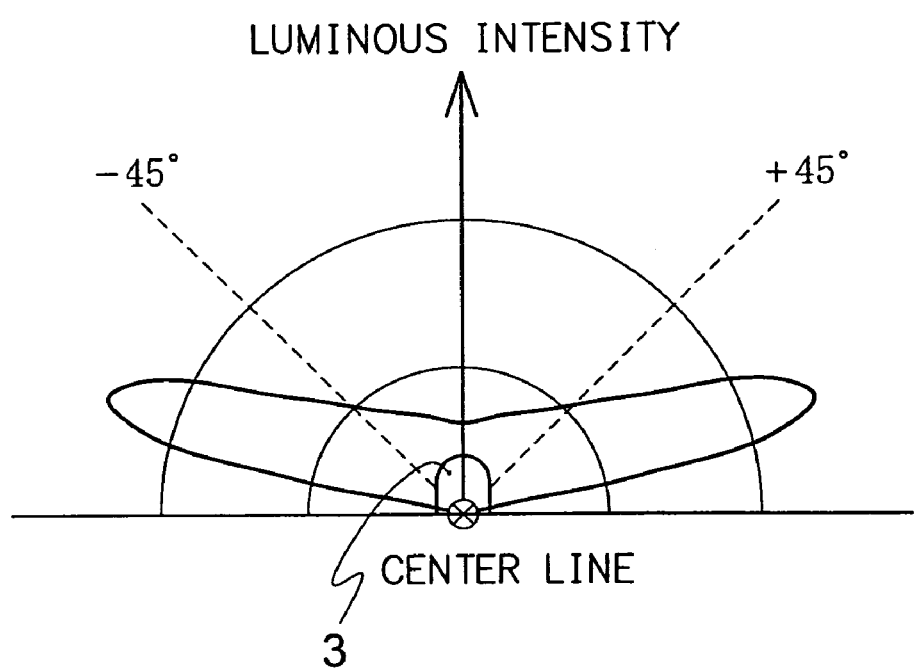
FIG. 5 is a view showing the light distribution of radiating light from LEDs related to Embodiment 1 of the present invention.

FIG. 1 is a plan view showing the schematic composition of a planar light source device related to Embodiment 1 of the present invention. FIG. 2 is a partial section view of the II—II line of the planar light source device shown in FIG. 1. FIG. 3 is an LED arrangement chart showing one example of the arrangement of point light sources 3 using light emitting diodes (LEDs) and the like. FIG. 4 is a magnified view of a substantial part for illustrating the light path of light passing the refractive element. FIG. 5 is a view showing the light distribution of radiating light from LEDs which are used for the point light sources 3 related to Embodiment 1 of the present invention. In FIGS. 1 to 5, the housing 1 of the planar light source device is composed of a top face 1a, a bottom face 1b and 4 side planes 1c and has an opening portion 1d on the top face 1a.

The whole opening portion 1d of the housing 1 is provided with a scattering plate 2. The scattering plate 2 is a glass substrate or a resin plate such as polyethylene terephthalate (PET), acryl (PMMA) or polycarbonate (PC) which has a function of transmitting light. Further, those in which a reflecting material is mixed and those whose surface is roughened are used for the scattering plate 2 and a function for scattering irradiated light is imparted, thereby, it is preferable because the planar light source device having wide directivity can be obtained.

As the point light sources 3, a light emitting diode (hereinafter, referred to as LED), a laser diode (LD) and the like can be employed. In Embodiment 1, LEDs are used, and it is composed of the first point light sources 3a which emit red light (R), the second point light sources 3b which emit green light (G) and the third point light sources 3c which emit blue light (B).

The LEDs which emit red, green or blue color have high luminescence efficiency in comparison with LEDs which emit white color, and it is preferable because a display device having high color reproducibility can be obtained by combining the permeation property of red, green and blue colors of color filters used for a liquid crystal display device with the luminescence spectra of LEDs. Further, it is preferable because the hue of radiating light from a planar light source device can be easily changed by independently controlling LEDs by each color.

A plurality of point light sources 3 are provided by being arranged in the direction of length hand of the substrate 4 of the point light sources on the rectangular substrate 4 of the point light sources. The substrate 4 of the point light sources is provided in parallel along two facing side planes 1c of the housing 1 and the plurality of point light sources 3 are provided in parallel along the side planes 1c of the housing 1.

The numbers of each of the first point light sources 3a, the second point light sources 3b and the third point light sources 3c provided on the substrate 4 are not required to be always equal, and the numbers of each of the first point light sources 3a, the second point light sources 3b and the third point light sources 3c may be arbitrarily set so as to be able to be optimized at a desired chromaticity after being transmitted through liquid crystal display elements. For example, as shown in FIG. 3, they can be arranged in the repeating permutation of G, B, G, R, G, and B.

The housing 1 shields light so that light does not externally leak as little as possible, and a reflecting plate 5 is provided at the bottom face 1b which is the inside of the housing 1 and the side plane 1c where the substrate 4 of the point light sources is not arranged nearby so that light is reflected on the inside to proceed to the opening portion id. Light is propagated in air in the hollow space 6 by forming the hollow space 6 between the reflecting plate 5 and the scattering plate 2.

The reflecting plate 5 consists of a material which is obtained by depositing a metal such as aluminum or silver on a metal plate of such as aluminum or silver or a resin sheet. Further, the reflecting plate 5 is a regularly reflecting material which has a function of regularly reflecting light, and propagates light from the light source to a counter light source side by repeating reflection in which an incident angle coincides with a reflection angle on the reflecting plane of the reflecting plate 5.

A reflector 7 surrounds the point light sources 3 excluding the hollow space 6 side and reflects light from the light source to the hollow space 6 side. Further, the reflector 7 consists of a metal plate having a reflecting layer which is formed by aluminum or silver, or a white sheet made of a resin.

Further, the reflection coefficient of the reflecting plate 5 and the reflector 7 is preferably 90% or more in order to suppress reflection loss on the reflecting plane. Further, when the reflection coefficient is enhanced by making the inside of the housing 1 white, reflection in the inside is further improved and it is preferable because light loss is lessened. Further, although the reflecting plate 5 and the reflector 7 are composed of separate members, the number of members is lessened by integrally forming the reflecting plate 5 and the reflector 7 with the same member to be able to improve the workability of assembling. Further, when the housing 1 is designed to meet with the functions of the reflecting plate 5 and the reflector 7, it is preferable because the number of members can be reduced.

A refractive element 8 is provided between the point light sources 3 and the hollow space 6 along the arrangement direction of the plurality of point light sources 3 and refracts irradiating light for the irradiated plane of the refractive element 8 to the bottom face 1b side of the housing 1. More preferably, light with an incident angle at which luminance is the maximum among light distribution of irradiating light for an irradiated plane 8c of the refractive element 8 is refracted so as to be radiated for the bottom face 1b of the housing 1.

Further, the refractive element 8 in Embodiment 1 has a bottom face 8a which is nearly parallel to the bottom face 1b side of the housing 1, the irradiated plane 8c which forms a slant angle at the reverse side from first cristas 8b to the bottom face 1b side of the housing 1 against the parallel bottom face 8a which passes the first cristas 8b of the bottom face 8a parallel to the point light sources 3 side, radiating plane 8e which forms a predetermined slant angle at the reverse side from the second cristas 8d to the bottom face 1b side of the housing 1 against the parallel bottom face 8a which passes the second cristas 8d of the bottom face parallel to the hollow space 6, and a facing face 8f which faces in parallel to the bottom face 8a. The refractive element 8 is a trapezoidal section shape in which thickness is increased from the top face 1a to the bottom face 1b of the housing 1, and formed by a transparent resin such as acryl or glass. Hereat, the bottom face 8a of the refractive element 8 is arranged in nearly parallel to the bottom face 1b side of the housing 1, but it is not limited to this arrangement so far as light with an incident angle at which luminance is the maximum among light distribution of irradiating light for the irradiated plane 8c of the refractive element 8 is refracted to the bottom face 1b of the housing 1. For example, it may be arranged in nearly parallel to the scattering plate 2 or the reflecting plate 5 or the like.

Optical sheets which comprise a plurality of optical sheets for effectively utilizing light and are not illustrated are arranged on the scattering plate 2 and liquid crystal display elements not illustrated are arranged on the scattering plate 2 through the optical sheets.

Further, the optical sheets are a composition that a lens sheet is sandwiched by scattering sheets. Further, when the improvement of luminance is required, a plurality of lens sheets may be combined considering the direction of prisms of the sheet which are formed on the surface. Further, 2 or more of scattering sheets can be used for improving scattering property. Further, one lens sheet may be used depending on the property of light distribution or may not be used. Further, a protective sheet, a lens sheet or a polarized reflection sheet may be used in combination. Furthermore, none of them can be used. It is preferable because the unevenness of luminance and the unevenness of chromaticity can be further reduced by light scattering effect by the scattering plate 2 and re-reflection by the reflecting plate 5, by using the optical sheet having a function of reflecting the portion of light such as the lens sheet or the polarized reflection sheet in which continuous triangular prisms with an apex angle of nearly 90° are formed at liquid crystal display elements side, to the scattering plate 2.

As the display portion which is arranged at the upper portion of the planar light source device, liquid crystal display elements which apply the birefringence of liquid crystal, printed articles on which characters and pictures are printed on a transparent plate, and the like are mentioned, but the liquid crystal display elements are used as the display portion in Embodiment 1. The liquid crystal display elements are composed of a coloring layer, a light shielding layer, thin layer transistors (hereinafter, referred to as TFT) being switching elements, a TFT array substrate on which electrodes such as pixel electrodes and wires are formed and a counter substrate, a spacer which retains two substrates at an equal interval, a sealing agent which adheres two substrates, a sealant which seals after injecting liquid crystal between the two substrates, an orienting film which primarily orients the liquid crystal, a polarizing plate which polarizes light and the like, on an upper side substrate or a lower side substrate not illustrated. However, since ready-made liquid crystal display elements are used in the present invention, illustration hereat is abbreviated.

The liquid crystal display device is composed by including a circuit substrate not illustrated which drives the liquid crystal display elements and arranging the liquid crystal display elements on the upper portion of the planar light source device.

The light path by which light emitted from the point light sources 3 is radiated from the scattering plate 2 is illustrated.

Monochromatic lights of red, green and blue colors which are emitted from the first point light sources 3a, the second point light sources 3b and the third point light sources 3c being as the point light sources 3 are reflected directly or by a reflector 7 and irradiated on the irradiated plane 8c of the refractive element 8.

Although irradiating lights with all incident angles exist on the irradiated plane 8c of the refractive element 8, radiating light from the radiating plane 8e of the refractive element 8 by irradiating light with an incident angle $\phi_i$ at which luminance is the maximum among light distribution of irradiating light relative to the irradiated plane 8c is refracted on the bottom face 1b side of the housing 1; therefore radiating light from the scattering plate 2 nearby the light source is reduced and the distribution of radiating light from the scattering plate 2 can be uniformly improved. In particular, the radiating light is refracted so as to be radiated for the bottom face 1b side of the housing 1, therefore most part of lights is reflected on the reflecting plate 5 and radiated from the scattering plate 2, and the radiating light from the scattering plate 2 nearby the light source can be reduced. Further, since the propagation distance of light in the hollow space 6 is increased, the color mixture and mixing of light are promoted and it is preferable because the unevenness of luminance and the unevenness of chromaticity can be remarkably reduced.

Further, light which is reflected on the surface of the irradiated plane 8c exists among lights which are irradiated from an oblique direction against the irradiated plane 8c of the refractive element 8. Since the light which is reflected on the surface of the irradiated plane 8c is reflected to the reflector 7 side and propagated in space which is surrounded by the reflector 7 and the refractive element 8, the light spreads in the direction of length hand of the refractive element 8. The light which is irradiated on the irradiated plane 8c of the refractive element 8 spreads to the direction of length hand of the refractive element 8 again and is radiated from the radiating plane 8e; therefore the unevenness of luminance of the radiating light from the refractive element 8 in the arrangement direction of the point light sources 3 can be reduced. Further, the color mixture of lights in space which is surrounded by the reflector 7 and the refractive element 8 is generated in the first point light source 3a, the second point light source 3b and the third point light source 3c which are different in luminescent colors, and the unevenness of chromaticity of the radiating lights from the refractive element 8 in the arrangement direction of the point light sources 3 can be reduced.

When linear light sources such as cold-cathode tubes which exist in series to the direction of length hand of polarizing elements are used as the light source, the proportion of the volume of the light source which occupies space surrounded by the reflector 7 and the refractive element 8 is larger in comparison with a case that the point light sources which are provided separately to the direction of length hand of polarizing elements are used as the light source. Accordingly, probability by which light reflected on the refractive element or the reflector is irradiated on the linear light sources is higher in comparison with probability by which light reflected on the refractive element or the reflector is irradiated on the point light sources, and loss caused by re-irradiation to the light source of surface reflecting light is increased by using the linear light sources. Namely, loss caused by re-irradiating to the light source of surface reflecting light is decreased by using the point light sources, and the unevenness of luminance and the unevenness of chromaticity can be efficiently reduced; therefore superior display quality with high in utilizing efficiency of light can be obtained.

As illustrated below using FIG. 4, irradiating light with an incident angle $\phi_i$ ($-90°<\phi_i<90°$) at which luminance is the maximum among light distribution of irradiating light relative to the irradiated plane 8c is controlled by the refractive element 8 so as to radiate for the bottom face 1b side of the housing 1. Hereat, the refractive index of the refractive element 8 is referred to as n (n is larger than the refractive index 1 of air), the slant angle of the irradiated plane 8c of the refractive element 8 is referred to as $\theta_1$ ($0<\theta_1 \leq 90°$) and the slant angle of the radiating plane 8e of the refractive element 8 is referred to as $\theta_2$ ($0<\theta_2 \leq 90°$).

Light which is irradiated on the irradiated plane 8c of the refractive element 8 at an incident angle $\phi_i$ is refracted by the refractive angle $\alpha$ of the following formula (1) according to the Snell's Law.

$$\alpha = \mathrm{Sin}^{-1}((1/n) \times \mathrm{Sin}\, \phi_i) \tag{1}$$

Further, light passing in the refractive element 8 is irradiated on the radiating plane 8e at an incident angle $\beta$ ($=180°-\theta_1-\theta_2-\alpha$), and is refracted and radiated on the radiating plane 8e of the refractive element 8 at a refractive angle $\phi_0$ of the following formula (2) according to the Snell's Law.

$$\begin{aligned}\phi_0 &= \mathrm{Sin}^{-1}(n \times \mathrm{Sin}\beta) \\ &= \mathrm{Sin}^{-1}(n \times \mathrm{Sin}(180° - \theta_1 - \theta_2 - \alpha)) \\ &= \mathrm{Sin}^{-1}(n \times \mathrm{Sin}(180° - \theta_1 - \theta_2 - \mathrm{Sin}^{-1}((1/n) \times \mathrm{Sin}\phi_i)))\end{aligned} \tag{2}$$

An angle $\gamma$ ($=\phi_0-(90°-\theta_2)$) relative to the bottom face 1b side of the housing 1 is 0° or more so that radiating light from the radiating plane 8e of the refractive element 8 is radiated to the bottom face 1b side of the housing 1.

Namely, it is required to satisfy the following inequality (3).

$$\begin{aligned}0° \leq \gamma &= \phi_0 - (90° - \theta_2)) \\ &= \mathrm{Sin}^{-1}(n \times \mathrm{Sin}(180° - \theta_1 - \theta_2 - \mathrm{Sin}^{-1}((1/n) \times \mathrm{Sin}\phi_i))) - \\ &\quad 90° + \theta_2\end{aligned} \tag{3}$$

Hereat, LEDs being the point light sources 3 control the directivity of the radiating light by sealing LED elements with a lens shaped resin. For example, as shown in FIG. 5, when right rotation from an upper side perpendicular to the central axis of arrangement direction of the LED elements is referred to as positive and LEDs which have the light distribution in which luminance is the maximum when the angle of the radiating lights from LEDs is at ±80° are used as the point light sources 3, an incident angle $\phi_i$ at which luminance is the maximum among light distribution of irradiating lights for the irradiated plane 8c of the refractive element 8 is 10° when the irradiated plane 8c of the refractive element 8 is nearly vertical to the bottom face 1b side of the housing 1, namely, the slant angle $\theta_1$ of the irradiated plane 8c of the refractive element 8 is 90°. When the refractive index n of the refractive element 8 is 1.5, the slant angle $\theta_2$ of the radiating plane 8e of the refractive element 8 satisfies $\theta_2<70.05°$ from the inequality (3); therefore the bright portion nearby the light source is reduced and the distribution of luminance can be improved.

Further, it is preferable to satisfy the following the inequality (4) in order to prevent loss by the total reflection in the radiating plane 8e of the refractive element 8.

$$\begin{aligned}1 &> n \times \mathrm{Sin}\beta = n \times \mathrm{Sin}(180° - \theta_1 - \theta_2 - \alpha) \\ &= n \times \mathrm{Sin}(180° - \theta_1 - \theta_2 - \mathrm{Sin}^{-1}((1/n) \times \mathrm{Sin}\phi_i))\end{aligned} \tag{4}$$

Further, when the slant angle $\theta_1$ of the irradiated plane 8c of the refractive element 8 is 90°, an incident angle $\phi_i$ at which luminance is the maximum among light distribution of irradiating lights for the irradiated plane 8c is 10° and the refractive index n of the refractive element 8 is 1.5, the slant angle $\theta_2$ of the radiating plane 8e of the refractive element 8 satisfies $\theta_2>41.55°$ by the inequality (4), and thereby, the irradiating light at which luminance is the maximum among light distribution of irradiating lights relative to the irradiated plane 8c is not totally reflected at the radiating plane 8e of the refractive element 8; therefore light can be efficiently radiated from the radiating plane 8e.

Light which is radiated from the radiating plane 8e of the refractive element 8 to the bottom face 1b side of the housing 1 is normally reflected by the normal reflecting material of the reflecting plate 5 and light is propagated from the light source to the reverse side of the light source.

The light which is irradiated on the scattering plate 2 is divided into the component of light transmitting in the scattering plate 2 and the component of light which is reflected by particles in the scattering plate 2. Among these, the component of light which is reflected to the bottom face 1b side of the housing 1 is normally reflected on the reflecting plate 5 and irradiated again on the scattering plate 2. The component of light which is irradiated on the scattering plate 2 and transmitted is radiated to all directions.

Light which is radiated from the top face of the scattering plate 2 passes optical sheets comprising a scattering sheet, a protective sheet or a lens sheet to be irradiated on liquid crystal display elements. The liquid crystal layer is oriented by switching the ON-OFF of voltage by switching elements not illustrated in the liquid crystal display elements, and light which is irradiated to the liquid crystal display elements is modulated in accordance with picture signals to display the respective colors of red, green and blue colors.

Further, in Embodiment 1, the reflector 7 is in a shape which surrounds the point light sources 3 excluding the hollow space 6 side and reflects light from the light source to the hollow space 6 side. However, when the shape of the reflector 7 is formed so that an incident angle at which luminance is the maximum among light distribution of irradiating lights relative to the irradiated plane of light (hereinafter, referred to as direct light) which reaches directly the irradiated plane 8c of the refractive element 8 from the point light sources 3 coincides with an incident angle at which luminance is the maximum among light distribution of irradiating lights for the irradiated plane of light (hereinafter, referred to as indirect light) which is reflected by the reflector 7 from the point light sources 3 and reaches the irradiated plane 8c of the refractive element 8, the direct light and the indirect light from the light source can be efficiently refracted to the bottom face 1b side of the housing 1 through the refractive element 8.

Further, when the shape of the reflector 7 is formed so that the incident angle at which luminance is the maximum among light distribution of irradiating lights relative to the irradiated plane 8c of the indirect light is smaller in comparison with the incident angle at which luminance is the maximum among light distribution of irradiating lights relative to the irradiated plane 8c of the direct light, the indirect light from the light source can be further efficiently refracted to the bottom face 1b side of the housing 1 through the refractive element 8.

Figure 6:
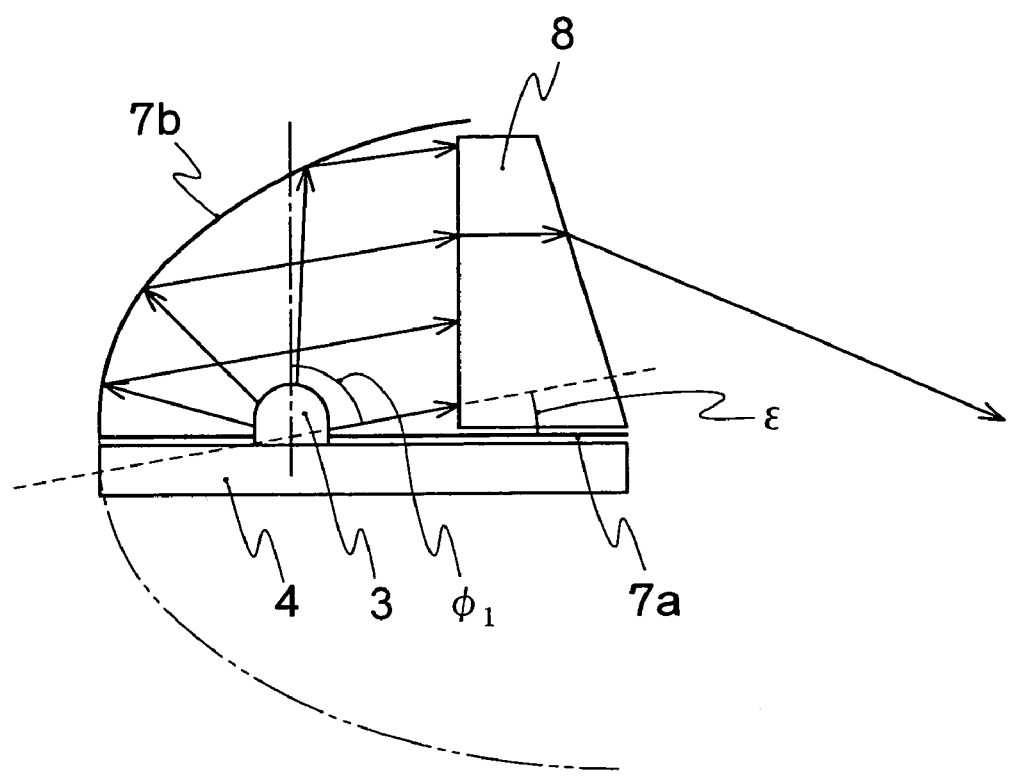
FIG. 6 is a partial section view of other reflector related to Embodiment 1.

As shown in FIG. 6, the sectional shape of the reflector 7 is composed of a straight line portion 7a which is the section of a plane provided at the point light sources 3 and a curve portion 7b which is the portion of a parabola in which the axis of a parabola in which LED elements are focus is slanted by an angle $\epsilon$ against the straight line portion 7a. Further, in the case that an angle at which luminance is the maximum among the direct light is set as $\phi_i$ ($0°<\phi_i<90°$), the incident angle at which luminance is the maximum among light distribution of irradiating lights for the irradiated plane 8c of the indirect light is lessened in comparison with the incident angle at which luminance is the maximum among light distribution of irradiating lights for the irradiated plane 8c of the direct light, when the angle $\epsilon$ which is formed between the axis of a parabola and the straight line portion 7a is $\epsilon<90°-\phi_i$. In particular, when $\epsilon$ is $\epsilon=90°-\phi_i$, the incident angle at which luminance is the maximum among light distribution of irradiating lights for the irradiated plane 8c of the direct light coincides with the incident angle at which luminance is the maximum among light distribution of irradiating lights for the irradiated plane 8c of the indirect light.

Figure 7:
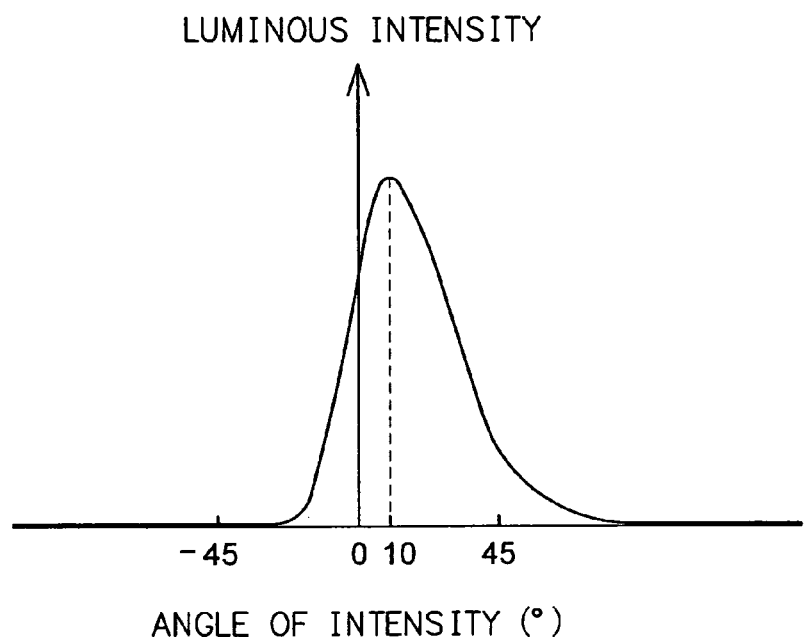
FIG. 7 is a view showing the light distribution of irradiating light against the irradiated plane of the refractive element when other reflector related to Embodiment 1 is used.

Hereat, LEDs being the point light sources 3 control the directivity of the radiating light by sealing LED elements with a lens shaped resin. For example, as shown in FIG. 5, when right rotation from an upper side perpendicular to the central axis of arrangement direction of the LED elements is referred to as positive and LEDs which have the light distribution in which luminance is the maximum when the angle of the radiating light from LEDs is at ±80° are used as the point light sources 3, the angle $\epsilon$ which is formed between the axis of a parabola and the straight line portion 7a is set as 10°. Thereby, as shown in FIG. 7, when left rotation from an upper side perpendicular to the irradiated plane 8c of the refractive element 8 which is viewed from the reflector side is set as positive, the light distribution of irradiating light for the irradiated plane 8c of the refractive element 8 has a sharp peak at an incident angle of 10° and the controllability by the refractive element 8 can be further improved. FIG. 6 is a partial section view of other reflector related to Embodiment 1 of the present invention. FIG. 7 is a view showing the light distribution of irradiating lights against the irradiated plane of the refractive element when other reflector related to Embodiment 1 is used.

Further, when the angle $\epsilon$ which is formed between the axis of a parabola and the straight line portion 7a is smaller than 10°, the light distribution of irradiating lights for the irradiated plane 8c of the refractive element 8 is broadened and the controllability by the refractive element 8 is lowered, but since the indirect light is radiated from the refractive element 8 to the bottom face 1b side of the housing 1 in comparison with the direct light, effects for reducing the bright portion nearby the light source and improving the distribution of luminance can be obtained.

Figure 8:
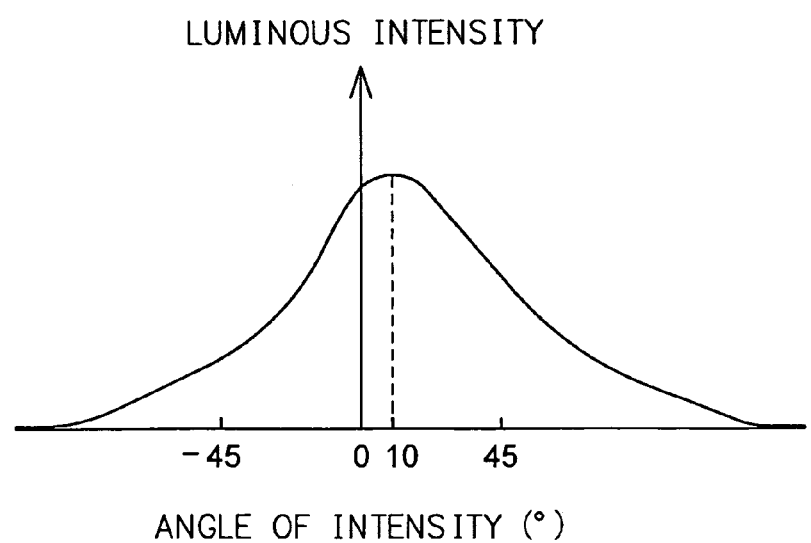
FIG. 8 is a view showing the light distribution of irradiating light against the irradiated plane of the refractive element when a conventional light source having no directivity and other reflector related to Embodiment 1 are used.

Further, a case that cold-cathode tubes and the like having no directivity are used as the light source (FIG. 8) is compared with a case that the point light sources having directivity are used as the light source (FIG. 7). Since the luminescent plane of the cold-cathode tubes is columnar, reflected lights are not adequately parallel and light which is not reflected on the reflector and reaches directly the irradiated plane 8c has no directivity when the reflector that is composed of only a curve portion which is one portion of a parabola in which the axis of the parabola in which the central axis of the cold-cathode tubes is focus is slanted by an angle of 10° against the bottom face 1b of the housing 1 is used. Therefore, the light distribution is broadened. As shown in FIG. 8, the angle range of an incident angle relative to the irradiated plane 8c is broad and the radiating light from the radiating plane 8d of the refractive element 8 is also broadened against the radiating plane 8d. Accordingly, light which reaches directly the scattering plate 2 from the refractive element 8 nearby the light source cannot be suppressed, and the bright portion nearby the light source cannot be reduced in comparison with a case that the point light sources having directivity are used as the light source. FIG. 8 is a view showing the light distribution of irradiating lights against the irradiated plane of the refractive element when a conventional light source having no directivity and other reflector related to Embodiment 1 is used.

Figure 9:
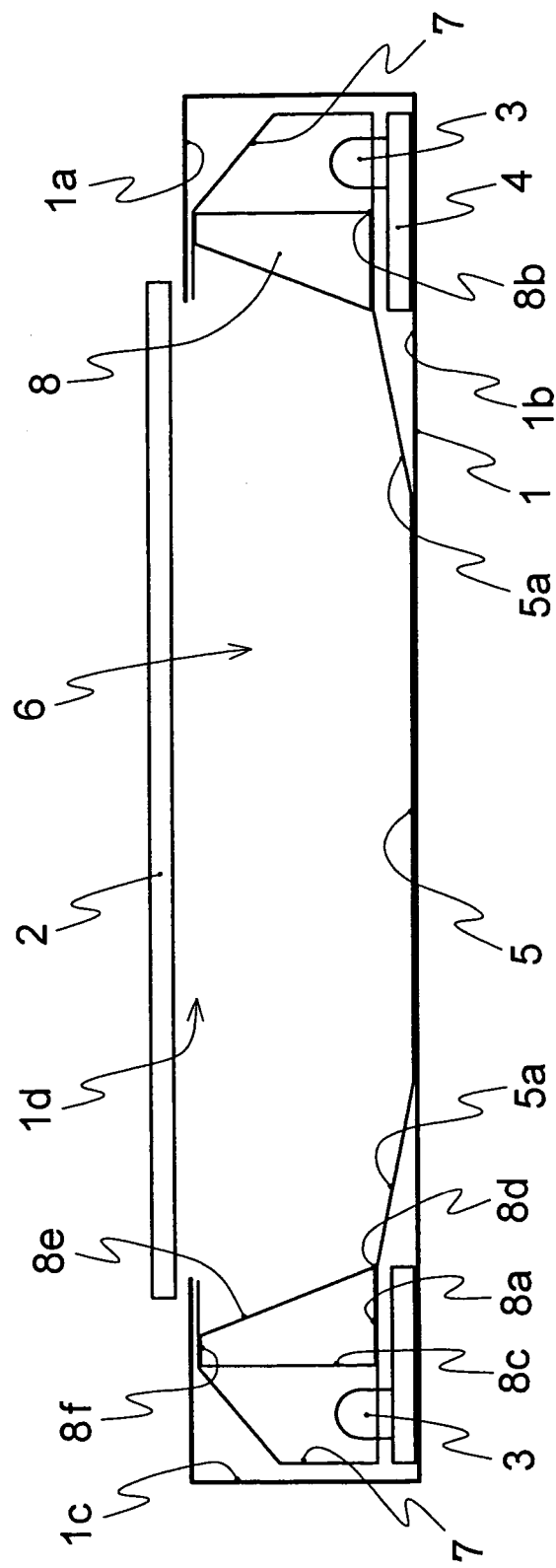
FIG. 9 is a partial section view of other planar light source device related to Embodiment 1 which has the first slant portions at a reflecting plate.
Figure 10:
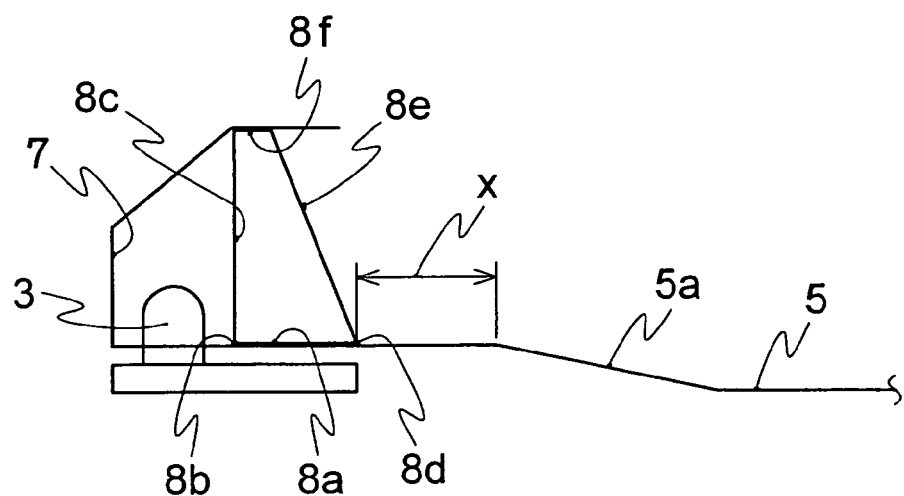
FIG. 10 is an illustration view for illustrating the relation of distances between the first slant portions and the refractive element.
Figure 11:
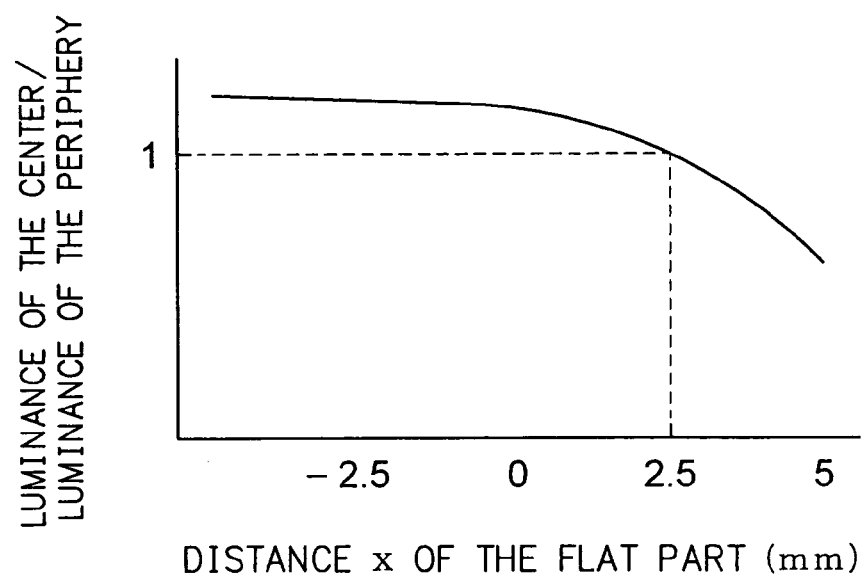
FIG. 11 is an illustration view showing the ratio of luminance of the central portion of a display surface to the peripheral portion of the display surface against the distances x of a flat portion.

Further, in Embodiment 1, the reflecting plate 5 which is nearly parallel to the bottom face 1b of the housing 1 or the scattering plate 2 is used, but as shown in FIG. 9, the reflecting plate 5 may have the first slant portions 5a in which a gap between the scattering plate 2 and the reflecting plate 5 is increased from the facing refractive element 8 to the center of the opening portion id of the housing 1. Thereby, the incident angle of light at the first slant portions 5a is enlarged in comparison with an incident angle at the reflecting plate which is nearly parallel to the bottom face 1b of the housing 1 or the scattering plate 2, and light which is reflected by the reflecting plate can be reflected far from the light source. FIG. 9 is a partial section view of other planar light source device related to Embodiment 1 which has the first slant portions at a reflecting plate. FIG. 10 is an illustration view for illustrating the relation of distances between the first slant portions and the refractive element. FIG. 11 is an illustration view showing the ratio of luminance of the central portion of a display surface to the peripheral portion of the display surface against the distances x of a flat portion.

As shown in FIGS. 10 and 11, it is preferable to have the first slant portions 5a, namely, to reduce the distances x (mm) at a flat portion from the second cristas 8d of the refractive element 8 to the first slant portions 5a in view of enhancing a ratio of the luminance at the central portion of a display face to the luminance of a display face peripheral portion nearby the light source.

In general, it is preferable that the luminance of the central portion of a display surface is high in comparison with the peripheral portion of the display surface, and when the distance x at a flat portion is 2.5 mm or less, it is preferable because the ratio of the luminance at the central portion of a display face to the luminance of a display face peripheral portion is 1 or more.

The first slant portions 5a may be composed of a plurality of slant planes so that an angle which is formed with the bottom face 1b of the housing 1 or the scattering plate 2 approaches stepwise to 0° from the facing refractive element 8 to the center of the opening portion 1d of the housing 1, and they may be formed by a curved surface. Thereby, the distribution of luminance can be more accurately controlled in comparison with a case that the first slant portions 5a are formed by a single slant plane.

Figure 12:
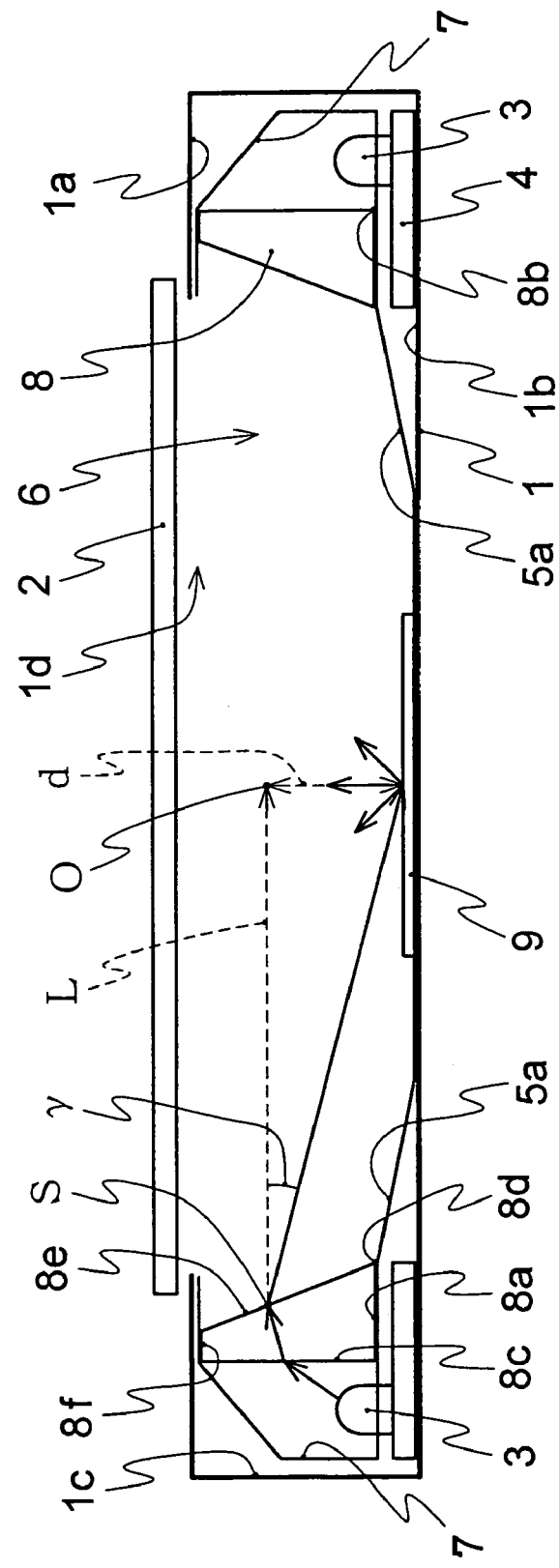
FIG. 12 is a partial section view of other planar light source device related to Embodiment 1 which has a scattering reflection portion at the reflecting plate.

In Embodiment 1, a normal reflecting material having a function of normally reflecting light is used as the reflecting plate 5, but as shown in FIG. 12, a scattering reflection portion 9 may be provided by providing those which are obtained by roughening the surface of a portion of the normal reflecting material of the bottom face 1b of the housing 1 along the direction of length hand of the refractive element 8, or by coating a white resin sheet or a metal plate in white at the portion of the bottom face 1b of the housing 1, along the direction of length hand of the refractive element 8. FIG. 12 is a partial section view of other planar light source device related to Embodiment 1 which has a scattering reflection portion at the reflecting plate.

Even if the angle of light against the bottom face 1b of the housing 1 is nearly horizontal, the scattering reflection portion 9 can disarrange the propagation direction of light by scattering light which is irradiated on the scattering reflection portion 9, and can reflect it to the scattering plate 2 side. In particular, since the scattering reflection portion 9 is situated at the center of the bottom face 1b of the housing 1, the luminance of the central portion of display can be preferably enhanced. Further, the reflection coefficient of the scattering reflection portion is preferably 90% or more for suppressing reflection loss at the reflection plane.

As shown in FIG. 12, irradiating light in which luminance is the maximum among light distribution of irradiating lights for the irradiated plane 8c of the refractive element 8 is refracted by the refractive element 8, the horizontal distance to the center O of the opening 1d of the housing 1 on the basis of a position S at which the light is radiated from the radiating plane 8e is referred to as L, and a vertical distance from the center O of the opening 1d of the housing 1 to the reflecting plate 5 which is arranged at the bottom face 1b side of the housing 1 is referred to as d. Hereat, radiating light which is radiated from the position S can be firstly reflected on the reflecting plate 5 at the center of the bottom face 1b of the housing 1 by satisfying the following formula (5), and it is preferable because the luminance of the central portion of display surface can be enhanced in comparison with the surrounding of the point light sources.

$$\text{Tan}^{-1}(d/L) = \gamma \qquad (5)$$
$$= \text{Sin}^{-1}(n \times \text{Sin}(180° - \theta_1 - \theta_2 -$$
$$\text{Sin}^{-1}((1/n) \times \text{Sin}\phi_i))) - 90° + \theta_2$$

Figure 13:
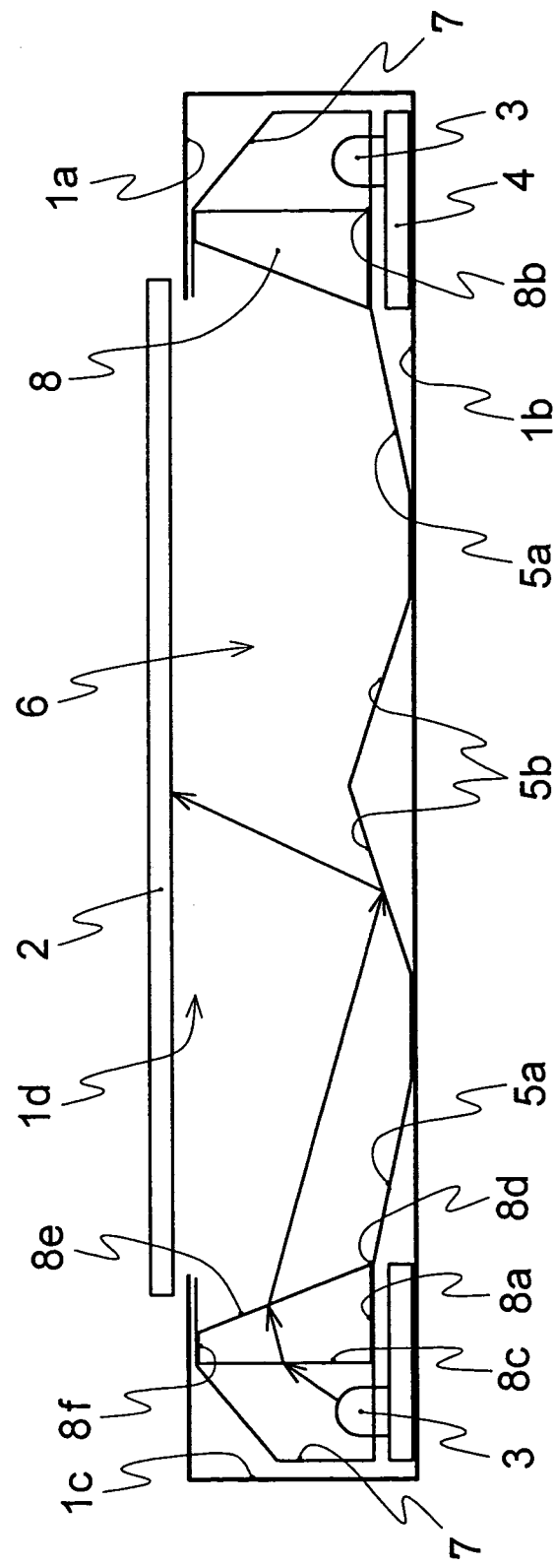
FIG. 13 is a partial section view of other planar light source device related to Embodiment 1 which has the second slant portions at the reflecting plate.
Figure 14:
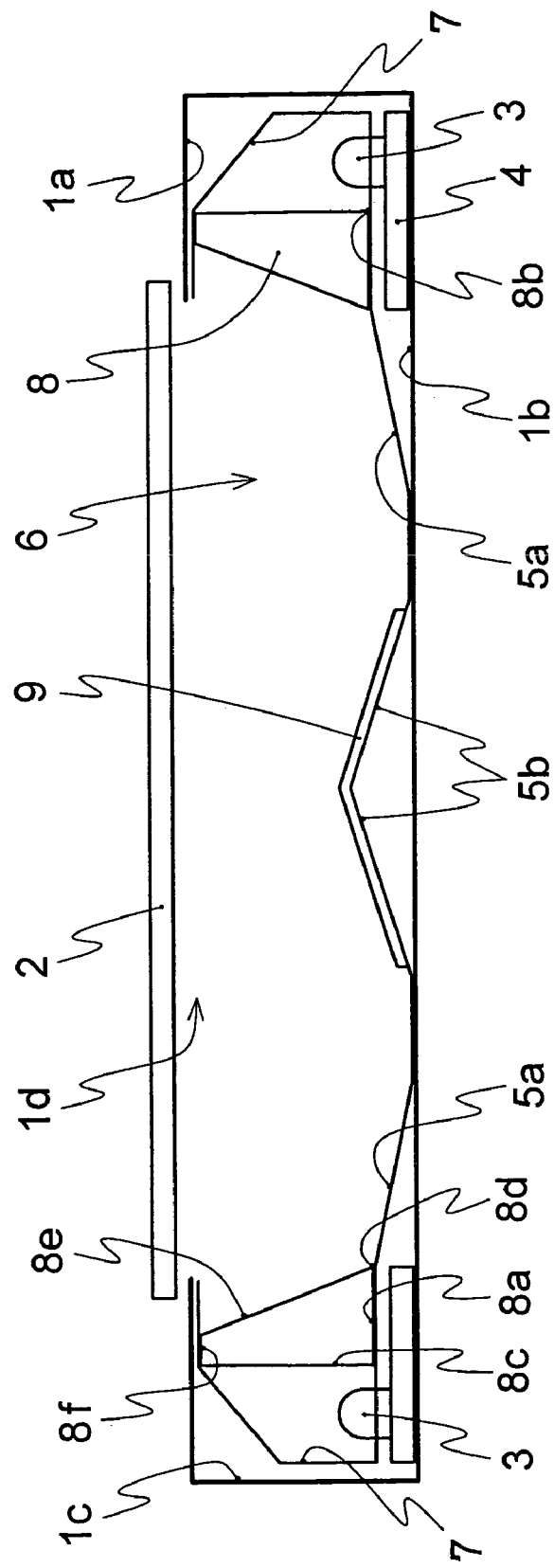
FIG. 14 is a partial section view of other planar light source device related to Embodiment 1 which has the second slant portions and a scattering reflection portion at the reflecting plate.

Further, in Embodiment 1, the reflecting plate 5 which is nearly parallel to the bottom face 1b of the housing 1 or the scattering plate 2 is used, but as shown in FIG. 13, the reflecting plate 5 may have the second slant portions 5b in which a gap between the scattering plate 2 and the reflecting plate 5 is decreased from the facing refractive element 8 to the center of the opening portion 1d of the housing 1. Further, it may be a composition that the second slant portions 5b are linked at the center of the bottom face 1b of the housing 1. FIG. 13 is a partial section view of other planar light source device related to Embodiment 1 which has the second slant portions 5b at the reflecting plate. FIG. 14 is a partial section view of other planar light source device related to Embodiment 1 which has the second slant portions 5b and a scattering reflection portion 9 at the reflecting plate.

Even if the angle of light against the bottom face 1b of the housing 1 is nearly horizontal, the second slant portions 5b can obtain an adequate reflection angle for reflecting light which is irradiated on the second slant portions 5b, to the scattering plate 2 side. In particular, since it has the second slant portions 5b at the center of the opening portion 1d of the housing 1, the luminance of the central portion of display can be preferably enhanced. Further, as shown in FIG. 14, the second slant portions 5b have the scattering reflection portion 9.

The second slant portions 5b may be composed of a plurality of slant planes or of a curved surface so that an angle which is formed with the bottom face 1d of the housing 1 or the scattering plate 2 is enlarged stepwise from the facing refractive element 8 to the center of the opening portion 1d of the housing 1. Thereby, the distribution of luminance can be more accurately controlled in comparison with a case that the second slant portions 5b are formed by a single slant plane.

Figure 18:
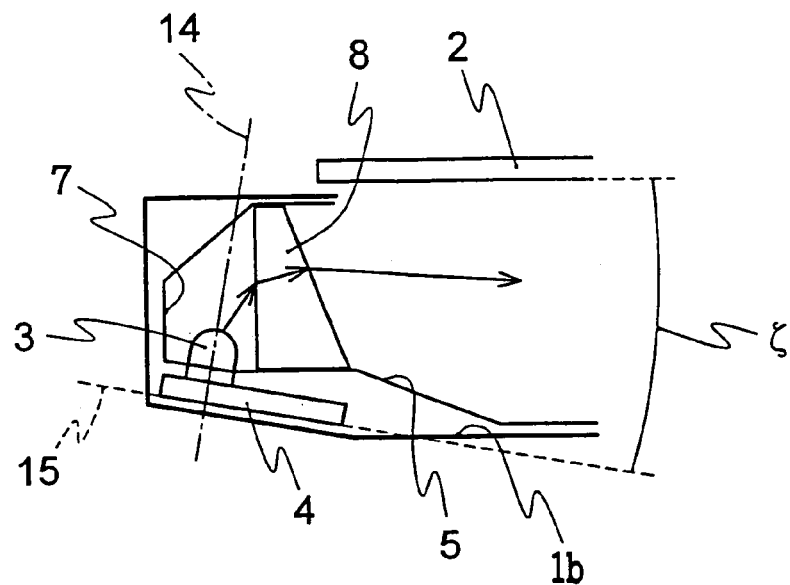
FIG. 18 is a partial section view of other planar light source device related to Embodiment 1 in which the substrate of point light sources is slanted by an angle of $\zeta$ against the scattering plate.

Further, in Embodiment 1, a plane 15 which is vertical to the central axis 14 of the point light sources 3 is in parallel to the bottom face 1b of the housing 1 or the scattering plate 2, but as shown in FIG. 18, the substrate 4 of the point light sources may be provided so as to be slanted to the hollow space side against the scattering plate 2 so that an angle of $\zeta$ is formed between the plane 15 which is vertical to the central axis 14 of the point light sources 3 and the scattering plate 2. FIG. 18 is a partial section view of other planar light source device related to Embodiment 1 in which the substrate of point light sources is slanted by an angle of $\zeta$ against the scattering plate.

Thus, light which is radiated from the point light sources 3 and reaches the refractive element 8 is slanted to the bottom face side by the angle of $\zeta$ by slanting the substrate 4 of the point light sources by the angle of $\zeta$ to the hollow space side against the scattering plate 2 in comparison with a case that the substrate 4 of the point light sources is provided in parallel to the scattering plate 2. Consequently, the light which is refracted and radiated at the refractive element 8 is also slanted to the bottom face side by the angle of $\zeta$, the bright portion nearby the light source is further reduced and the unevenness of luminance and the unevenness of chromaticity can be improved.

Figure 19:
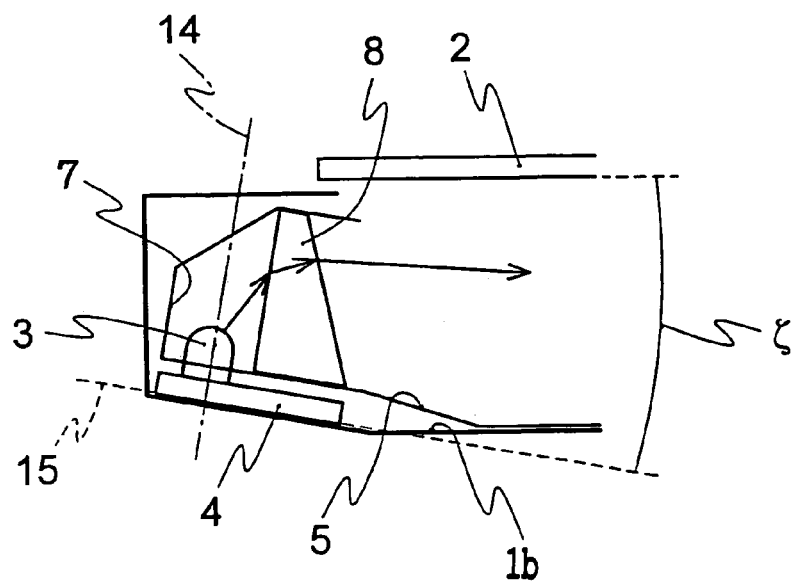
FIG. 19 is a partial section view of other planar light source device related to Embodiment 1 in which the substrate of point light sources and the refractive element are slanted by an angle of ζ against the scattering plate.

Further, as shown in FIG. 19, the reflector 7 and the refractive element 8 may be obliquely arranged in accordance with the slant of the substrate 4 of the point light sources, and the uniformity of luminance and chromaticity can be improved in the same manner as the planar light source device shown in FIG. 18. FIG. 19 is a partial section view of other planar light source device related to Embodiment 1 in which the substrate of point light sources and the refractive element are slanted by an angle of $\zeta$ against the scattering plate.

Figure 23:
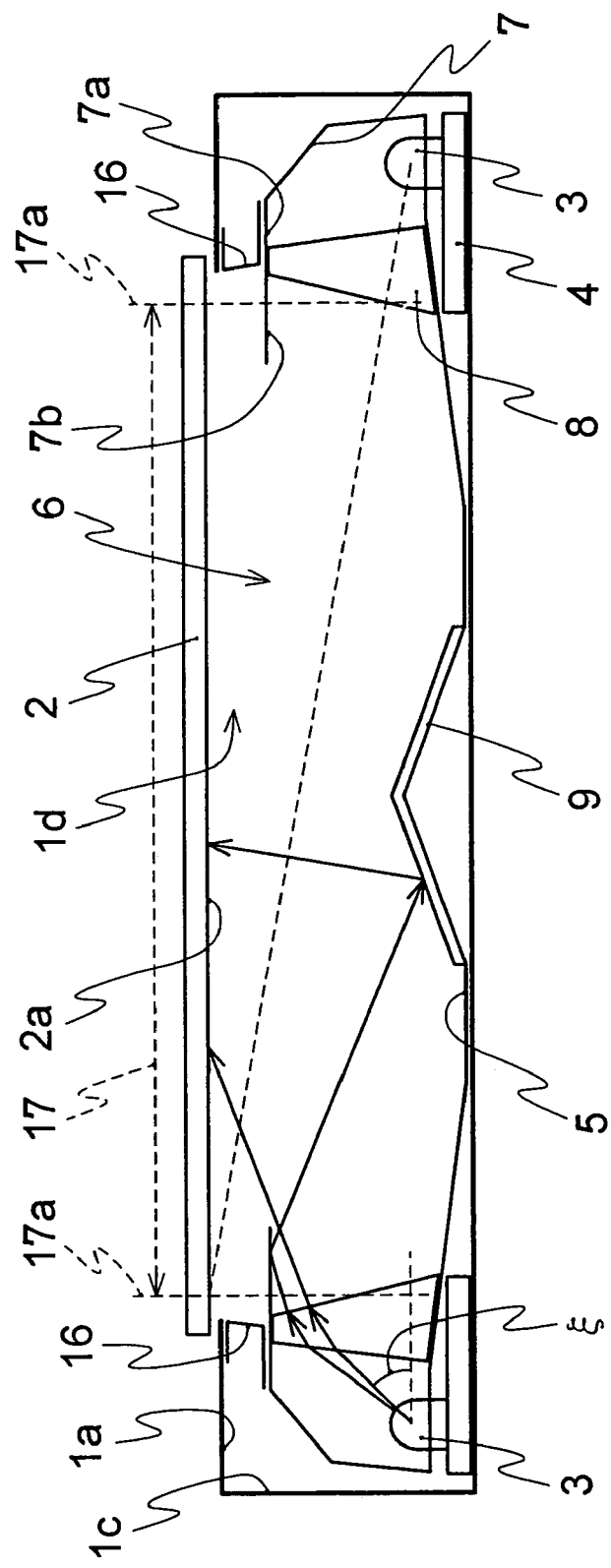
FIG. 23 is a partial section view of other planar light source device related to Embodiment 1 in which the edge of a reflector is extended to an effective display zone.

In Embodiment 1, although the edge at the hollow space 6 side of the top face of the reflector 7 is not extended to the opening portion 1d of the housing 1, the edge 7b of the reflector 7 may be extended to the hollow space 6 side than the edge 17a of the effective display zone 17 as shown in FIG. 23. In this case, space is provided between the top face 7a of the reflector 7 and the top face 1a of the housing 1 and the second reflectors 16 for reflecting light from the hollow space 6 side to the hollow space 6 are provided in the space. Hereat, the effective display zone 17 is a zone in which light from the planar light source device among the display portion which is not illustrated is irradiated, and is a display zone which comprises a plurality of pixels arranged in a matrix shape in the case of the liquid crystal display elements. FIG. 23 is a partial section view of other planar light source device related to Embodiment 1 in which the edge of a reflector is extended to an effective display zone.

Although radiating lights with a wide range exist from the point light sources 3, the direction of the radiating lights is adjusted by the reflector 7 and they are radiated from the opening portion of the reflector 7 to the hollow space 6 through the refractive element 8. Hereat, the size of the opening portion of the reflector 7 is limited by broadening the gap between the top face 7a of the reflector 7 and the top face 1a of the housing 1, and the maximum value of the angle of $\zeta$ of light which reaches from the point light sources 3 to the scattering plate 2 is also limited. When the angle of $\zeta$ is reduced, light which reaches the scattering plate 2 is separated from the point light sources 3, the radiating light from the scattering plate 2 nearby the light source is reduced, and the bright portion nearby the light source can be improved.

By providing the second reflectors 16 in the gap between the top face 7a of the reflector 7 and the top face 1a of the housing 1, light which would reach the gap from the hollow space 6 side is reflected to the hollow space 6 side, and the utilization efficiency of light can be enhanced.

Since the second reflectors 16 is formed in such a manner that its reflection plane is slanted to the hollow space 6 side from the top face 7a of the reflector 7 to the top face 1a of the housing 1, the light from the hollow space 6 side can be reflected on the bottom face 1b side of the housing 1, the radiating light from the scattering plate 2 nearby the light source is reduced, and the bright portion nearby the light source can be preferably improved.

The second reflectors 16 comprise preferably a material having a reflection coefficient of 90% or more such as a metal plate having a reflecting layer which is formed by aluminum or silver, or a white sheet made of a resin, in the same manner as the reflector 7.

Since the edge 7b of the reflector 7 is extended to the hollow space 6 side than the edge 17a of the effective display zone 17, the maximum value of the angle of $\zeta$ of light which reaches directly from the point light sources 3 to the scattering plate 2 is further reduced and the radiating light from the scattering plate 2 nearby the light source is reduced, thereby the bright portion nearby the light source can be improved.

Since the edge 7b of the reflector 7 exists extendedly in the effective display zone 17, there is a concern that the shade of the reflector 7 is generated at the scattering plate 2 nearby the light source, but the edge 7b of the reflector 7 being objective is stored in a zone at the bottom face 1b side of the housing 1 than a zone which combines the point light sources 3 at the edge 7b side which faces the objective edge 7b with a tangential line which is formed between the edge 17a of the effective display zone 17 at the objective edge 7b side and the rear face 2a of the scattering plate 2, in the hollow space 6. Since light from the point light sources 3 at the edge 7b side which faces the objective edge 7b can reach the portion of the scattering plate 2 which should be the shade by the objective edge 7b, thereby the good distribution of luminance without the unevenness of contrasting can be obtained.

Thus, since the light from the point light sources 3 is refracted by the refractive element 8 to the reflecting plate 5 and light which reaches directly nearby the light source of the scattering plate 2 from the refractive element 8 can be reflected on the top face 7a of the reflector 7, the light which reaches directly nearby the light source of the scattering plate 2 is further effectively reduced, and the bright portion nearby the light source can be improved. In FIG. 23, the bottom face of the refractive element 8 is slanted along the first slant portion 5a of the reflecting plate 5. Since the refractive element 8 is made as such shape, light which is reflected on the bottom face of the refractive element 8 can reach the scattering plate 2 at a position separated from the light source.

In FIG. 23, the reflector 7 and the second reflectors 16 are composed of different members, but the number of members is decreased and the workability of assembling can be improved by integrally forming the reflector 7 and the second reflectors 16 with the same member.

Figure 15A:
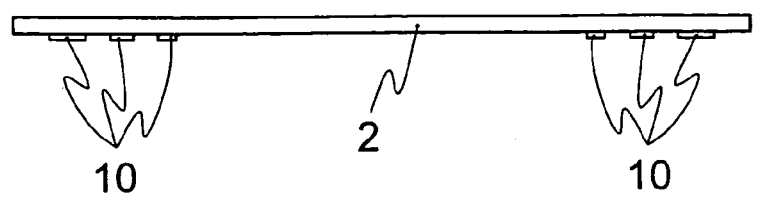
FIG. 15($a$) is a side view of other scattering plate related to Embodiment 1 and FIG. 15($b$) is a plan view of other scattering plate related to Embodiment 1.
Figure 15B:
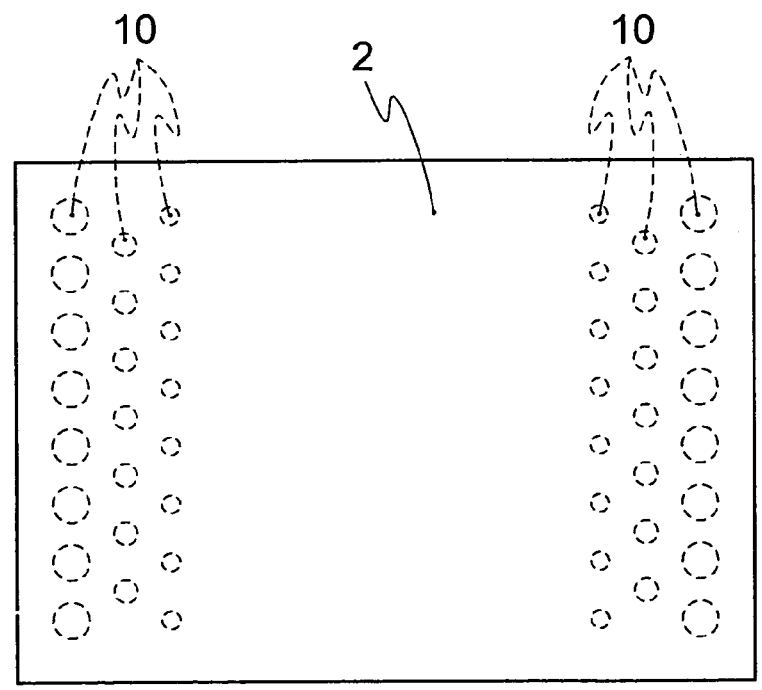

Further, as shown in FIGS. 15(a) and 15(b), since light shielding patterns 10 by which the transmitting quantity of light is increased in accordance with separation from the point light sources 3 nearby the refractive element 8 are provided on the scattering plate 2, the portion of light which is irradiated on the scattering plate 2 nearby the light source is reflected; therefore the bright portion nearby the light source is preferably reduced. The light shielding patterns 10 are formed by white dot printing or by deposition of such as silver or aluminum, and a reflection function is imparted to the scattering plate 2. FIG. 15(a) is a side view of other scattering plate related to Embodiment 1 and FIG. 15(b) is a plan view of other scattering plate related to Embodiment 1.

In Embodiment 1, the substrate 4 of the point light sources in which the plurality of point light sources 3 are mounted is provided in parallel along two facing side planes 1c of the housing 1, but when adequate luminance is obtained, the point light sources 3 may be arranged along the one side plane 1c among the four side planes 1c of the housing 1 as shown in FIG. 16. In this case, the reflecting plate 5 has a curved surface which decreases the gap between the reflecting plate 5 and the scattering plate 2 from the point light sources 3 to the reverse light source side so that luminance of the display is uniform. FIG. 16 is a partial section view of other planar light source device related to Embodiment 1 in which the point light sources are provided only at one side of the housing.

Figure 20:
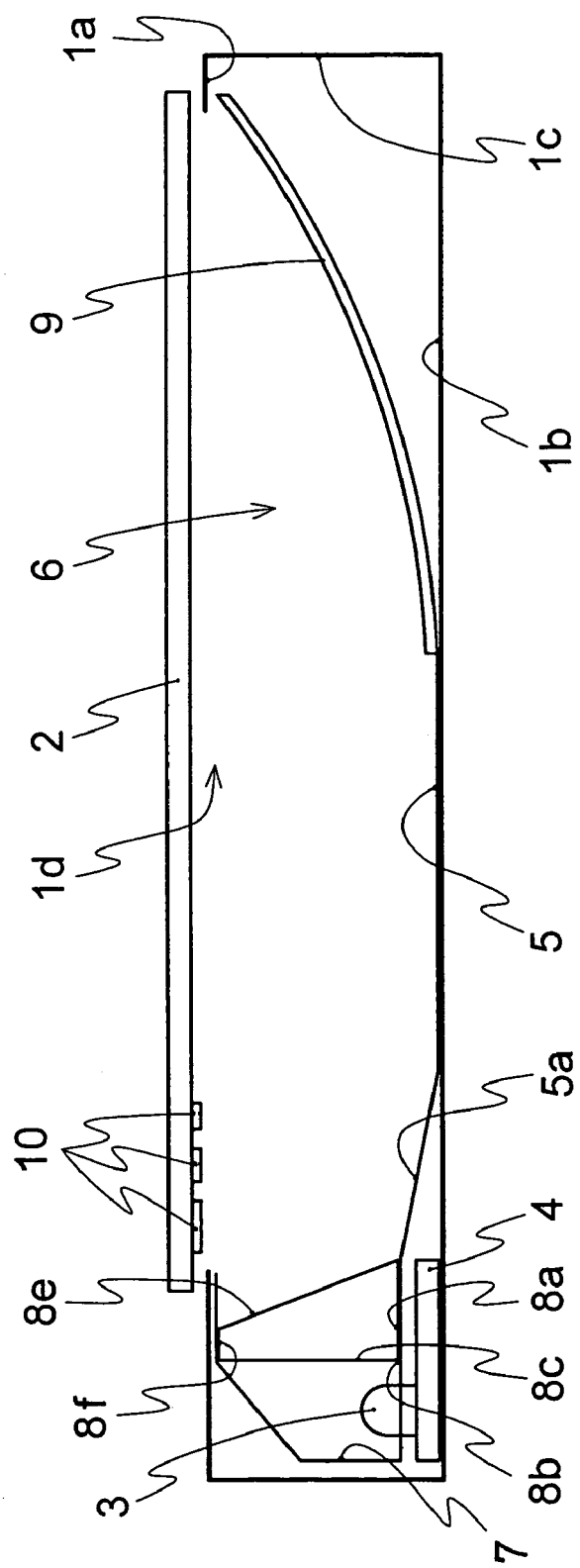
FIG. 20 is a partial section view of other planar light source device related to Embodiment 1 in which the reflecting plate providing the point light sources only at one side plane of the housing has the first slant portions.

Furthermore, as shown in FIG. 20, the reflecting plate 5 has the first slant portion 5a in which the gap between the reflecting plate 5 and the scattering plate 2 is increased from the point light sources 3 to the reverse light source side, and a curved surface in which the gap between the reflecting plate 5 and the scattering plate 2 is decreased from the point light sources 3 to the reverse light source side. FIG. 20 is a partial section view of other planar light source device related to Embodiment 1 in which the reflecting plate providing the point light sources 3 only at one side face of the housing has the first slant portion.

In Embodiment 1, a square pole whose section is trapezoidal is used as the refractive element 8, but it is not limited to the trapezoidal shape so far as radiating lights from the refractive element by the irradiating light with an incident angle in which luminance is the maximum among light distribution of irradiating lights for the refractive element can be refracted to the bottom face 1b side of the housing 1.

Figure 17A:
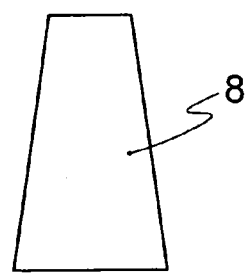
FIGS. 17($a$) to 17($d$) are partial section views of other refractive element related to Embodiment 1.
Figure 17B:
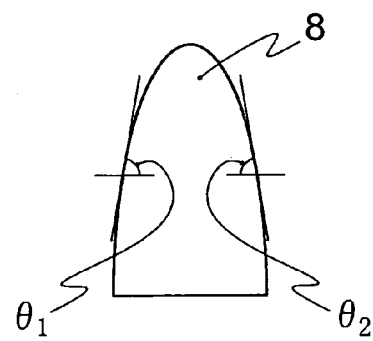
Figure 17C:
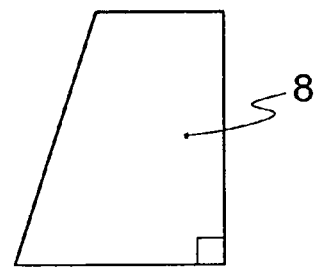
Figure 17D:
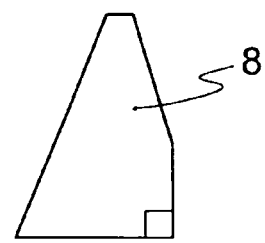

Hereat, when the upper part of the page of FIGS. 17(a) to 17(d) is set as the top face 1a side of the housing 1 and the left side is set as the point light sources 3 side, the refractive element 8 is a trapezoidal shape in which the lower side of the section of the refractive element 8 is longer than the upper side, for example, as shown in FIG. 17(a), and the irradiated plane and the radiating plane are an oblique shape together; therefore surface reflection on the irradiated plane is increased, the radiating light from the scattering plate 2 nearby the light source is reduced, and the bright portion nearby the light source and the unevenness of colors can be reduced. Further, the irradiated plane is slanted to a right side against the lower side and surface reflection on the irradiated plane is increased; therefore the unevenness of luminance and the unevenness of chromaticity of the radiating light from the refractive element 8 in the arrangement direction of the point light sources 3 can be further reduced.

Further, as shown in FIG. 17(*b*), since the irradiated plane and the radiating plane are composed by a curved surface for the section shape of the refractive element 8, it is possible to accurately control the section shape in accordance with the angle of light which is irradiated to the refractive element. For example, since the higher the incident position of the irradiating light to the refractive element 8 is, the larger the incident angle from the point light sources 3 is, it is desirable that the slant angle $\theta_1$ of the irradiated plane and the slant angle $\theta_2$ of the radiating plane are reduced, and it is desirable to set a curve in which the higher the incident position is, the smaller the tangential angle of a curved surface which carries out action equivalent to the slant angles of $\theta_1$ and $\theta_2$ is. The refractive element 8 is ideally a columnar lens which provides the image of the point light sources 3 at the lower portion of center of the hollow space 6.

As shown in FIG. 17(*c*), the refractive element 8 is a trapezoidal shape in which the lower side of the section of the refractive element 8 is longer than the upper side, the irradiated plane is slanted and the radiating plane is a shape vertical to the lower side; therefore surface reflection on the irradiated plane is increased, the radiating light from the scattering plate 2 nearby the light source is reduced, and the bright portion nearby the light source and the unevenness of colors can be reduced. Further, the irradiated plane is slanted to a right side against the lower side and the surface reflection on the irradiated plane is increased; therefore the unevenness of luminance and the unevenness of chromaticity of the radiating light from the refractive element 8 in the arrangement direction of the point light sources 3 can be further reduced. Further, when light which is reflected by the bottom face 8*a* of the refractive element 8 or the reflector at the bottom face 8*a* side among the light irradiated on the irradiated plane is irradiated on the radiating plane, an incident angle for the irradiated plane is large in comparison with a case that the irradiated plane is slanted against the lower side, and total reflection on the irradiated plane occurs easily. Thereby, the radiating light from the scattering plate nearby the light source is reduced, and the bright portion nearby the light source and the unevenness of colors can be reduced.

As shown in FIG. 17(*d*), the refractive element 8 is a pentagonal shape in which the lower side of the section of the refractive element 8 is longer than the upper side and about parallel, and is a composition in which the irradiated plane is slanted and the radiating plane are the first planes vertical to the lower side and the second planes slanted to the lower side. According to the shape, surface reflection on the irradiated plane is increased, and light which is radiated from the second planes of the radiating plane among lights parallel to the bottom face of the refractive element 8 which passes in the refractive element 8 is large in a radiation angle to the bottom face side on the radiation surface in comparison with light which is radiated from the first plane. Consequently, the radiating light from the scattering plate 2 nearby the light source is reduced, and the bright portion nearby the light source and the unevenness of colors can be reduced.

Thus, it is preferable that the shape of the refractive element is selected by the directivity of the point light sources and a refractive index ratio of the refractive element to a peripheral medium surrounding the refractive element. FIGS. 17(*a*) to 17(*d*) are partial section views of other refractive element related to Embodiment 1.

Figure 21A:
FIGS. 21(a) to 21(c) are luminance distribution charts in the partial section view of the II—II line of the planar light source device shown in FIG. 1 when the refractive element is changed.
Figure 21B:
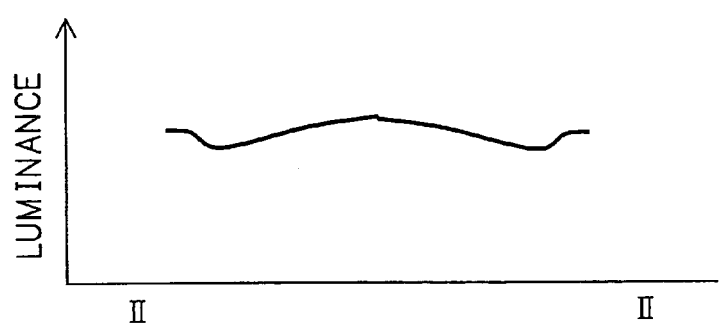
Figure 21C:
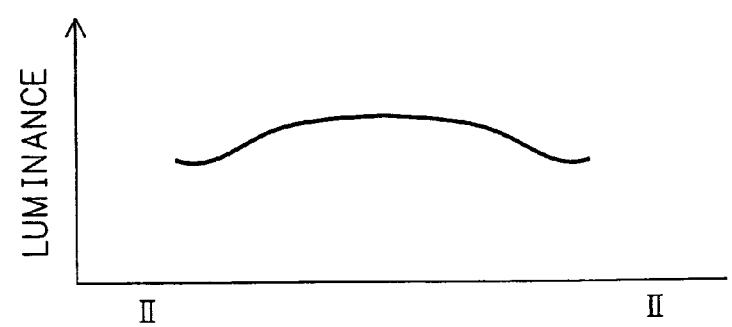

Hereat, FIG. 21(*a*) is a luminance distribution chart in the partial section view of the II—II line of the planar light source device shown in FIG. 1 when the refractive element is not provided, FIG. 21(*b*) is a luminance distribution chart in the partial section view of the II—II line of the planar light source device shown in FIG. 1 when the refractive element having a shape shown in FIG. 2 is provided, and FIG. 21(*c*) is a luminance distribution chart in the partial section view of the II—II line of the planar light source device shown in FIG. 1 when the refractive element having a shape shown in FIG. 17(*c*) is provided. When FIG. 21(*a*) is compared with FIG. 21(*b*) or 21(*c*), it is grasped that the bright portion nearby the point light sources 3 is remarkably reduced by using the refractive element 8. When FIG. 21(*b*) is compared with FIG. 21(*c*), it is grasped that the bright portion nearby the point light sources 3 is further reduced by making a shape that the irradiated plane 8*c* of the refractive element 8 is slanted to the hollow space 6 side from the bottom face 1*b* side of the housing 1 to the top face 1*a*. Further, when the refractive element 8 is not used, the unevenness of colors is observed nearby the point light sources 3, but when the refractive element 8 with a shape shown in FIG. 2 is used, the unevenness of colors is considerably reduced and when the refractive element 8 with a shape shown in FIG. 17(*c*) are used, the unevenness of colors is not observed.

Figure 22A:
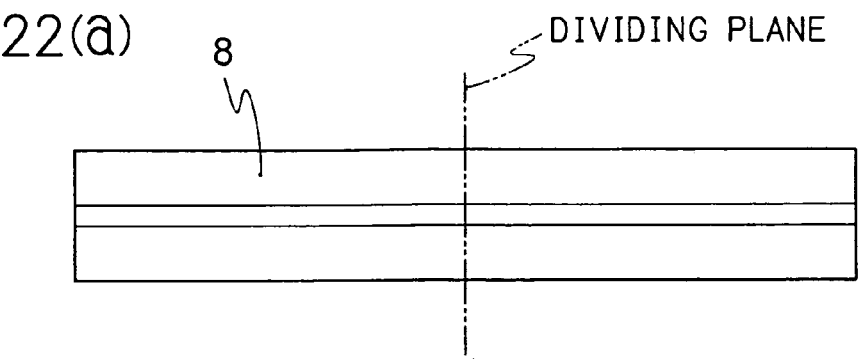
FIGS. 22(a) to 22(c) are illustration views for illustrating a case of dividing the refractive element into several parts so as to cross the direction of length hand of the refractive element.
Figure 22B:
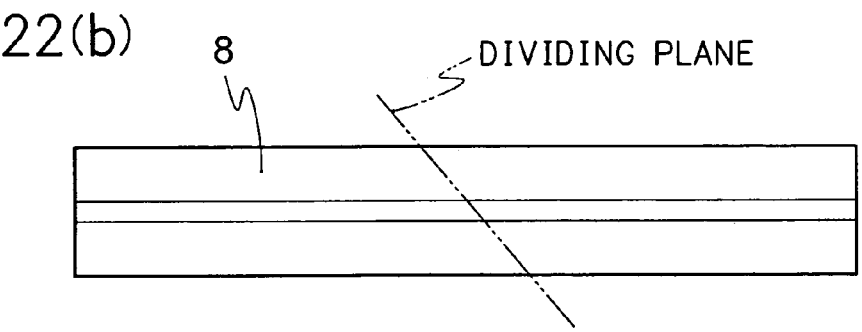
Figure 22C:
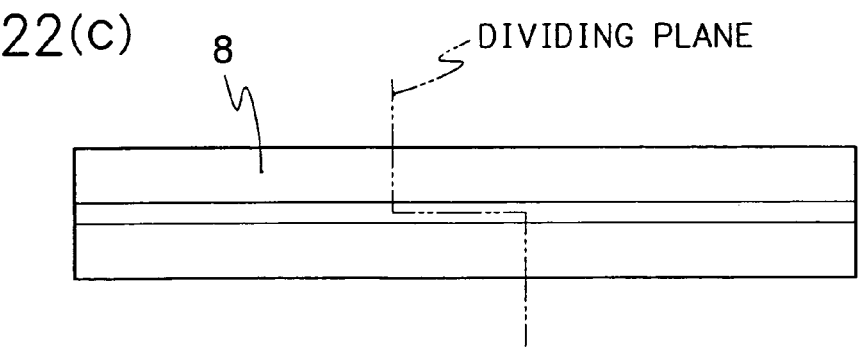

Further, the refractive element 8 is prepared by molding and the like, and when the length of the refractive element 8 is long, warpage and shrinkage are enlarged; therefore the refractive element 8 may be divided into several parts so as to cross the direction of length hand of the refractive element 8. For example, as shown in FIG. 22(*a*), it may be divided by a plane vertical to the direction of length hand of the refractive element 8. Further, as shown in FIG. 22(*b*), it may be divided by a plane oblique to the direction of length hand of the refractive element 8. Further, as shown in FIG. 22(*c*), it may be divided so that the section of the refractive element 8 is formed by a plurality of faces.

However, when space is generated between respective divided faces of the divided refractive elements 8, light which passes the space without being irradiated once in the refractive element 8 and reaches the hollow space 6 exists among light from the point light sources 3 in the division of the refractive element 8 as shown in FIG. 22(*a*) or 22(*b*); therefore it is preferable that the refractive element 8 is divided as shown in FIG. 22(*c*). FIG. 22(*a*) is an illustration view for illustrating a case of dividing the refractive element with a plane perpendicular to the direction of length hand of the refractive element shown in FIG. 17(*a*), FIG. 22(*b*) is an illustration view for illustrating a case of dividing the refractive element with a plane oblique to the direction of length hand of the refractive element shown in FIG. 17(*a*), and FIG. 22(*c*) is an illustration view for illustrating a case of dividing so that the section of the direction of length hand of the refractive element shown in FIG. 17(*a*) is formed with a plurality of planes.

Figure 24:
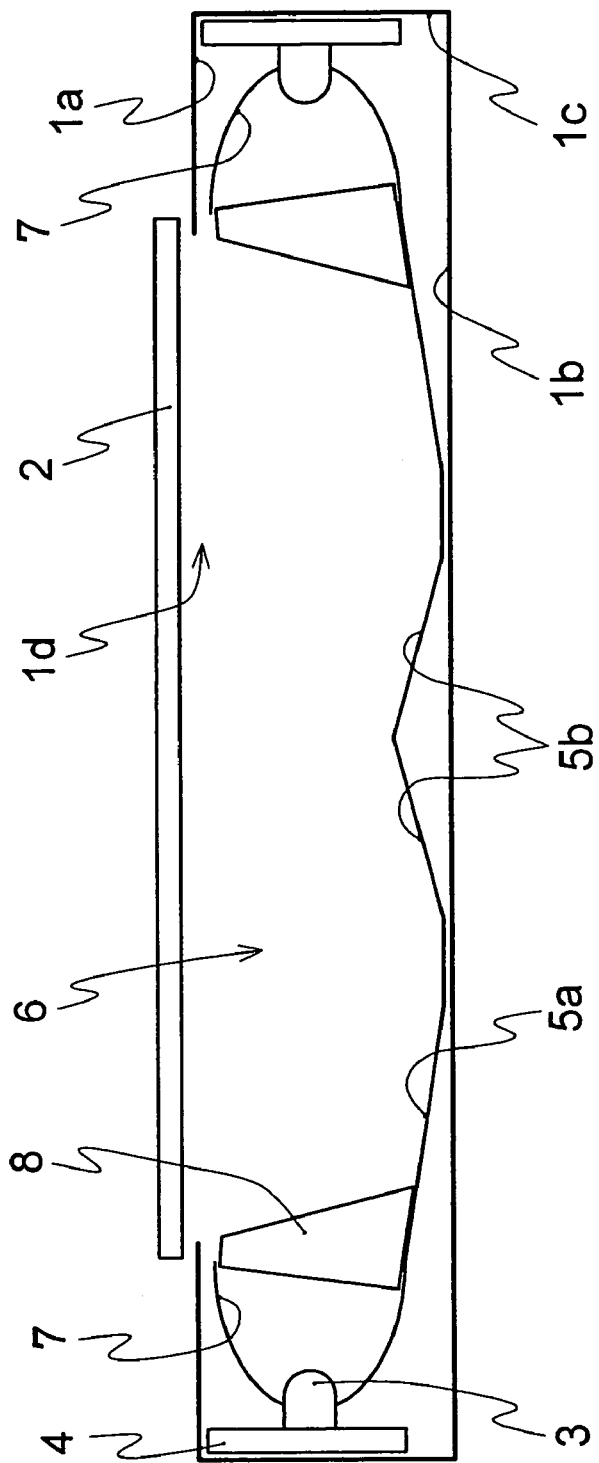
FIG. 24 is a partial section view of other planar light source device related to Embodiment 1 in which the point light sources are provided at the side of the housing.
Figure 25:
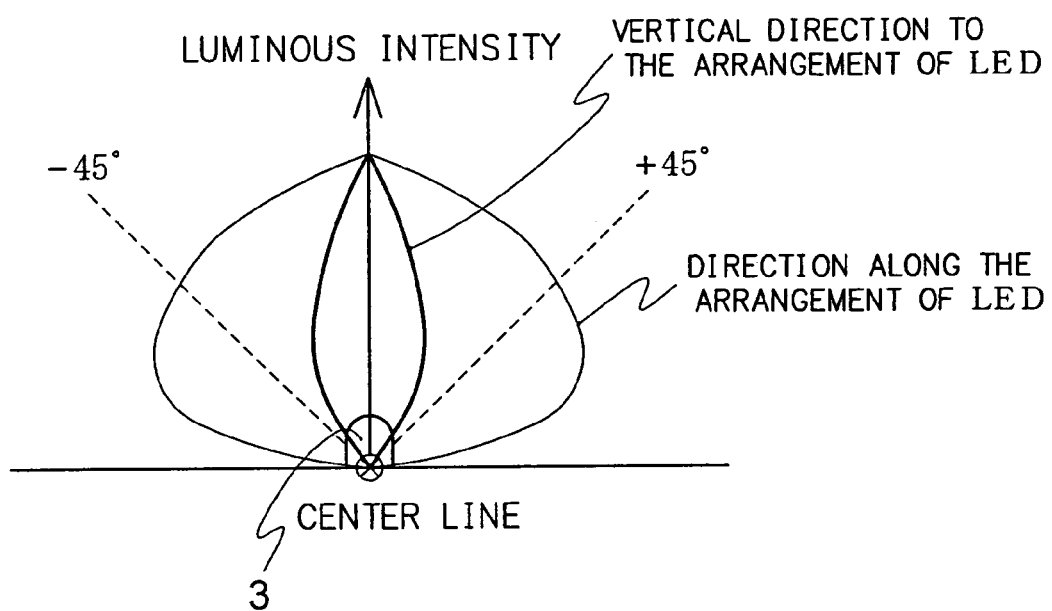
FIG. 25 is a view showing the light distribution of radiating light from other LED which is used as the point light sources related to Embodiment 1 of the present invention.

In the above illustration, the point light sources 3 are provided on the bottom face 1*b* of the housing 1 along the side face 1*c* side of the housing 1, but they are not limited to this arrangement. For example, as shown in FIG. 24, they may be provided at the side face 1*c* side of the housing 1. In this case, as shown in FIG. 25, it is preferable that the point light sources 3 has light distribution property that the light distribution to a direction providing the point light sources 3 is broad and directivity is a direction vertical to a direction providing the point light sources 3 and high in the central axis of LED. Since the light distribution of the point light sources 3 to a provision direction is broad, the unevenness of luminance and the unevenness of chromaticity caused by the studded point light sources 3 can be reduced. Further, since directivity is high to a direction vertical to a direction providing the point light sources 3, the radiating light from the scattering plate 2 nearby the point light sources 3 can be reduced in good controllability by the refractive element. FIG. 24 is a partial section view of other planar light source device related to Embodiment 1 in which the point light sources are provided at the side face of the housing. FIG. 25 is a chart showing the light distribution of radiating light from other LED which is used as the point light sources related to Embodiment 1 of the present invention.

Further, the point light sources 3 are provided along the short side of the housing 1, but it may be provided at the long side of the housing 1.

As described above, according to the planar light source device related to Embodiment 1 of the present invention, the refractive element 8 which is extended to the arrangement direction of the plurality of point light sources 3 between the point light sources 3 and the hollow space 6 refracts light with an incident angle at which luminance is the maximum among light distribution of irradiating light for the irradiated plane of the refractive element 8, to the bottom face 1b side of the housing 1. More preferably, since most of lights among the radiating light from the refractive element 8 can be radiated to the bottom face 1b side of the housing 1 by refracting light with an incident angle at which luminance is the maximum among light distribution of irradiating lights for the irradiated plane of the refractive element 8, to the bottom face 1b side of the housing 1, luminance nearby the point light sources is not heightened in comparison with luminance at a position far from the point light sources and the unevenness of luminance on a display surface can be suppressed.

EMBODIMENT 2

Figure 26:
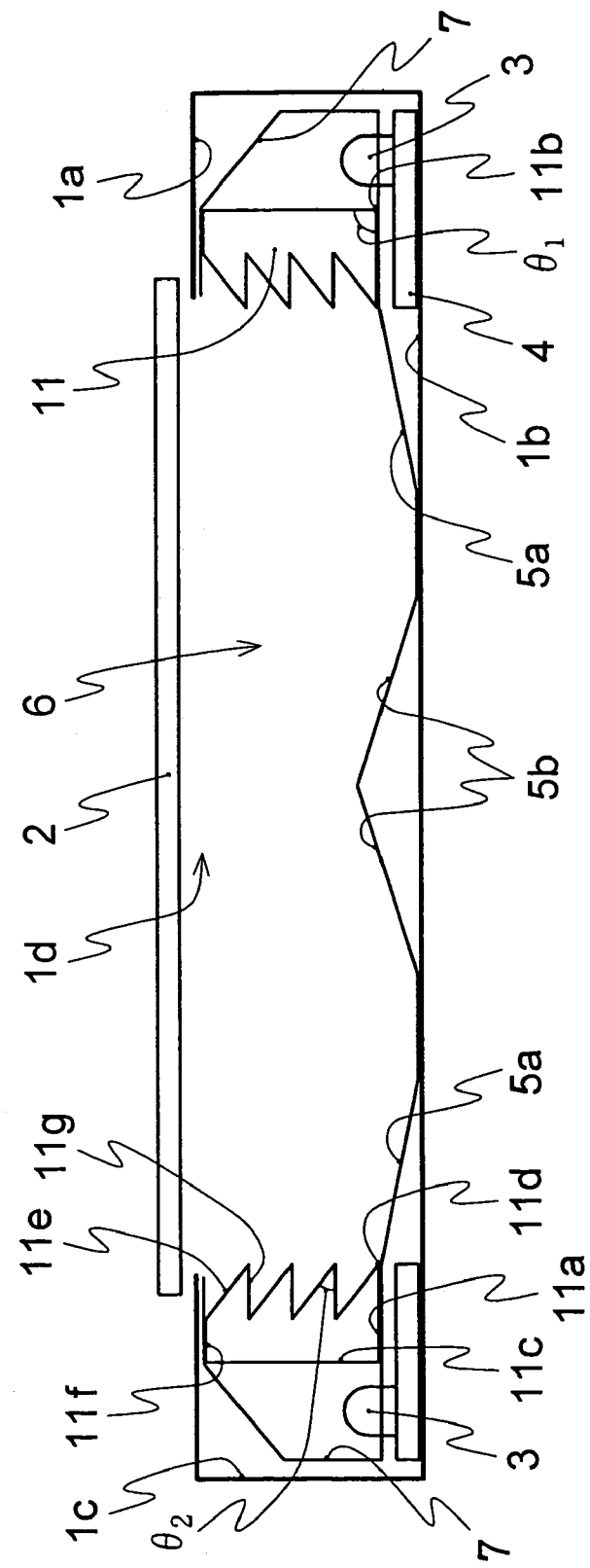
FIG. 26 is a partial section view of a planar light source device related to Embodiment 2 of the present invention.
Figure 27A:
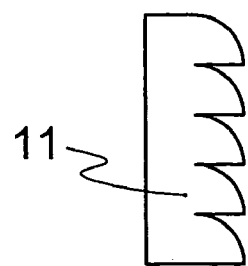
FIGS. 27(a) to 27(c) are partial section views of other refractive element related to Embodiment 2.
Figure 27B:
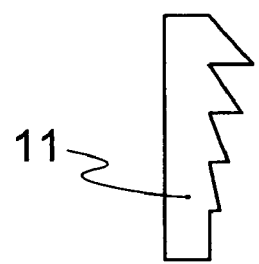
Figure 27C:
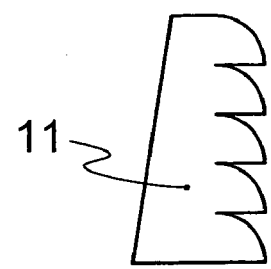

FIG. 26 is a partial section view of the planar light source device related to Embodiment 2 of the present invention. FIGS. 27(a) to 27(c) are partial section views of other refractive element related to Embodiment 2. In FIG. 26, the same numerals as FIGS. 1 to 25 show the same portions or equivalent portions, and their illustration is abbreviated. The refractive element 11 has the bottom face 11a which is nearly parallel to the bottom face 1b of the housing 1 or the scattering plate 2, the irradiated plane 11c which forms a fixed oblique angle $\theta_1$ at the reverse side from the first crista 11b to the bottom face 1b side of the housing 1 against the parallel bottom face 11a which passes the first crista 11b of the bottom face 11a in the point light sources 3 side, a plurality of faces 11g which are nearly parallel to the bottom face 11a, the radiating planes 11e which form a fixed oblique angle $\theta_2$ at the reverse side from the cristas 11d to the bottom face 1b side of the housing 1 against the parallel bottom faces 11g which pass the respective cristas 11d of a plurality of parallel planes 11g, and the facing planes 11f which face the bottom face 11a in parallel. It is only different from Embodiment 1 in that the refractive element 11 is composed of a plurality of parallel planes 11g and the radiating planes 11e. It exhibits the similar action effect as Embodiment 1 other than the action effect according to the refractive element 11 which is described later.

In Embodiment 1, since it is composed of the refractive element 8 being a single prism as FIG. 2, the thickness of the refractive element 8 is thickened when a small oblique angle $\theta_2$ is required, and miniaturization and weight saving are difficult. However, in Embodiment 2, as shown in FIG. 26, since the refractive element 11 is a composition having a prism array in which a lot of prisms are repeatedly arranged, the refractive element 11 can be thinned, and miniaturization and weight saving can be achieved as a device.

In Embodiment 2, when light from the point light sources 3 is irradiated on the planes 11g parallel to the refractive element 11, it is radiated to a direction different from a case that it is irradiated on the radiating plane 11e; therefore it becomes loss. In order to suppress the loss to a small level, the area of the radiating plane 11e is enlarged so as to reduce light which is irradiated on the parallel planes 11g. Namely, the parallel planes 11g has an angle which is nearly parallel to the bottom face 1b side of the housing or the bottom face 11a side of the refractive element 11.

Further, in Embodiment 2, the respective radiating planes 11e of the refractive element 11 are composed of planes in which the oblique angle $\theta_2$ coincided, but it is not limited to the shape so far as the radiating light from the refractive element 11 by the irradiating light with an incident angle at which luminance is the maximum among light distribution of irradiating lights for the refractive element 11 can be refracted to the bottom face 1b side of the housing 1.

Hereat, when the upper part of the page of FIGS. 27(a) to 27(c) is set as the top face 1a side of the housing 1 and the left side is set as the point light sources 3 side, the direction of the radiating light can be more accurately controlled in accordance with the irradiation light to the refractive element 11 by having a curved surface in which the oblique angle $\theta_2$ is changed to the radiating plane side, as shown in FIG. 27(a).

As shown in FIG. 27(b), the refractive element 11 can independently control the direction of the radiating light against the irradiating light at the top face 1a side and the irradiating light at the bottom face 1b side by arranging a shape in which the oblique angle $\theta_2$ of the radiating plane is gradually enlarged from the top face 1a to the bottom face 1b of the housing 1; therefore the radiating light can be more accurately controlled.

Further, as shown in FIG. 27(c), surface reflection on the irradiated plane is increased by making a shape in which the irradiated plane side in FIG. 27(a) is slanted, the radiating light from the scattering plate 2 nearby the light source is reduced, and the bright portion nearby the light source and the unevenness of colors can be reduced. Further, the unevenness of luminance and the unevenness of chromaticity of the radiating light from the refractive element 11 in the arrangement direction of the point light sources 3 can be further reduced by increasing surface reflection on the irradiated plane.

Thus, it is preferable that the shape of the refractive element is selected by the directivity of the point light sources and a refractive index ratio of the refractive element to a peripheral medium surrounding the refractive element.

EMBODIMENT 3

Figure 28:
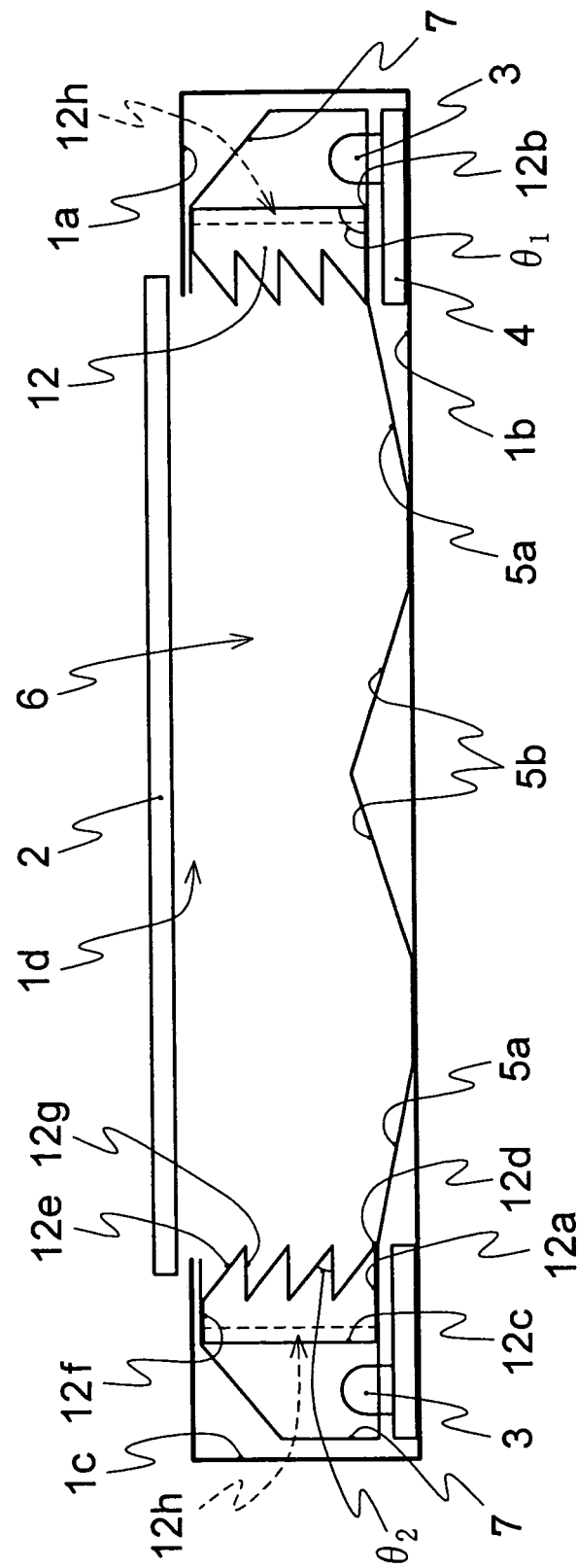
FIG. 28 is a partial section view of a planar light source device related to Embodiment 3 of the present invention.
Figure 29A:
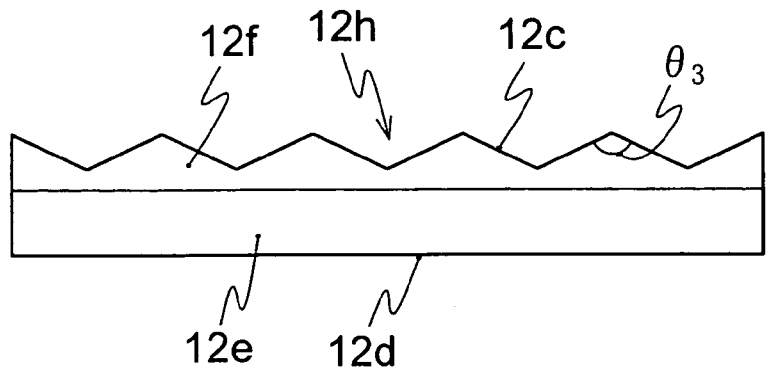
FIGS. 29(a) and 29(b) are evolution charts showing the refractive element related to Embodiment 3.
Figure 29B:
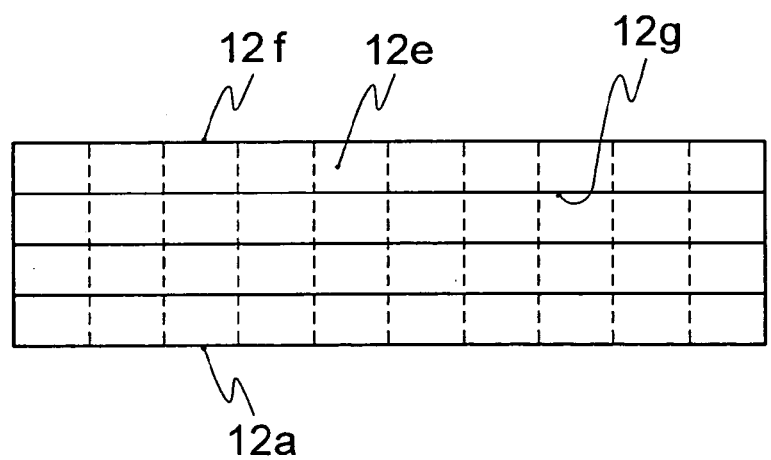
Figure 30:
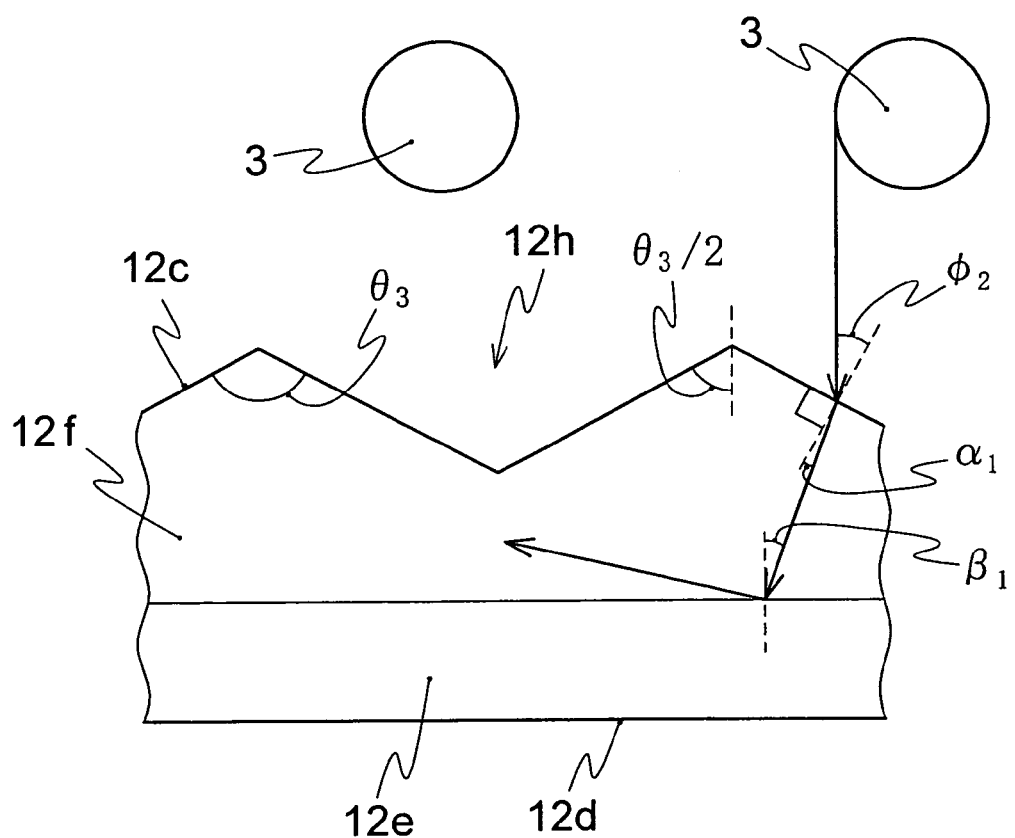
FIG. 30 is an illustration view showing light path possibly occurring when light transmitting in the refractive element is totally reflected on a radiating plane.

FIG. 28 is a partial section view of the planar light source device related to Embodiment 3 of the present invention. FIGS. 29(a) and 29(b) are evolution charts showing the refractive element related to Embodiment 3, FIG. 29(a) is a top view viewed from the top face side of the housing, and FIG. 29(b) is a frontal view viewed from the hollow space side. FIG. 30 is an illustration view showing a light path possibly occurring when light transmitting in the refractive element is totally reflected on a radiating plane. In FIGS. 28 to 30, the same numerals as FIGS. 1 to 27(c) show the same portions or equivalent portions, and their illustration is abbreviated.

The refractive element 12 has the bottom face 12a which is nearly parallel to the bottom face 1b of the housing 1 or the scattering plate 2, the irradiated plane 12c which forms a fixed oblique angle $\theta_1$ at the reverse side from the first crista 12b to the bottom face 1b side of the housing 1 against the bottom face 12a which passes the first crista 12b of the bottom face 12a to the point light sources 3 side, a plurality of faces 12g which are parallel to the bottom face 12a, the radiating plane 12e which forms a fixed oblique angle $\theta_2$ at the reverse side from the cristas 12d to the bottom face 1b side of the housing 1 against the parallel bottom faces 12g which pass the respective cristas 12d of a plurality of parallel planes 12g, and the facing planes 12f which face the bottom face 12a in parallel. Further, the irradiated plane 12c of the refractive element 12 has concave portions 12h which are extended to the thickness direction of the housing 1. In Embodiment 3, the concave portions 12h are composed by combining 2 planes, and the convex portions with an apex angle $\theta_3$ (0°<$\theta_3$<180°) are formed by the adjacent concave portions 12h.

Embodiment 3 is different from Embodiments 1 and 2 only in a point that the refractive element 12 has the concave portions 12h which are extended to the thickness direction of the housing 1. It exhibits the similar action effect as Embodiments 1 and 2 other than the action effect according to the concave portions 12h of the refractive element 12 described later.

In Embodiment 3, as shown in FIGS. 29(a) and 29(b), since the concave portions 12h which are extended to the thickness direction of the housing 1 are formed on the irradiated plane 12c of the refractive element 12 at the light source side, the aggregate of light from the plurality of point light sources 3 which are discrete against the whole irradiated plane 12c is spread to the direction of length hand inside the refractive element 12 for light irradiated on the irradiated plane 12c; therefore the unevenness of contrasting in the whole radiating plane of the refractive element 12 can be reduced. Since monochromatic lights comprising red, green and blue colors can be mixed, the generation of the unevenness of colors can be suppressed.

Hereat, when the refractive index of the refractive element 12 is set as n (n is larger than the refractive index 1 of air), an apex angle which is formed by the adjacent concave portions 12h of the refractive element 12 is set as $\theta_3$ (0°<$\theta_3$<180°) and an incident angle from the point light sources 3 to the irradiated plane 12c of the refractive element 12 is set as $\phi_2$ (−90°<+$\phi_2$<90°), it is preferable to satisfy the following inequality (6) in order to prevent loss by the total reflection in the radiating plane 12e of the refractive element 12.

$$1 > n \times \mathrm{Sin}\beta_1 = n \times \mathrm{Sin}(90° - \theta_3/2 - \alpha) \qquad (6)$$
$$= n \times \mathrm{Sin}(90° - \theta_3/2 - \mathrm{Sin}^{-1}((1/n) \times \mathrm{Sin}\phi_2)))$$

Further, in Embodiment 3, the refractive element 12 is composed by combination of 2 planes by the concave portions 12h and composed by forming the convex portions with apex angles $\theta_3$ (0°<$\theta_3$<180°) by the adjacent concave portions 12h, but it is not limited to the shape so far as light irradiated the irradiated plane 12c can be spread inside the refractive element 12 in a direction of length hand.

Figure 31A:
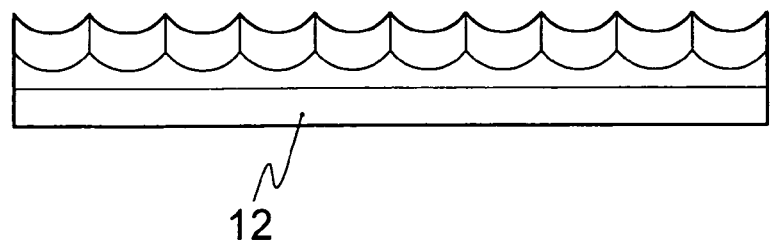
FIGS. 31(a) to 31(c) are evolution charts showing other refractive element related to Embodiment 3.
Figure 31B:
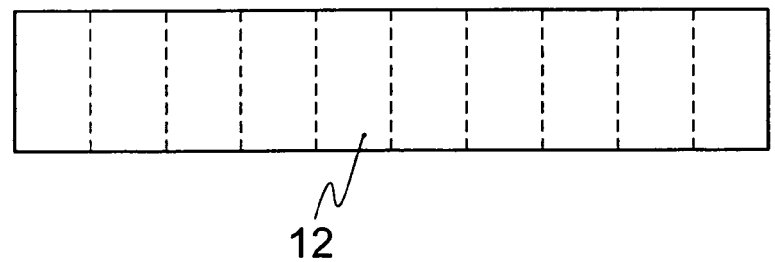
Figure 31C:
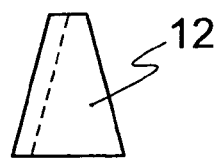

For example, as shown in FIGS. 31(a) to 31(c), since the concave portion is a curved surface which forms a concave lens and the convex portion of an apex angle is formed by adjacent concave portions, the refractive angle can be adjusted by the position of the concave portions and can be more accurately controlled. FIGS. 31(a) to (c) are evolution charts showing other refractive element related to Embodiment 3, FIG. 31(a) is a top view viewed from the top face side of the housing, FIG. 31(b) is a frontal view viewed from the hollow space side, and FIG. 31(c) is a side view viewed from the direction of length hand of the refractive element.

Further, the direction of length hand of the refractive element may be broaden by pasting a sheet which has an anisotropic scattering function in which scattering degree to a direction of length hand of a prism sheet and the refractive element whose concave portion is extended to the thickness direction of the housing is larger in comparison with the scattering degree to a short direction, on the irradiated plane or the radiating plane of the refractive element.

Thus, it is preferable that the shape of the refractive element is selected by the directivity of the point light sources and a refractive index ratio of the refractive element to a peripheral medium surrounding the refractive element.

EMBODIMENT 4

Figure 32:
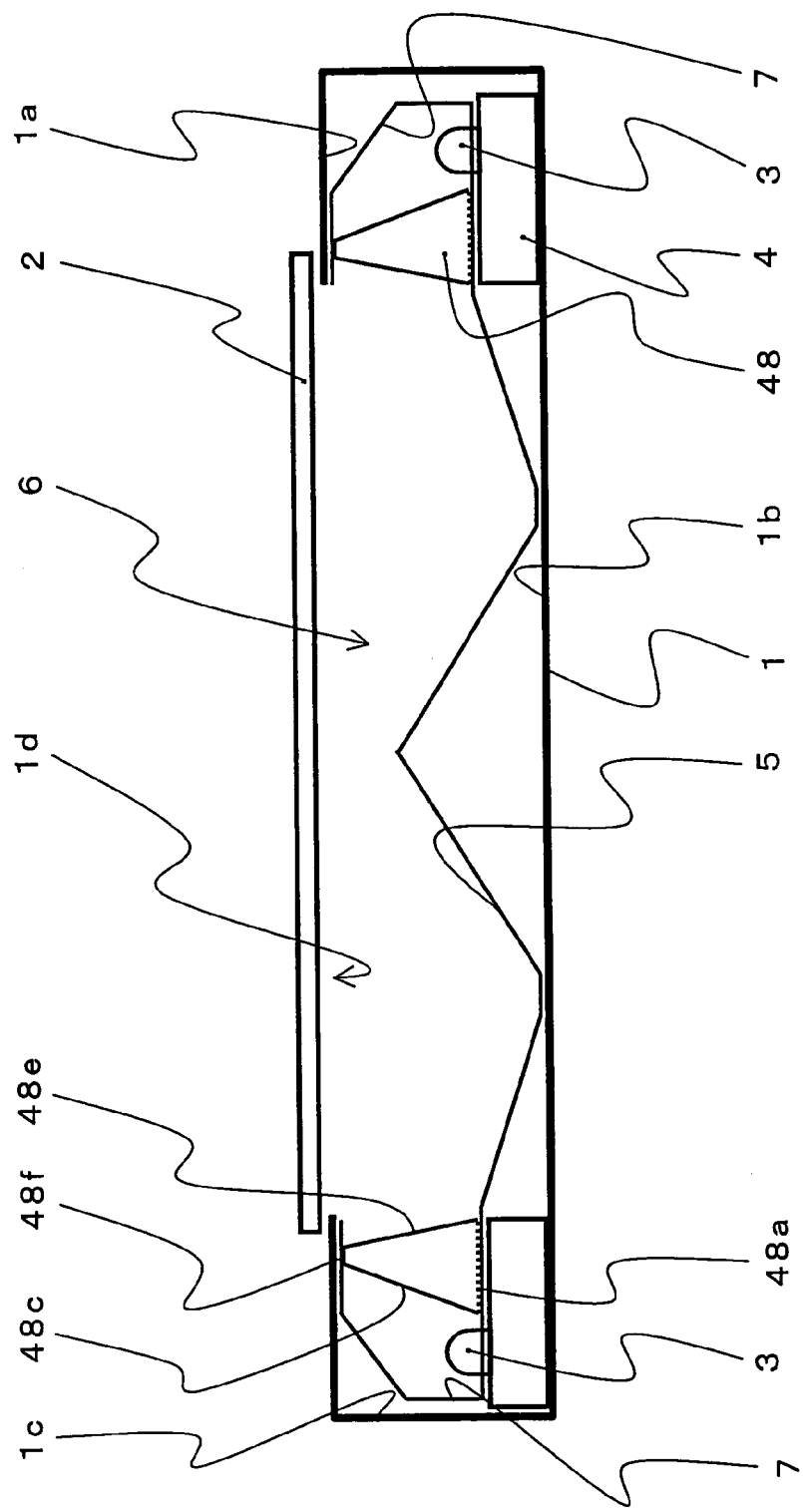
FIG. 32 is a section view of a planar light source device related to Embodiment 4 of the present invention.
Figure 33A:
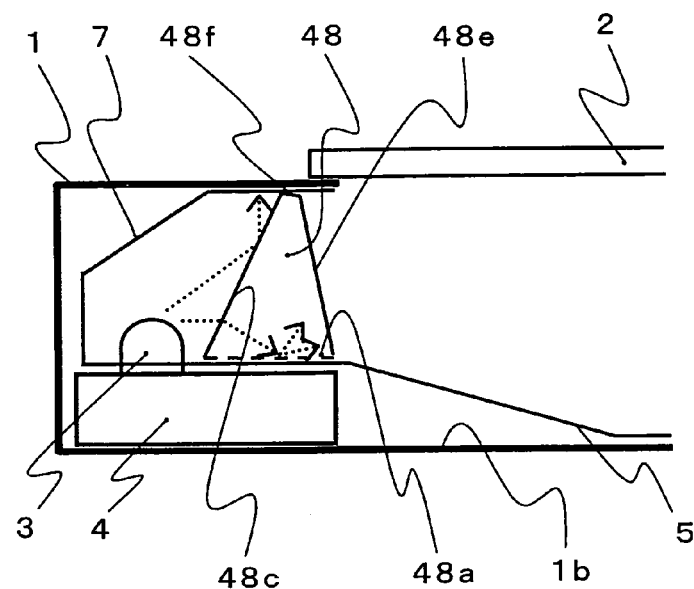
FIG. 33(a) is a magnified view nearby the refractive element related to Embodiment 4 of the present invention.
Figure 33B:
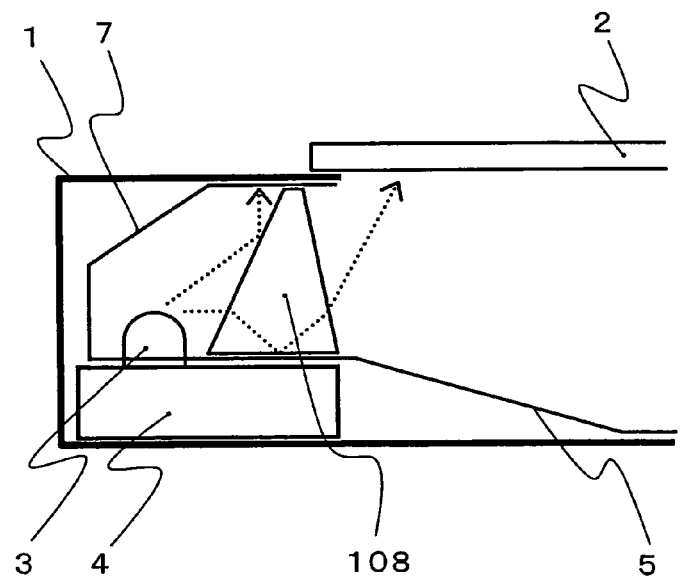
FIG. 33(b) is a magnified view nearby the refractive element of FIG. 17(a)

FIG. 32 is a section view of the planar light source device related to Embodiment 4 of the present invention. FIGS. 33(a) and 33(b) are illustration views for illustrating action of the refractive element, FIG. 33(a) is a magnified view nearby the refractive element related to Embodiment 4 of the present invention, and FIG. 33(b) is a magnified view nearby the refractive element of FIG. 17(a). In FIGS. 32 to 33(b), the same numerals as FIGS. 1 to 31(c) show the same portions or equivalent portions, and their illustration is abbreviated. Embodiment 4 is different from Embodiment 1 only in a point that the shape of the refractive element 48 described later and the bottom face 48a of the refractive element 48 are a rough surface, and it exhibits the similar action effect as Embodiment 1 other than the action effect according to the refractive element 48.

The refractive element 48 in Embodiment 4 has the bottom faces 48a which are provided along the arrangement direction of the plurality of point light sources 3 between the point light sources 3 and the hollow space 6, and are nearly parallel to the bottom face 1b of the housing 1, the facing portions 48f which face the bottom faces 48a in parallel, the irradiated plane 48c which is brought in contact with the facing portions 48f and the bottom faces 48a and slanted to the hollow space 6, and the radiating plane 48e which is brought in contact with the facing portions 48f and the bottom faces 48a and slanted to the point light sources 3. Further, the bottom faces 48a are rough faces on which fine unevenness is provided as a light scattering means. Further, the refractive element 48 is prepared with a transparent resin such as acryl or glass.

The refractive element 48 refracts and radiates light which is irradiated directly from the point light sources 3 or through the reflector 7, to the bottom face 1b side of the housing 1. Further, it is preferable to adjust the slant of the irradiated plane 48c and the radiating plane 48e so as to refract and radiate light with an incident angle at which luminance is the maximum among the irradiating light on the irradiated plane 48c, from the opening portion id side of the housing 1 to the bottom face 1b side.

In Embodiment 4, as shown in FIG. 33(a), since the bottom faces 48a of the refractive element 48 are rough surfaces, light which reaches the bottom face of the refractive element 108 to be reflected and is radiated from the scattering plate 2 nearby the point light sources 3 can be broadened as FIG. 17(a) which is shown in FIG. 33(b), and the unevenness of luminance of the radiating light from the scattering plate 2 can be improved. Further, since light is also broadened to the direction of length hand of the refractive element 48 by being scattered and reflected on the bottom faces 48a, the unevenness of luminance and the unevenness of colors originated in that the point light sources 3 are discretely arranged can be also improved. Further, the portion of light is radiated from the bottom faces 48a, but is reflected by the reflector 7 and returns again to the inside of the refractive element 48 to be utilized.

In Embodiment 4, the bottom faces 48a of the refractive element 48 are rough surfaces as an optical scattering means, but the present invention is not limited to this arrangement.

Figure 34A:
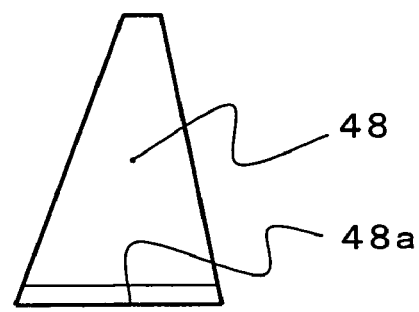
FIG. 34(a) is a section view of other refractive element related to Embodiment 4 and FIG. 34(b) is a frontal view viewed from the hollow space side of other refractive element related to Embodiment 4.
Figure 34B:
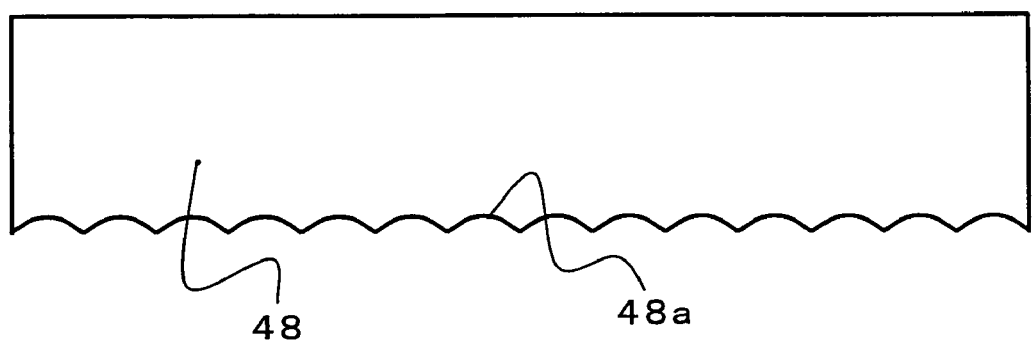

For example, as shown in FIGS. 34(a) and 34(b), the broadening of light reflected on the bottom faces 48a to the direction of length hand of the refractive element can be selectively controlled by forming grooves which are extended to a horizontal direction of the refractive element 48 on the bottom faces 48a of the refractive element 48. Consequently, the unevenness of luminance and the unevenness of colors originated in that the point light sources 3 are discretely arranged can be also improved. FIG. 34(a) is a section view of refractive element related to Embodiment 4 and FIG. 34(b) is a frontal view viewed from the hollow space side of other refractive element related to Embodiment 4.

Figure 35A:
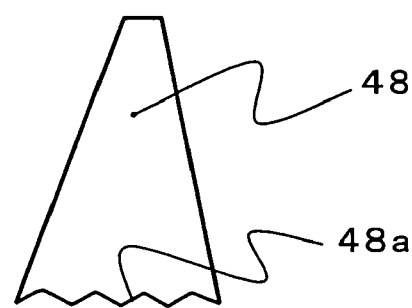
FIG. 35(a) is a section view of further other refractive element related to Embodiment 4 and FIG. 35(b) is a frontal view viewed from the hollow space side of further other refractive element related to Embodiment 4.
Figure 35B:
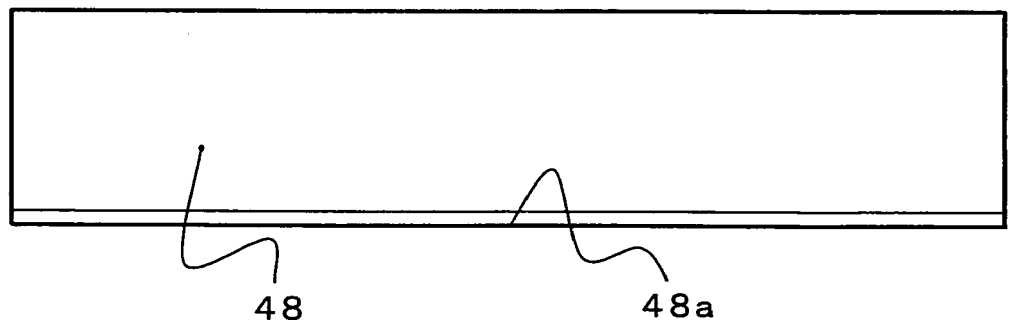

As shown in FIGS. 35(a) and 35(b), the broadening of light reflected on the bottom faces 48a to the horizontal direction of the refractive element can be selectively controlled by forming grooves which are extended to the direction of length hand of the bottom faces 48a of the refractive element 48. Consequently, it can be mitigated that luminance is heightened nearby the point light sources 3 and the unevenness of luminance can be improved. FIG. 35(a) is a section view of refractive element and FIG. 35(b) is a frontal view viewed from the hollow space side of refractive element.

As the light scattering means, a scattering reflection sheet such as a scattering sheet and a white sheet can be pasted on the bottom faces 48a of the refractive element 48. Further, an anisotropic scattering sheet in which scattering degree is different to an orthogonal direction can be pasted. The broadening of light to the direction of length hand and the horizontal direction of the refractive element can be independently controlled by using the anisotropic scattering sheet and the unevenness of luminance and the unevenness of colors nearby light injection can be effectively improved.

In Embodiment 4, the unevenness of luminance and the unevenness of colors nearby light injection are improved by providing the light scattering means on the bottom faces 48a of the refractive element 48, but in the present invention, the shape of the refractive element is not limited to this arrangement, and the unevenness of luminance and the unevenness of colors of the radiating light from the scattering plate 2 can be further improved by the effect shown in Embodiments 1 to 3 and the effect of Embodiment 4, by providing the light scattering means on the bottom faces of the refractive element having shapes which are shown in Embodiments 1 to 3.

In the Embodiments illustrated above, although the substrate 4 of the point light sources on which the plurality of point light sources 3 are provided in parallel along the 2 facing side planes 1c of the housing 1, the point light sources 3 can be provided along the one side face 1c among the 4 side planes 1c of the housing 1 if adequate luminance is obtained. If luminance is insufficient, the point light sources 3 may be provided along 3 or 4 of the side planes 1c.

In the Embodiments illustrated above, a regularly reflecting material which has a function of regularly reflecting light is used as the reflecting plate 5, but those which are obtained by roughening the portion of surface of the regularly reflecting material, or those in which a white resin sheet or a scattering reflecting portion coating a white color on a metal plate is provided on the portion of the reflecting plate can be also used. In particular, the luminance of a position separated from the point light sources 3 can be heightened by providing the scattering reflecting portion at a position separated from the point light sources 3 such as nearby the center of the bottom face 1b of the housing 1.

EMBODIMENT 5

Figure 36:
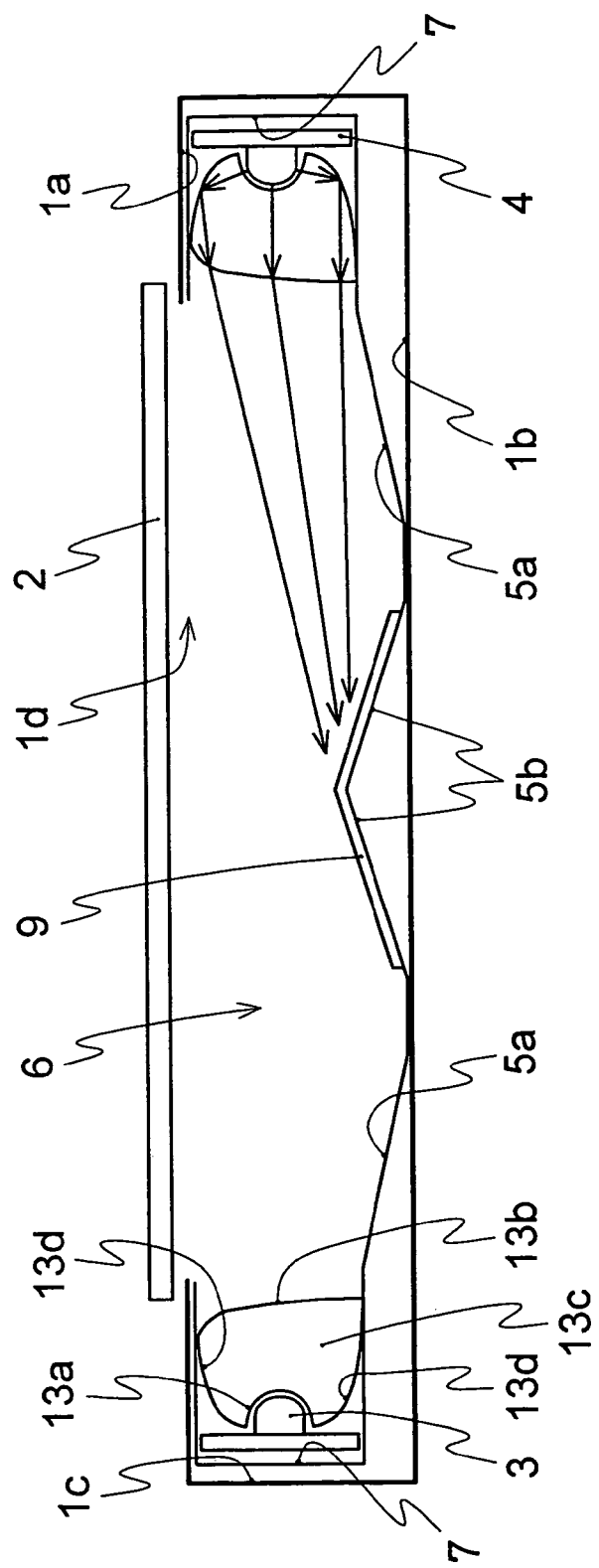
FIG. 36 is a partial section view of the planar light source device related to Embodiment 5 of the present invention.

FIG. 36 is a partial section view of the planar light source device related to Embodiment 5 of the present invention. In FIG. 36, the same numerals as FIGS. 1 to 35 show the same portions or equivalent portions, and their illustration is abbreviated. The refractive element 13 has at least one side plane 13d which connects the irradiated plane 13a with the radiating plane 13b and the side plane 13d reflects totally the irradiating light from the point light sources 3 to the refractive element 13. In particular, when LEDs having the light distribution in which luminance is the maximum in an adequate angle for the central axis of LEDs as shown in FIG. 5 are used as the point light sources 3, the side plane 13d preferably reflects totally light to a direction at which luminance is the maximum among light distribution of irradiating lights from the point light sources 3 to the refractive element 13. Further, when LEDs having the light distribution in which luminance is the maximum in the central axis of LEDs as shown in FIG. 25 are used as the point light sources 3, light to a direction at which luminance is the maximum among the light distribution of irradiating lights from the point light sources 3 to the refractive element 13 reaches the radiating plane 13b without being irradiated on the side plane 13d.

The side faces of the refractive element 13 in Embodiment 5 is composed of 2 facing planes 13c which are parallel for the side planes 1c of the housing 1 vertical to the direction of length hand of the refractive element 13 and 2 facing curved planes 13d which connect 2 facing planes.

The irradiated plane 13a is a semispherical shape which surrounds LEDs matching with the lens shape of a resin sealing the LED elements so that lights to all directions from LEDs being the point light sources 3 are irradiated nearly perpendicular to the irradiated plane 13a. Thereby, an incident angle at the irradiated plane 13a can be reduced (vertical incidence), and light irradiated on the irradiated plane 13a can be efficiently irradiated on the curved surfaces 13d or the radiating plane 13b.

Since the radiating plane 13b of the refractive element 13 is a curved surface and a shape in which the slant of the tangential line of the curved surface is gradually enlarged relative to the bottom face 1b of the housing 1 from the top face 1a of the housing 1 to the bottom face 1b, light radiated from any position of the radiating plane 13b reaches the lower portion of center of the hollow space 6, namely a far position at a reverse light source side.

Further, Embodiment 5 is different from Embodiments 1 to 3 only in a point that the side planes 13d of the refractive element 13 which totally reflects the irradiating light from the point light sources 3 to the refractive element 13 are provided, and it exhibits the similar action effect as Embodiments 1 to 3 other than the action effect according to the side faces of the refractive element 13 described below.

In Embodiment 5, the directivity of light is efficiently adjusted without radiating light from the side faces to the outside of the refractive element 13 by totally reflecting light on the curved surfaces 13d being the side planes of the refractive element 13, and the direction of light is refracted to the bottom face 1b side of the housing 1 on the radiating plane 13d to be radiated; therefore the bright portion nearby the light source can be reduced.

In Embodiment 5, the refractive element 13 is composed of 2 facing planes 13c which are parallel to the side planes 1c of the housing 1 vertical to the direction of length hand of the refractive element 13 and 2 facing curved surfaces 13d which connect 2 facing planes, but it is not limited to the shape so far as the irradiating light from the point light sources 3 to the refractive element 13 can be totally reflected on the side faces.

Figure 37A:
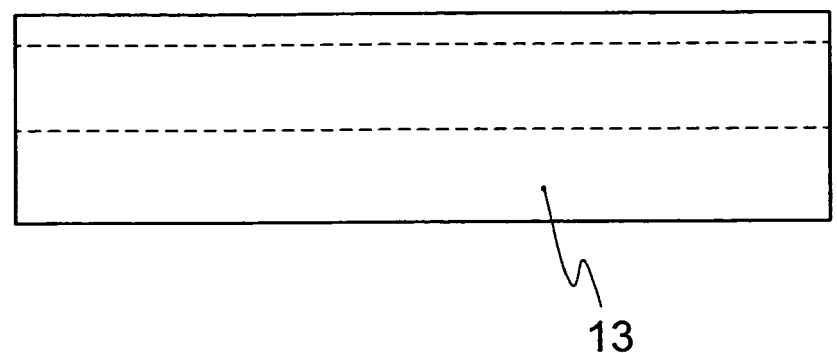
FIGS. 37(a) to 37(b) are evolution charts showing other refractive element related to Embodiment 5.
Figure 37B:
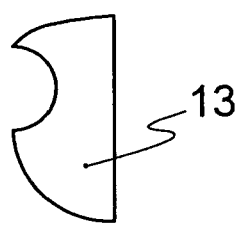

For example, as shown in FIGS. 37(a) and 37(b), the refractive element 13 comprises 2 facing planes which are parallel to the side planes 1c of the housing 1 vertical to the direction of length hand of the refractive element 13 and 2 obliquely curved surfaces which connect 2 facing planes. The 2 obliquely curved surfaces are slanted against the bottom face 1b side of the housing 1 so that gaps with the bottom face 1b or the top face 1a of the housing 1 are respectively decreased from the irradiated plane to the radiating plane, and an angle which is formed between the obliquely curved surface at the top faces 1a side and the radiating plane is larger in comparison with the obliquely curved surface at the bottom face 1b side. Thereby, light which is reflected on the obliquely curved surfaces can be adjusted, the radiating plane can be made as a flat plane vertical to the bottom face 1b of the housing 1 or the scattering plate 2; therefore the refractive element 13 can be thinned. FIGS. 37(a) and 37(b) are evolution charts showing other refractive element related to Embodiment 5, FIG. 37(a) is a frontal view viewed from the hollow space 6 side, and FIG. 37(b) is a side view viewed from the direction of length hand of the refractive element.

Further, a reflecting layer such as silver or aluminum is formed by deposition and the like on the side faces 13d of the refractive element 13 and light leakage from the side faces 13d may be reduced.

Thus, it is preferable that the shape of the refractive element is selected by the directivity of the point light sources and a refractive index ratio of the refractive element to a peripheral medium surrounding the refractive element.

Figure 38:
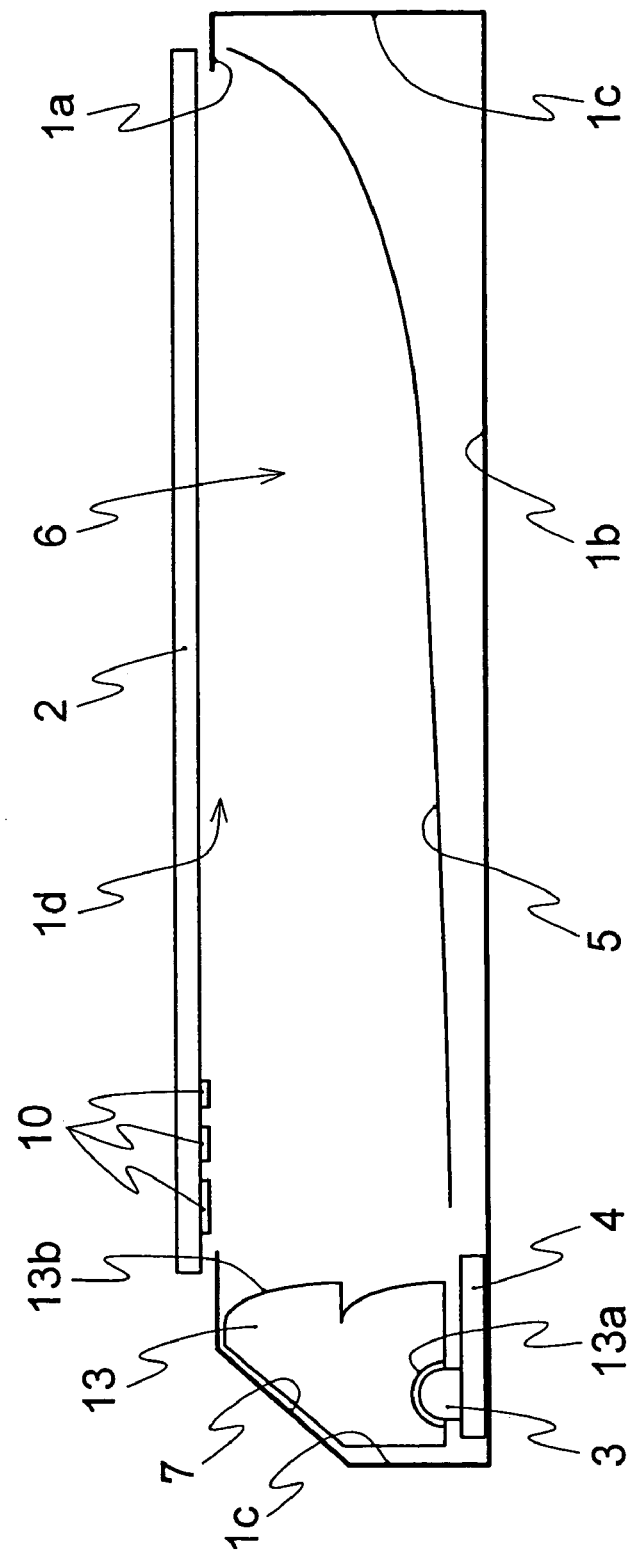
FIG. 38 is a partial section view of other planar light source device related to Embodiment 5.

Further, when the substrate 4 of the point light sources on which the plurality of point light sources 3 are provided only nearby one of the side planes 1c of the housing 1, it is necessary to efficiently introduce light from the point light sources 3 to the hollow space 6. Accordingly, as shown in FIG. 38, when the point light sources 3 are provided only nearby one of the side planes 1c of the housing 1, it is preferable because radiation from a plane other than the radiating plane 13b can be suppressed by using the refractive element 13 in Embodiment 5. FIG. 38 is a partial section view of other planar light source device related to Embodiment 5.

EMBODIMENT 6

Figure 39:
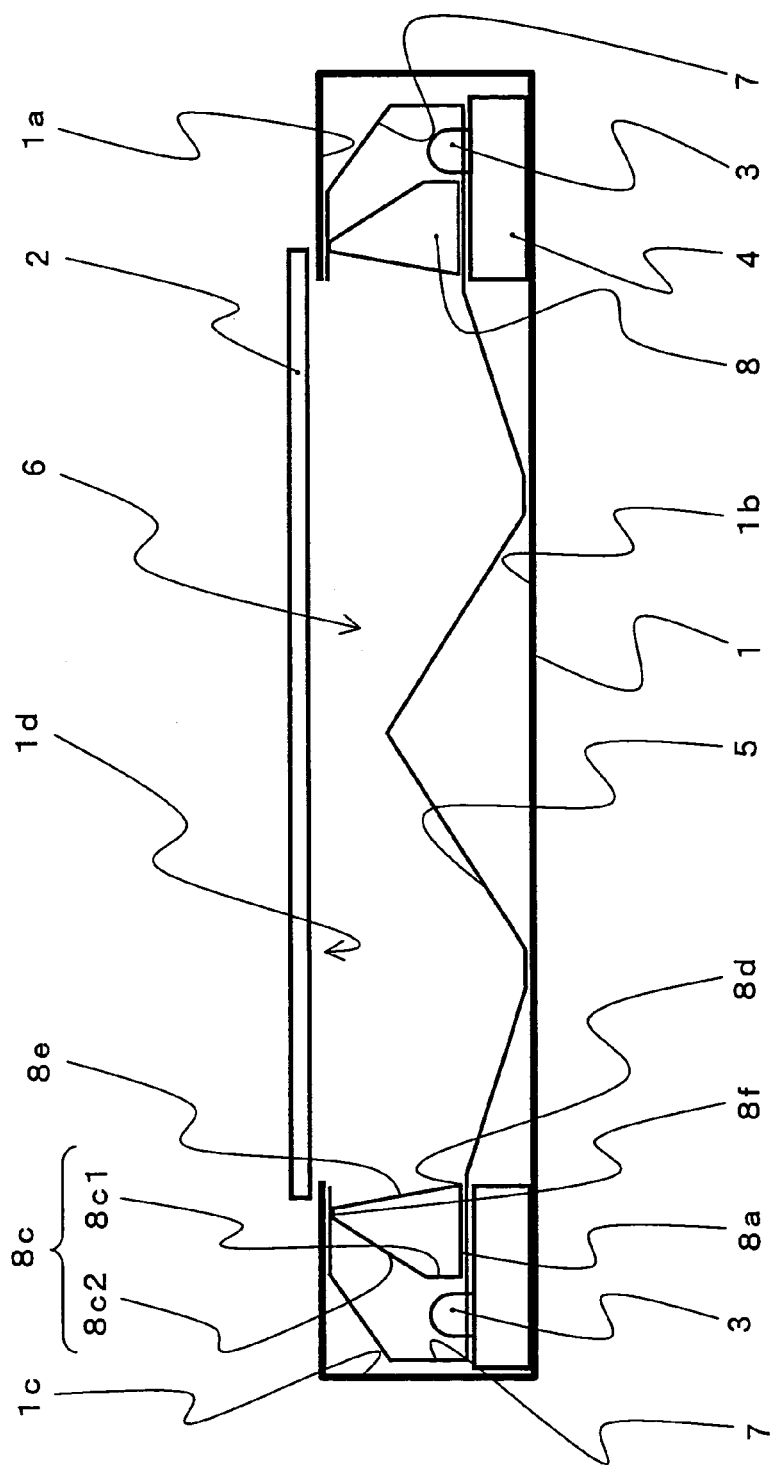
FIG. 39 is a section view of the planar light source device related to Embodiment 6 of the present invention.
Figure 40A:
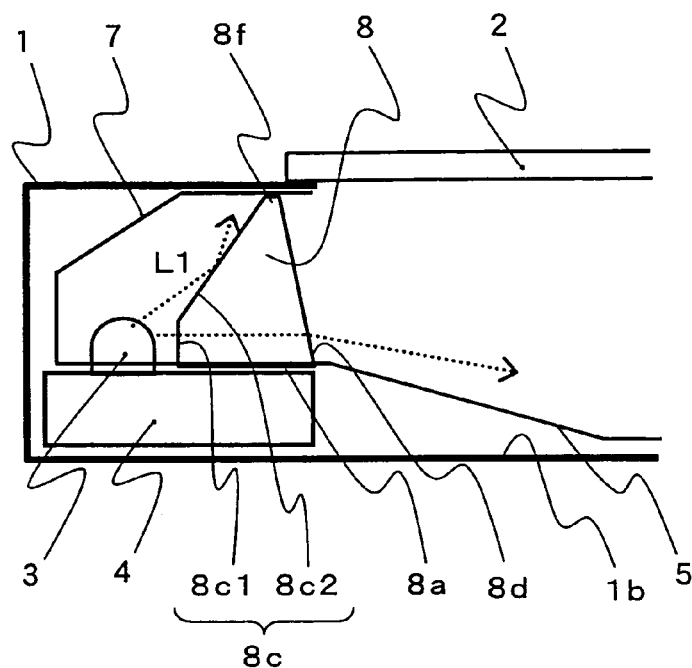
FIG. 40(a) is a magnified view nearby the refractive element related to Embodiment 6 of the present invention.
Figure 40B:
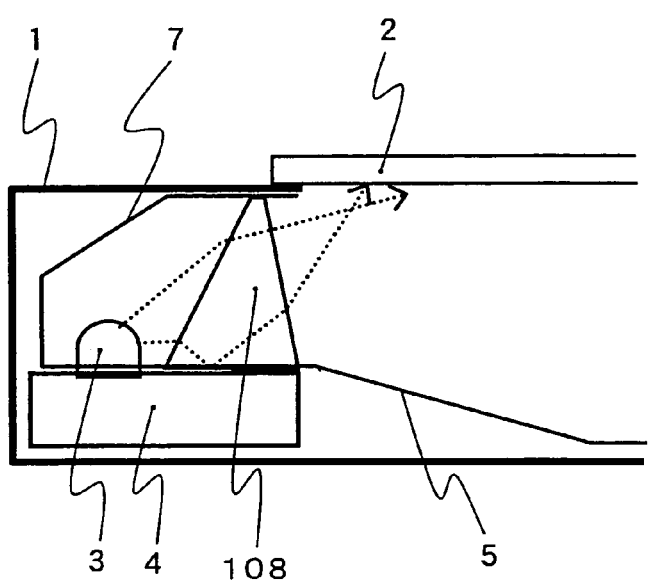
FIG. 40(b) is a magnified view nearby the refractive element of FIG. 17(a)
Figure 41:
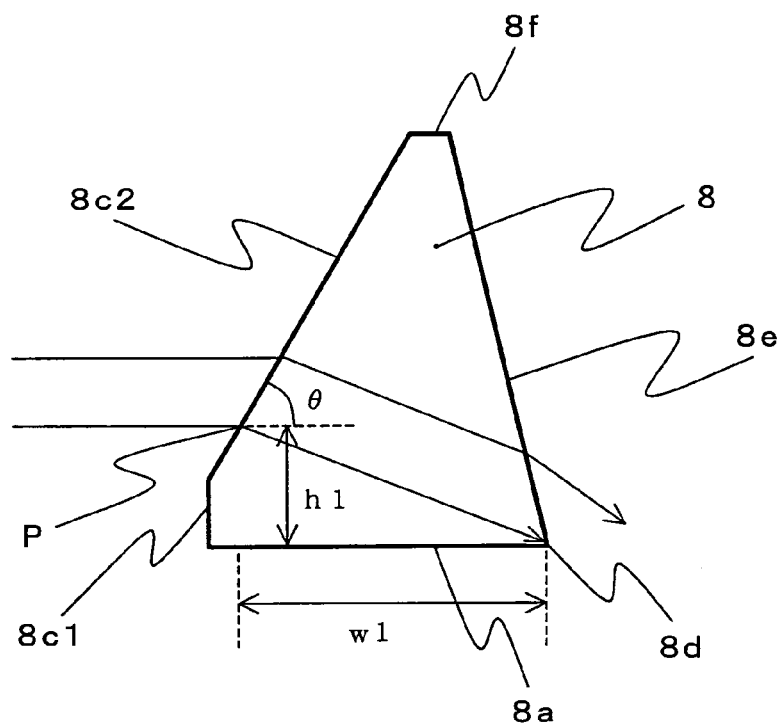
FIG. 41 is a section view of the refractive element related to Embodiment 6.

FIG. 39 is a section view of the planar light source device related to Embodiment 6 of the present invention and FIGS. 40(a) and 40(b) are views for illustrating the action effect of the refractive element. FIG. 40(a) is a magnified view nearby the refractive element related to Embodiment 6 of the present invention, and FIG. 40(b) is a magnified view nearby the refractive element of FIG. 17(a). In FIGS. 39 to 41, the same numerals as FIGS. 1 to 38 show the same portions or equivalent portions which are shown in FIGS. 1 to 38, and their illustration is abbreviated. It is only different from the Embodiment 1 that Embodiment 6 has a characteristic in the shape of the refractive element 8 described later, and it exhibits the similar action effect as Embodiment 1 other than the action effect according to the refractive element 8.

The refractive element 8 in the Embodiment 6 is provided along the arrangement direction of the plurality of point light sources 3 between the point light sources 3 and the hollow space 6, and the irradiated plane 8c which faces the point light sources 3 of the refractive element 8 has a shape in which an oblique angle is reduced to the hollow space side against the bottom face of the refractive element from the bottom face 1b of the housing 1 to the top face 1e and refracts and radiates the light which is irradiated on the refractive element 8, to the bottom face 1b side of the housing 1. Furthermore, it is preferably a shape that refracts light with an incident angle at which luminance is the maximum among the irradiating light for the irradiated plane 8c from the opening portion 1d side to the bottom face 1b side of the housing 1 to radiate.

The refractive element 8 has the irradiated plane 8c which comprises the first planes 8c1 nearly vertical to the bottom face 1b of the housing 1 and the second planes 8c2 which are linked with the first planes 8c1 and slanted to the hollow space 6 side, the bottom faces 8a nearly parallel to the bottom face 1b of the housing 1, the radiating plane 8e which passes the cristas 8d of the bottom faces 8a at the hollow space 6 side and is slanted to the point light sources 3 side, and the facing faces 8f which face in parallel to the bottom faces 8a. The refractive element 8 is prepared by transparent resin or glass. Further, in Embodiment 6, since the irradiated plane 8c is formed only by two planes, processing is easy.

Hereat, as shown in FIG. 40(a) in the present Embodiment, since the first planes 8c1 nearly vertical to the bottom face 1b are provided at the irradiated plane 8c, light which reaches the refractive element 108 can be suppressed as shown in FIG. 40(b). Accordingly, the light which is reflected on the bottom face 8a and radiated from the scattering plate 2 nearby the light source 3 is reduced, and the unevenness of luminance of the radiating light from the scattering plate 2 can be improved. Further, since planes which are linked with the first planes 8c1 and slanted to the hollow space 6 side are provided at the irradiated plane 8c as the second planes 8c2, light L1 which is surface-reflected among light reaching the second planes 8c2, returned to the reflector 7 side and is utilized again is increased. Consequently, the radiating light from the scattering plate 2 nearby the light source 3 is reduced, and the unevenness of luminance of the radiating light from the scattering plate 2 can be improved.

Hereat, the first planes 8c1 which compose the irradiated plane 8c are provided for reducing light which is emitted from the point light sources 3 as described above, refracted at the irradiated plane 8c and reaches the bottom face 8a. Accordingly, the height of the first planes 8c1 may be well a height or less at which light which is refracted on the irradiated plane 8c and reaches the crista 8d among the radiating lights with an angle (hereinafter, referred to as the maximum light distribution angle) at which an angle for the central axis of the point light sources is the maximum in the light distribution of lights which are irradiated from the point light sources is irradiated on the irradiated plane 8c. The height of the first planes 8c1 in the present Embodiment is illustrated using FIG. 41. In FIG. 41, the left side of the page space is the point light sources 3 side, and the right side is the hollow space 6 side. In the present Embodiment, since the maximum light distribution angle of the point light sources 3 is about 90° as shown in FIG. 5, light about parallel to the bottom face 8a is the light of the maximum light distribution angle. Hereat, a point in which light which is emitted from the point light sources 3, refracted on the second planes 8c2 and reaches the cristas 8d is irradiated on the second planes 8c2 is referred to as P. Although a part of the light which reaches the second planes 8c2 at the bottom face 8a side from the point P reaches the bottom face 8a, the light which reached the second planes 8c2 at the facing face 8f side from the point P does not reach the bottom face 8a and is irradiated from the radiating plane 8e. Namely, the first planes 8c1 may be provided at a range of the bottom face 8a side than the point P. Consequently, when the oblique angle of the second planes 8c2 is set as θ, the refractive index of the refractive element 8 as n1, the width of the refractive element as w1 and the height of the first planes 8c1 as h1, the range may be a range satisfying the following formula (7).

$$0 < h1 \leq w1/(\text{Tan}(\theta + \text{Sin}^{-1}(\text{Sin}(90-\theta)/n1))) \quad (7)$$

Further, in Embodiment 6, the irradiated plane 8c of the refractive element 8 is composed of 2 planes, but in the present invention, it is not limited to the shape so far as the irradiated plane 8c is a shape in which the oblique angle to the hollow space side is reduced against the bottom face of the refractive element from the bottom face 1b to the top face 1a of the housing 1.

Figure 42:
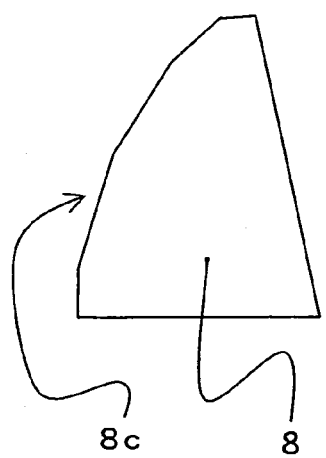
FIG. 42 is a section view of other refractive element related to Embodiment 6.
Figure 43:
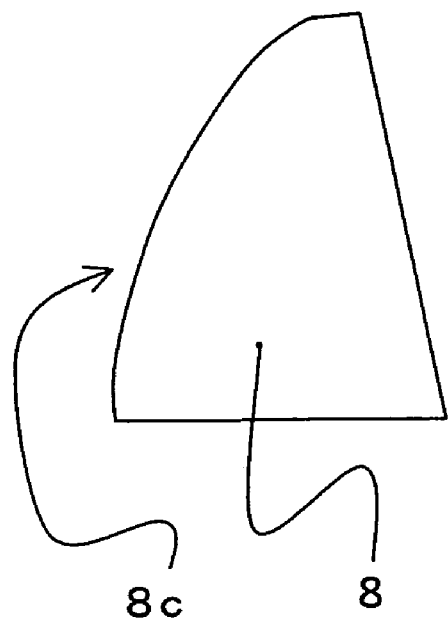
FIG. 43 is a section view of further other refractive element related to Embodiment 6.

For example, as shown in FIG. 42, the irradiated plane 8c of the refractive element 8 can be formed by polygon. Alternatively, as shown in FIG. 43, the irradiated plane 8c of the refractive element 8 can be formed by a curved surface. Thus, the direction of light can be more finely controlled by forming the irradiated plane with polygon or a curved surface.

EMBODIMENT 7

Figure 44:
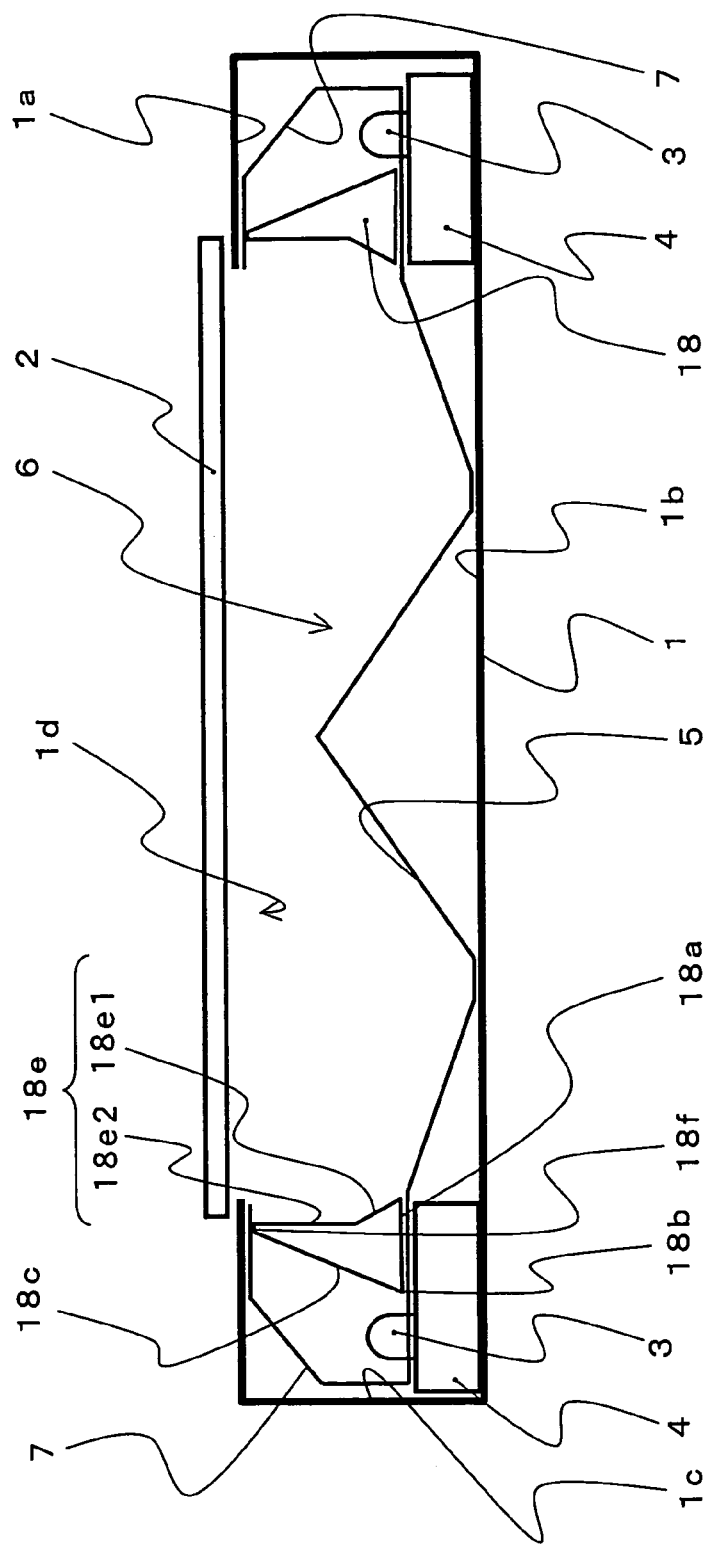
FIG. 44 is a section view of a planar light source device related to Embodiment 7 of the present invention.
Figure 45A:
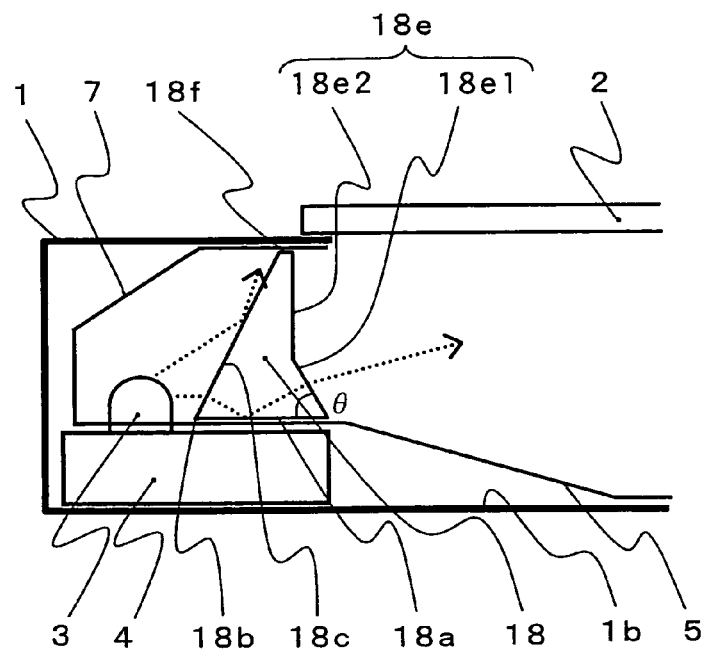
FIG. 45(a) is a magnified view nearby the refractive element related to Embodiment 7 of the present invention.
Figure 45B:
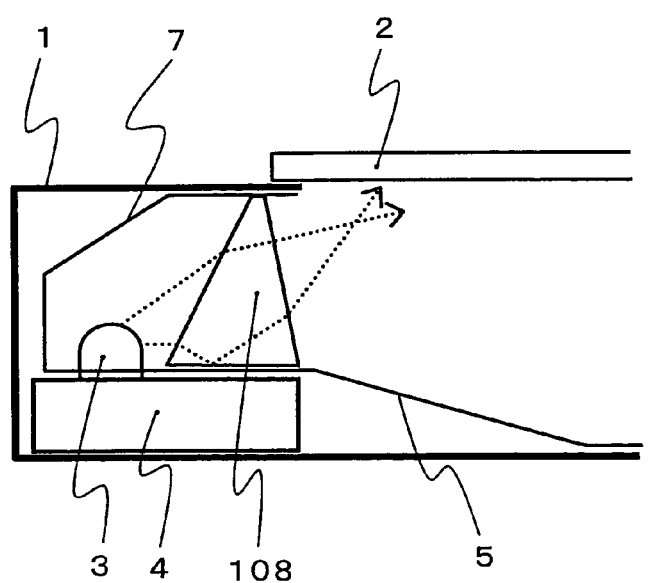
FIG. 45(b) is a magnified view nearby the refractive element of FIG. 17(a)
Figure 46:
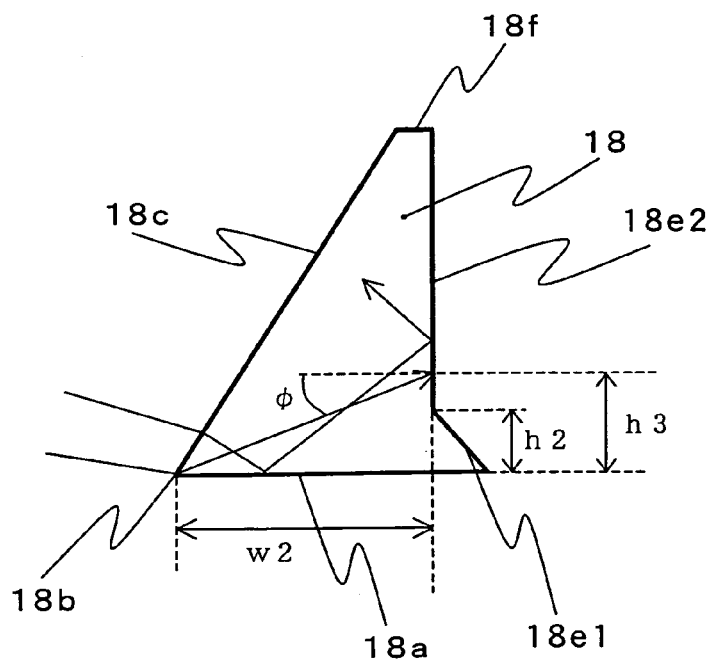
FIG. 46 is a section view of the refractive element related to Embodiment 7.

FIG. 44 is a section view of a planar light source device related to Embodiment 7 of the present invention and FIGS. 45(a) and 45(b) are views for illustrating the action effect of the refractive element. FIG. 45(a) is a magnified view nearby the refractive element related to Embodiment 7 of the present invention, and FIG. 45(b) is a magnified view nearby the refractive element of FIG. 17(a). FIG. 46 is a view for illustrating the shape of refractive element. In FIGS. 44 to 46, the same numerals as FIGS. 1 to 43 show the same portions or equivalent portions which are shown in FIGS. 1 to 43, and their illustration is abbreviated. Only the shape of the refractive element 18 in Embodiment 7 which is described later is different from Embodiment 1, and it exhibits the similar action effect as Embodiment 1 other than the action effect according to the refractive element 18.

The refractive element 18 in Embodiment 7 is provided along the arrangement direction of the plurality of point light sources 3 between the point light sources 3 and the hollow space 6, and the radiating plane 18e which faces the hollow space 6 of the refractive element 18 has a shape in which an oblique angle is enlarged to the point light sources side against the bottom face of the refractive element from the bottom face 1b of the housing 1 to the top face 1a and refracts and radiates the light which is irradiated on the refractive element 18, to the bottom face 1b side of the housing 1. Furthermore, it is more preferably a shape that refracts light with an incident angle at which luminance is the maximum among the irradiating light for the irradiated plane 18c from the opening portion 1d side to the bottom face 1b side of the housing 1 to radiate.

The refractive element 18 has the radiating plane 18e at the hollow space 6 side which comprises the first planes 18e1 which are slanted to the point light sources 3 side and the second planes 18e2 which are linked with the first planes 18e1 and nearly vertical to the bottom face 1b of the housing 1, the bottom faces 18a nearly parallel to the bottom face 1b of the housing 1, the irradiated plane 18c which passes the cristas 18d at the point light sources 3 side of the bottom faces 18a and is slanted to the hollow space 6 side, and the facing faces 18f which face in parallel to the bottom faces 18a. The refractive element 18 is prepared by transparent resin such as acryl or glass. In Embodiment 7, since the radiating plane 18e are formed only by two planes, processing is easy.

Hereat, as shown in FIG. 45(a) in Embodiment 7, since the radiating plane 18e is composed of the first planes 18e1 which are slanted to the point light sources 3 side and the second planes 18e2 which are nearly vertical to the bottom face 1b of the housing 1, the oblique angle θ of the radiating plane 18e at the bottom face 1b side can be reduced at a thickness equal to the refractive element 108 which is shown in FIG. 45(b). Consequently, the light reflected at the bottom face 18a can be refracted strongly to the bottom face 1b compared with the conventional refractive element 108, and the radiating light from the scattering plate 2 nearby the light source 3 is reduced, and the unevenness of luminance of the radiating light from the scattering plate 2 can be improved.

All of the light which reached the second planes 18e2 at a position which is a fixed height or more from the bottom face 18a among the light reflected on the bottom face 18a is totally reflected, and returns to the reflector 7 side to be utilized again. Accordingly, the first planes 18e1 may be provided at a height or less at which light which is reflected on the bottom face 18a is totally reflected on the second planes 18e2. The height of the first planes 18e1 in the present Embodiment is illustrated using FIG. 46. In FIG. 46, the left side of the page is the point light sources 3 side, and the right side is the hollow space 6 side. When an angle which is formed between the normal line of the second planes 18e2 and light which is reflected on the bottom face 18a and reached the second planes 18e2 is set as φ and the refractive index of the refractive element 18 is set as n2, light which satisfies the following formula (8) is totally reflected on the second planes 18e2.

$$\phi \geq \text{Sin}^{-1}(1/n) \quad (8)$$

Hereat, among the reflection light of φ=Sin⁻¹(1/n), when the maximum height of reaching level at the second planes 18e2 is set as h3 and the width of the crista 18b of the refractive element 18 and the second planes 18e2 is set as w2, the height h3 is represented by the following formula (9). Namely, light which reflected on the bottom face 18a and reached the second planes 18e2 at a height of h3 or more is totally reflected.

$$h3 = w2 \times \text{Tan}\phi \qquad (9)$$
$$= w2 \times \text{Tan}(\text{Sin}^{-1}(1/n))$$

Accordingly, when the height of the first planes 18e1 is set as h2, h2 may be well at h3 or less, and is a range shown by the following formula (10).

$$0 < h2 \leq w2 \times \text{Tan}(\text{Sin}^{-1}(1/n)) \qquad (10)$$

In Embodiment 7, the radiating plane 18e of the refractive element 18 is composed of 2 planes, but in the present invention, it is not limited to the shape so far as the radiating plane 18e is a shape in which the oblique angle to the point light sources side is enlarged against the bottom face of the refractive element from the bottom face 1b to the top face 1a of the housing 1.

Figure 47:
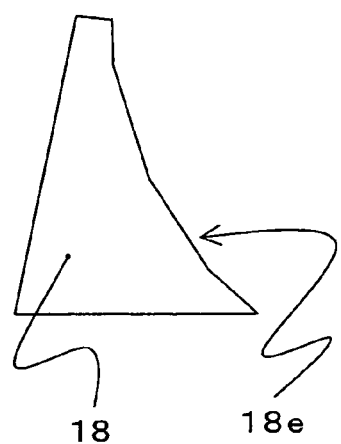
FIG. 47 is a section view of other refractive element related to Embodiment 7.
Figure 48:
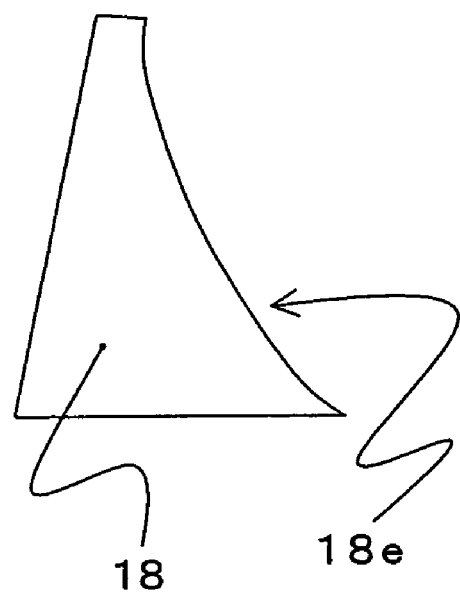
FIG. 48 is a section view of further other refractive element related to Embodiment 7.

For example, as shown in FIG. 47, the radiating plane 18e of the refractive element 18 can be formed by polygon. Alternatively, as shown in FIG. 48, the radiating plane 18e of the refractive element 18 can be formed by a curved surface. Thus, the direction of light can be more accurately controlled by forming the radiating plane with polygon or a curved surface.

EMBODIMENT 8

Figure 49:
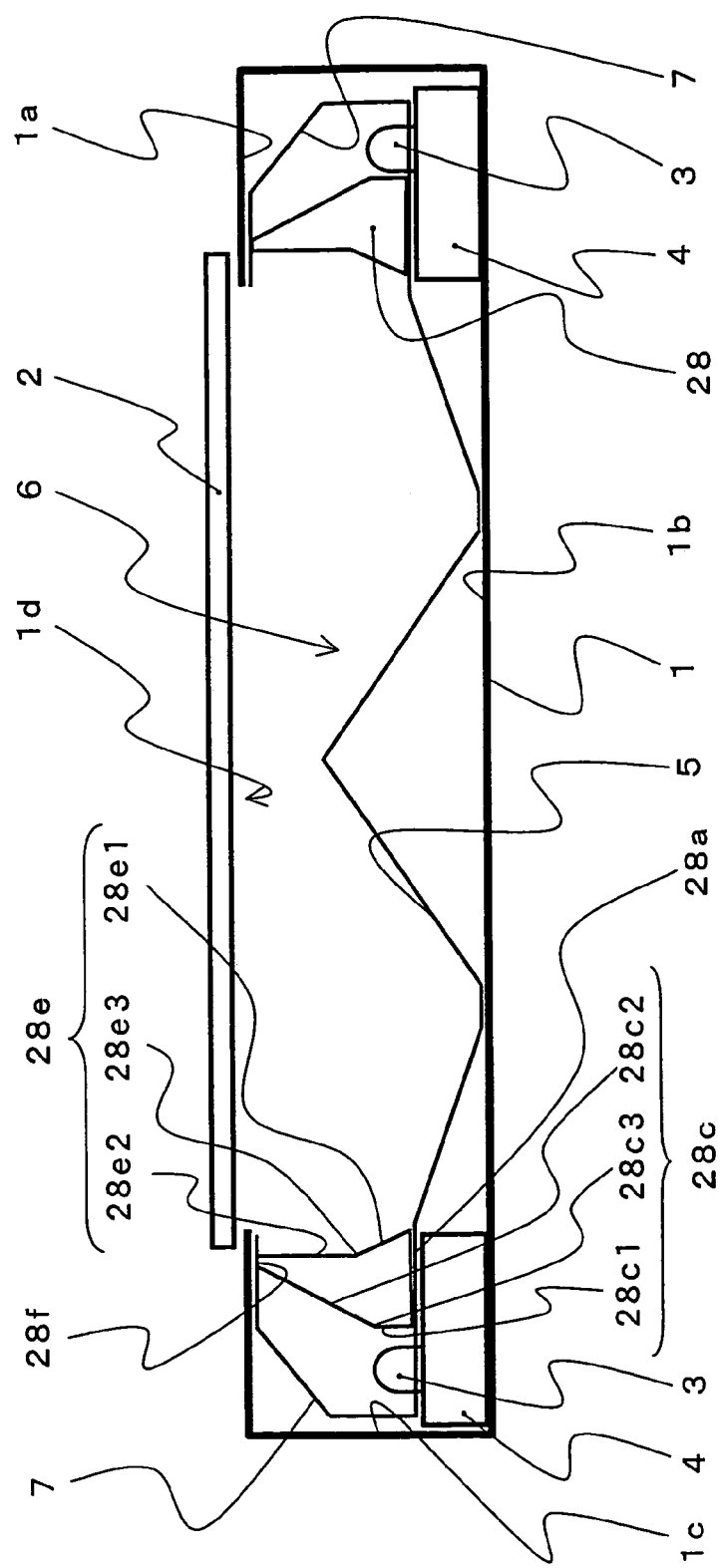
FIG. 49 is a section view of a planar light source device related to Embodiment 8 of the present invention.
Figure 50A:
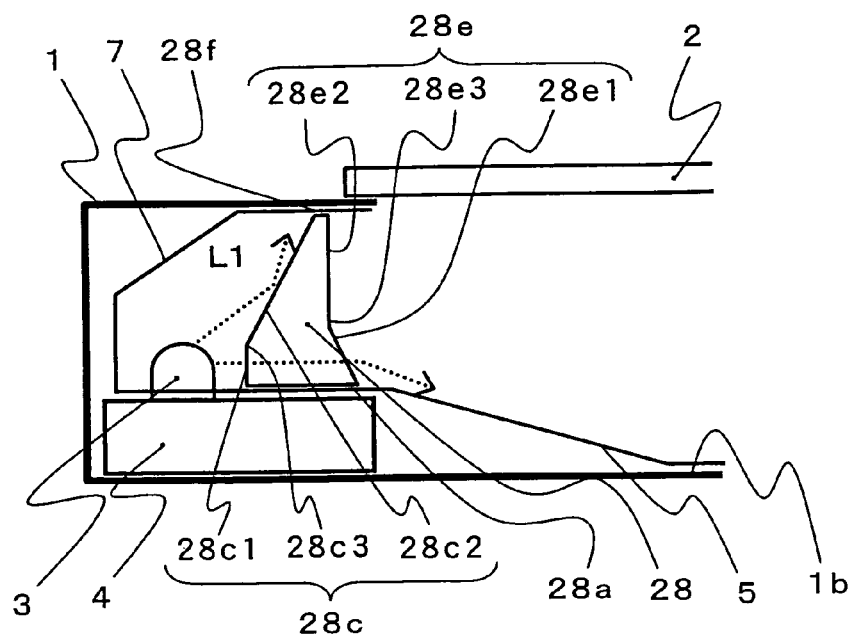
FIG. 50(a) is a magnified view nearby the refractive element related to Embodiment 8 of the present invention.
Figure 50B:
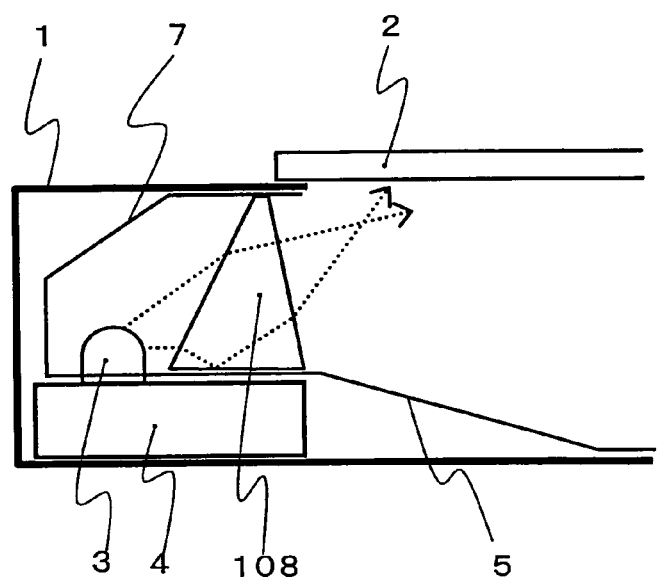
FIG. 50(b) is a magnified view nearby the refractive element of FIG. 17(a)

FIG. 49 is a section view of a planar light source device related to Embodiment 8 of the present invention and FIGS. 50(a) and 50(b) are partial section views for illustrating the action effect of the refractive element. FIG. 50(a) is a magnified view nearby the refractive element related to Embodiment 8 of the present invention, and FIG. 50(b) is a magnified view nearby the refractive element of FIG. 17(a). In FIGS. 49 to 50(b), the same numerals as FIGS. 1 to 48 show the same portions or equivalent portions which are shown in FIGS. 1 to 48, and their illustration is abbreviated. Only the shape of the refractive element 28 in Embodiment 8 which is described later is different from Embodiment 1, and it exhibits the similar action effect as Embodiment 1 other than the action effect according to the refractive element 28.

The refractive element 28 in the Embodiment 8 is provided along the arrangement direction of the plurality of point light sources 3 between the point light sources 3 and the hollow space 6, and the irradiated plane 28c which faces the point light sources 3 has a shape in which an oblique angle is reduced to the hollow space side against the bottom face of the refractive element from the bottom face 1b of the housing 1 to the top face 1a. The radiating plane 28e which faces the hollow space 6 has a shape in which an oblique angle is enlarged to the point light sources side against the bottom face of the refractive element from the bottom face 1b of the housing 1 to the top face 1a, and refracts and radiates the light which is irradiated on the refractive element 28, to the bottom face 1b side of the housing 1. Furthermore, it is preferably a shape that refracts light with an incident angle at which luminance is the maximum among the irradiating light for the irradiated plane 28c from the opening portion 1d side to the bottom face 1b side of the housing 1 to radiate.

The refractive element 28 comprises the irradiated plane 28c of the point light sources 3 side which comprises the first planes 28c1 nearly vertical to the bottom face 1b of the housing 1 and the second planes 28c2 which are linked with the first planes 28c1 and slanted to the hollow space 6 side, the first planes 28e1 in which the radiating plane 28e at the hollow space 6 side is slanted to the point light sources 3 side, and the second planes 28e2 which are linked with the first planes 28e1 and nearly vertical to the bottom face 1b of the housing 1. Further, it has the bottom faces 28a which is nearly parallel to the bottom face 1b of the housing 1 and the facing faces 28f which face in parallel to the bottom faces 28a. The refractive element 28 is prepared by transparent resin such as acryl or glass. Further, in Embodiment 8, since the irradiated plane 28c and the radiating plane 28e are respectively formed only by two planes, processing is easy.

As shown in FIG. 50(a) in Embodiment 8, since the first planes 28c1 nearly vertical to the bottom face 1b are provided at the irradiated plane 28c, light which reaches the refractive element 108 can be suppressed as shown in FIG. 50(b). Accordingly, the light which is reflected on the bottom face 28a and radiated from the scattering plate 2 nearby the light source 3 is reduced, and the unevenness of luminance of the radiating light from the scattering plate 2 can be improved. Further, since the second planes 28c2 which are linked with the first planes 28c1 and slanted to the hollow space 6 side are provided as the irradiated plane 28c, light L1 which is surface-reflected among light reaching the second planes 28c2, returned to the reflector 7 side and is utilized again is increased. Consequently, the radiating light from the scattering plate 2 nearby the light source 3 is reduced, and the unevenness of luminance of the radiating light from the scattering plate 2 can be improved.

Further, since the first planes 28e1 which are slanted to the point light sources 3 side are provided at the radiating plane 28e, light which is irradiated from the first planes 28c1 composing the irradiated plane 28c can be refracted to the bottom face 1b side, the light which is radiated from the scattering plate 2 nearby the light source 3 is reduced, and the unevenness of luminance of the radiating light from the scattering plate 2 can be improved. Since the second planes 28e2 which are nearly vertical to the bottom face 1b are provided at the radiating plane 28e, the refractive element 28 can be thinly composed. Further, light which is irradiated from the first planes 28c1 composing the irradiated plane 28c reaches the first planes 28e1 composing the radiating plane 28e and is refracted, it is preferable that the boundary line 28c3 between the first planes 28c1 and the second planes 28c2 of the irradiated plane 28c is situated at the bottom face 1b side in comparison with the boundary line 28e3 between the first planes 28e1 and the second planes 28e2 of the radiating plane 28e.

Further, in Embodiment 8, the irradiated plane 28c and the radiating plane 28e of the refractive element 28 are respectively composed of the combination of 2 planes, but it is not limited to the shape so far as the irradiated plane 28c is a shape in which the oblique angle to the point light sources side is reduced against the bottom face of the refractive element from the bottom face 1b to the top face 1a of the housing 1 and the radiating plane 28e are a shape in which the oblique angle to the hollow space side is enlarged against the bottom face of the refractive element from the bottom face 1b to the top face 1a of the housing 1.

Figure 51:
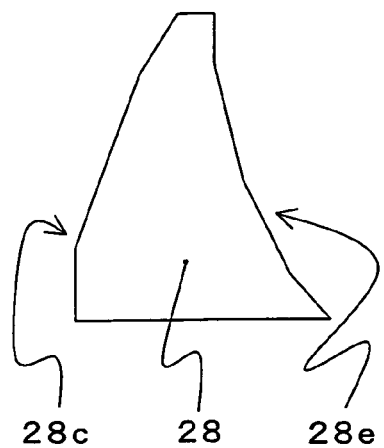
FIG. 51 is a section view of other refractive element related to Embodiment 8.
Figure 52:
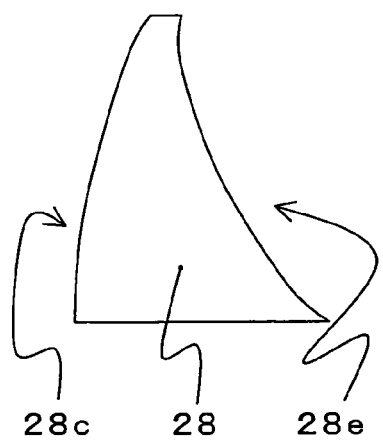
FIG. 52 is a section view of further other refractive element related to Embodiment 8.

For example, as shown in FIG. 51, the irradiated plane 28c and the radiating plane 28e of the refractive element 28 can be formed by polygon. Alternatively, as shown in FIG. 52, the irradiated plane 28c and the radiating plane 28e of the refractive element 28 can be also formed by a curved surface. Thus, the direction of light can be more accurately controlled by forming the irradiated plane 28c and the radiating plane 28e with polygon or a curved surface.

EMBODIMENT 9

Figure 53:
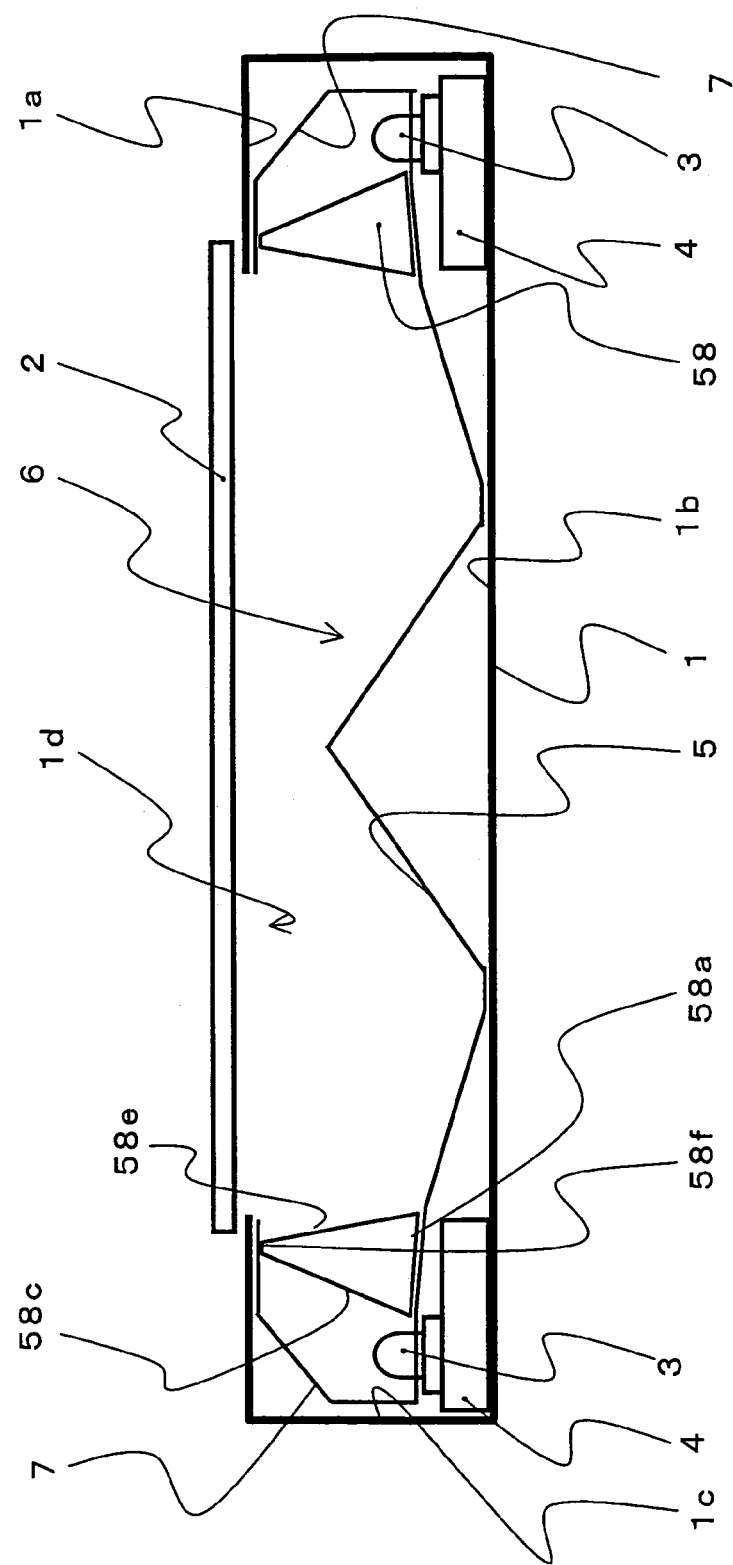
FIG. 53 is a section view of the planar light source device related to Embodiment 9 of the present invention.
Figure 54A:
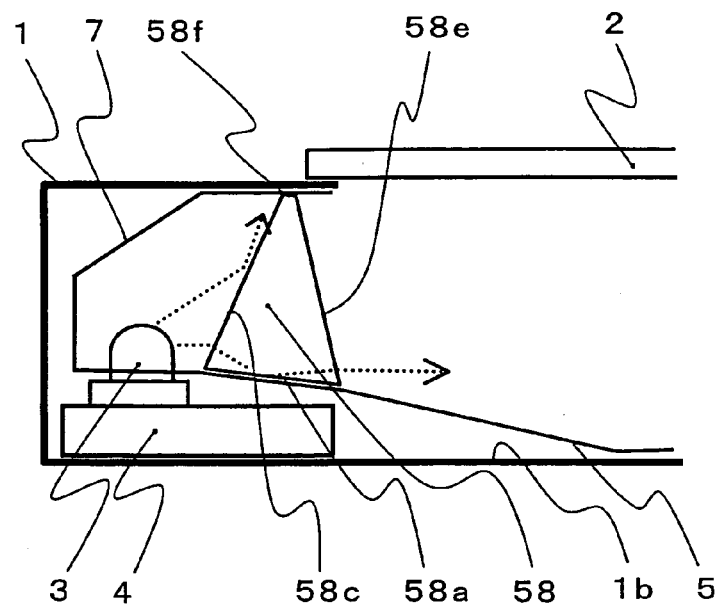
FIG. 54(a) is a magnified view nearby the refractive element related to Embodiment 9 of the present invention.
Figure 54B:
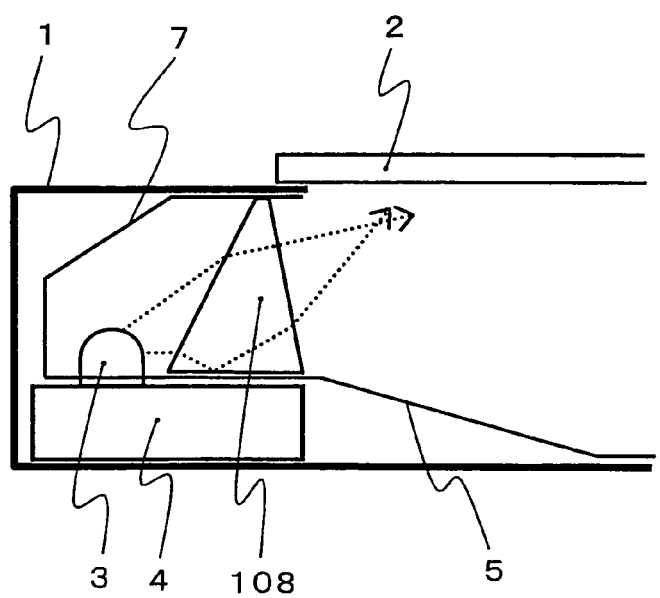
FIG. 54(b) is a magnified view nearby the refractive element of FIG. 17(a)
Figure 55:
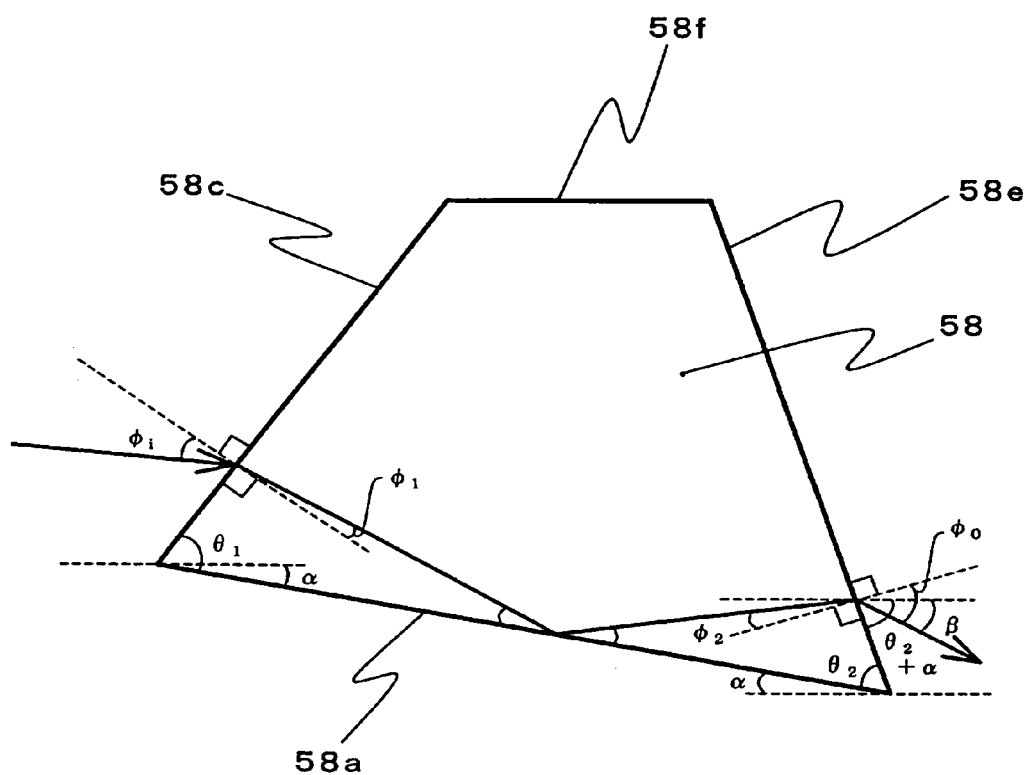
FIG. 55 is a section view of the refractive element related to Embodiment 9.

FIG. 53 is a section view of the planar light source device related to Embodiment 9 of the present invention and FIGS. 54(a) and 54(b) are partial section views for illustrating the action effect of the refractive element. FIG. 54(a) is a magnified view nearby the refractive element related to Embodiment 9 of the present invention, and FIG. 54(b) is a magnified view nearby the refractive element of FIG. 17(a). FIG. 55 is a view for illustrating the shape of the refractive element. In FIGS. 53 to 55, the same numerals as FIGS. 1 to 52 show the same portions or equivalent portions which are shown in FIGS. 1 to 52, and their illustration is abbreviated. Only the shape of the refractive element 58 in Embodiment 9 which is described later is different from Embodiment 1, and it exhibits the similar action effect as Embodiment 1 other than the action effect according to the refractive element 58.

The refractive element 58 in Embodiment 9 is provided along the arrangement direction of the plurality of point light sources 3 between the point light sources 3 and the hollow space 6, and the bottom faces 58a which combine the irradiated plane 58c which faces the point light sources 3 of the refractive element 58 and the radiating plane 58e facing the hollow space 6 have a shape in which it is slanted to a direction approaching to the bottom face 1b of the housing 1 from the irradiated plane 58c to the radiating plane 58e, and light which is irradiated on the refractive element 58 is refracted to the bottom face 1b of the housing 1 to be radiated. Furthermore, it is a shape that refracts light with an incident angle at which luminance is the maximum among the irradiating light for the irradiated plane 58c from the opening portion 1d side to the bottom face 1b side of the housing 1 to radiate.

The refractive element 58 has the irradiated plane 58c which is situated at the point light sources 3 side and is slanted to the hollow space 6 side, the radiating plane 58e which is situated at the hollow space 6 side and is slanted to the point light sources 3 side, the bottom faces 58a which combine the irradiated plane 58c with the radiating plane 58e and are slanted to the bottom face 1b side of the housing 1 from the irradiated plane 58c to the radiating plane 58e, and the facing faces 58f which combine the irradiated plane 58c with the radiating plane 58e and are in nearly parallel to the bottom face 1b of the housing 1. The refractive element 58 is prepared by transparent resin such as acryl or glass.

As shown in FIG. 54(a) in Embodiment 9, since the bottom faces 58a are a shape in which they are slanted to the bottom face 1b of the housing 1, light which is irradiated from the irradiated plane 58c and reached the bottom faces 58a can be reflected to the bottom face 1b side in comparison with light which reached the bottom face of the refractive element 108 of FIG. 17(a) which is shown in FIG. 54(b). Consequently, the radiating light from the scattering plate 2 nearby the light source 3 is reduced, and the unevenness of luminance of the radiating light from the scattering plate 2 can be improved.

It is preferable that the oblique angle of the bottom faces 58a is determined so that light which is reflected on the bottom faces 58a and refracted on the radiating plane 58e is radiated from the opening portion 1d side to the bottom face 1b side of the housing 1.

As illustrated below using FIG. 55, light with the maximum light distribution angle which is radiated from the point light sources 3 is controlled by the refractive element 58 so as to be radiated from the opening portion 1d side to the bottom face 1b side of the housing 1. Hereat, the refractive index of the refractive element 58 is referred to n (n is larger than the refractive index 1 of air), an angle which is formed between the irradiated plane 58c of the refractive element 58 and the bottom faces 58a is referred to as $\theta_1$, an angle which is formed between the radiating plane 58e of the refractive element 58 and the bottom faces 58a is referred to as $\theta_2$, an oblique angle of the bottom faces 58a to the bottom face 1b of the housing 1 is referred to as $\alpha$, and an oblique angle of radiating light from the radiating plane 58e of the refractive element 58 to the bottom face 1b of the housing 1 is referred to as $\beta$.

Light which is irradiated to the irradiated plane 58c of the refractive element 58 at an incident angle $\phi_i$ ($-90° \leq \phi_i \leq 90°$) is refracted by the refractive angle $\phi_t$ of the following formula (11) according to the Snell's Law.

$$\phi_t = \mathrm{Sin}^{-1}((1/n) \times \mathrm{Sin}\, \phi_i) \tag{11}$$

The portion of light passing in the refractive element 58 is totally reflected (incident angle=reflection angle=$\theta_1+\phi_t$) at the bottom faces 58a, irradiated on the radiating plane 58e at an incident angle $\phi_2$ (=$\phi_t+\theta_1-\theta_2$), and is refracted on the radiating plane 58e of the refractive element 58 at a refractive angle $\phi_0$ of the following formula (12) according to the Snell's Law, to be radiated.

$$\begin{aligned}\phi_0 &= \mathrm{Sin}^{-1}(n \times \mathrm{Sin}\phi_2) \\ &= \mathrm{Sin}^{-1}(n \times \mathrm{Sin}(\phi_t + \theta_1 - \theta_2)) \\ &= \mathrm{Sin}^{-1}(n \times \mathrm{Sin}(\mathrm{Sin}^{-1}((1/n) \times \mathrm{Sin}\phi_i) + \theta_1 - \theta_2))\end{aligned} \tag{12}$$

An angle $\beta$ (=$(\alpha+\theta_2)+\phi_0-90°$) for the bottom face 1b of the housing 1 is 0° or more so that radiating light from the radiating plane 58e of the refractive element 58 is radiated to the bottom face 1b side of the housing 1.

Namely, it is required to satisfy the following inequality (13).

$$\begin{aligned}0° \leq \beta &= (\alpha + \theta_2) + \phi_0 - 90° \\ &= \alpha + \theta_2 + \mathrm{Sin}^{-1}(n \times \mathrm{Sin}(\mathrm{Sin}^{-1}((1/n) \times \mathrm{Sin}\phi_i) + \\ &\quad \theta_1 - \theta_2)) - 90°\end{aligned} \tag{13}$$

Hereat, the angle $\beta$ is reduced in accordance with that the incident angle $\phi_i$ is reduced by the inequality (13). Accordingly, when $\alpha$ is set so as to satisfy the inequality (13) in light in which the incident angle $\phi_i$ among radiating light from the point light sources 3 is smallest, namely light with the maximum light distribution angle, it is preferable because all of light reflected at the bottom faces 58a is radiated from the opening portion 1d side to the bottom face 1b side of the housing 1. For example, as shown in FIG. 5, when right rotation from an upper side perpendicular to the central axis of the LED elements is referred to as positive and LEDs which have the maximum light distribution angle of radiating light from LED of 90° are used as the point light sources 3, an incident angle $\phi_i$ at which light with the maximum light distribution angle is irradiated to the irradiated plane 58c of the refractive element 58 is $\phi_i=90°-(\theta_1-\alpha)$. From the inequality (13), all of light reflected at the bottom faces 58a is radiated from the opening portion 1d side to the bottom face 1b side of the housing 1 by the inequality (14); therefore the radiating light from the scattering plate 2 nearby the light source 3 is reduced, and the unevenness of luminance of the radiating light from the scattering plate 2 can be improved.

$$0° \leq \beta = (\alpha + \theta_2) + \sin^{-1}(n \times \sin(\sin^{-1}((1/n) \times \sin(90° - (\theta_1 - \alpha))) + \theta_1 - \theta_2)) - 90° \quad (14)$$

EMBODIMENT 10

Figure 56:
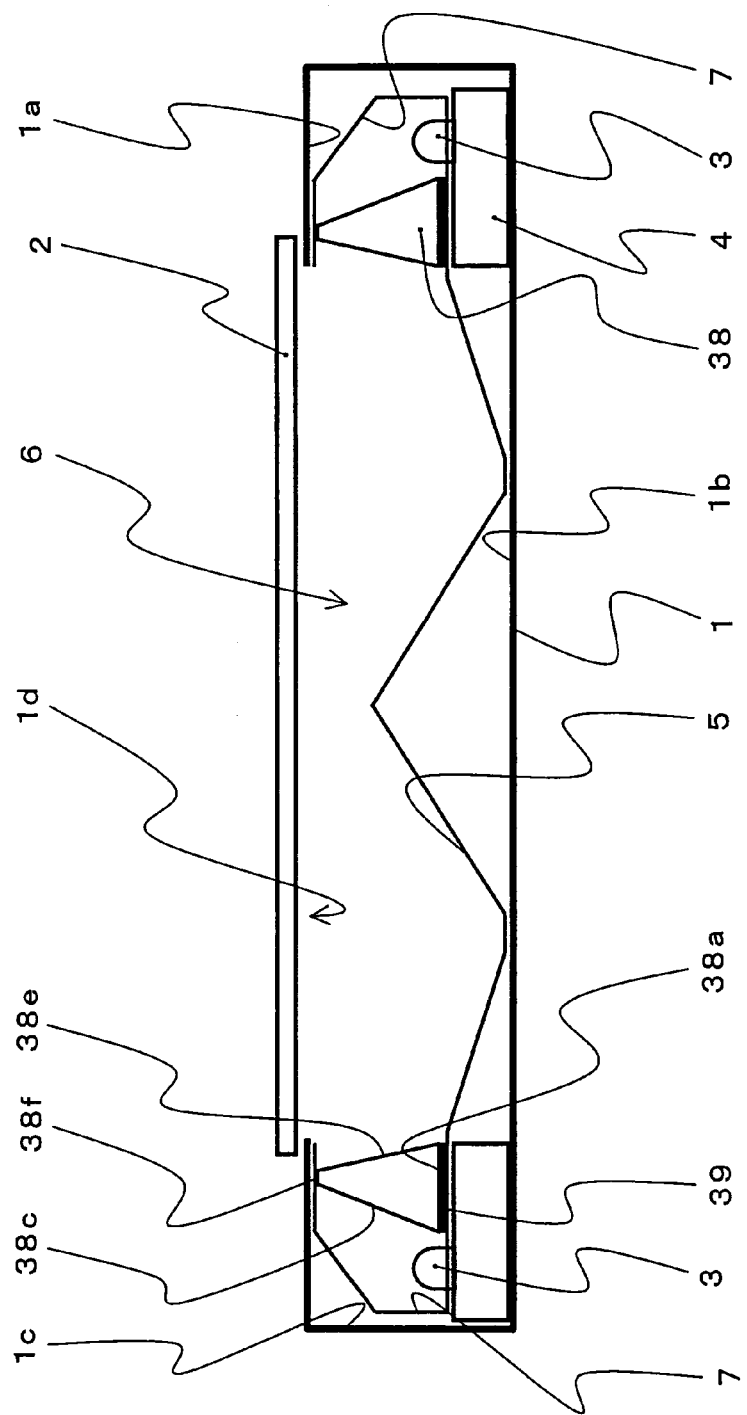
FIG. 56 is a section view of a planar light source device related to Embodiment 10 of the present invention.
Figure 57A:
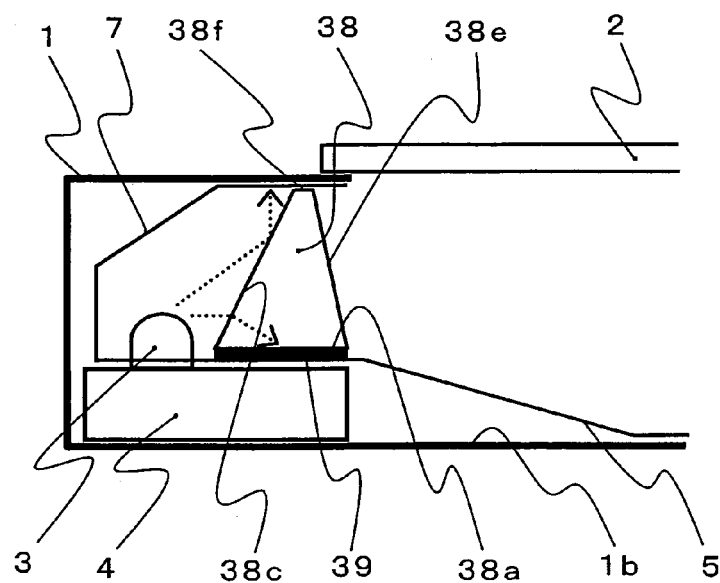
FIG. 57(a) is a magnified view nearby the refractive element related to Embodiment 10 of the present invention.
Figure 57B:
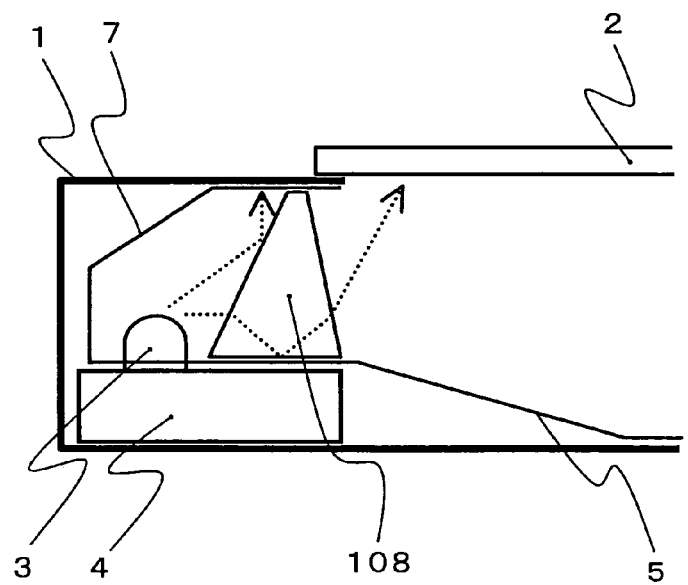
FIG. 57(b) is a magnified view nearby the refractive element of FIG. 17(a)

FIG. 56 is a section view of the planar light source device related to Embodiment 10 of the present invention and FIGS. 57(a) and 57(b) are views for illustrating the action effect of the refractive element. FIG. 57(a) is a magnified view nearby the refractive element related to the Embodiment 10 of the present invention, and FIG. 57(b) is a magnified view nearby the refractive element of FIG. 17(a). In FIGS. 56 to 57(b), the same numerals as FIGS. 1 to 55 show the same portions or equivalent portions which are shown in FIGS. 1 to 55, and their illustration is abbreviated. Embodiment 10 is only different from Embodiment 1 in a point that a light absorbing member is provided in the shape of the refractive element 38 which is described later and the bottom faces 38a of the refractive element 38, and it exhibits the similar action effect as Embodiment 1 other than the action effect according to the refractive element 38.

The refractive element 38 in Embodiment 10 has the bottom faces 38a which are provided along the arrangement direction of the plurality of point light sources 3 between the point light sources 3 and the hollow space 6 and nearly parallel to the bottom face 1b of the housing 1, the facing planes 38f which face in parallel to the bottom faces 38a, the irradiated plane 38c which is brought in contact with the bottom faces 38a and the facing planes 38f and are slanted to the hollow space 6 side, and the radiating plane 38e which is brought in contact with the bottom faces 38a and the facing planes 38f and is slanted to the point light sources 3 side. Further, a black sheet is pasted on the bottom faces 38a as the light absorbing member 39. Further, the refractive element 38 is prepared by transparent resin such as acryl or glass.

The refractive element 38 refracts and radiates light which is irradiated from the point light sources 3 directly or through the reflector 7, to the bottom face 1b of the housing 1. Further, it is preferable that the slant of the irradiated plane 38c and the radiating plane 38e is adjusted so that light with an incident angle at which luminance is the maximum among irradiating light for the irradiated plane 38c is refracted and radiated from the opening portion 1d side to the bottom face 1b side of the housing 1.

In Embodiment 10, as shown in FIG. 57(a), since the light absorbing member 39 is pasted on the bottom faces 38a of the refractive element 38, light which reached the bottom faces 38a of the refractive element 38 can be absorbed and reached the bottom face of the refractive element 108 as shown in FIG. 57(b) and is reflected; therefore the radiating light from the scattering plate 2 nearby the light source 3 is suppressed, and the unevenness of luminance of the radiating light from the scattering plate 2 can be improved.

In Embodiment 10, a black sheet is used for the light absorbing member 39, but in the present invention, it is not limited to this arrangement, so far as it has a function of absorbing at least the portion of light. For example, a gray sheet can be used. Further, a gray color and a black color may be coated on the bottom face of the refractive element 38.

In Embodiment 10, the radiating light from the scattering plate 2 nearby the light source 3 is suppressed and the unevenness of luminance of the radiating light from the scattering plate 2 is improved using the light absorbing member 39 on the bottom faces 38a of the refractive element 38, but the shape of the refractive element is not limited to this arrangement in the present invention, and the unevenness of luminance of the radiating light from the scattering plate 2 can be further improved by the effects shown Embodiments 1 to 9 and the effect of Embodiment 10, by using the light absorbing member on the bottom faces of the refractive element having the shapes which are shown in, for example, Embodiments 1 to 9.

EMBODIMENT 11

Figure 59:
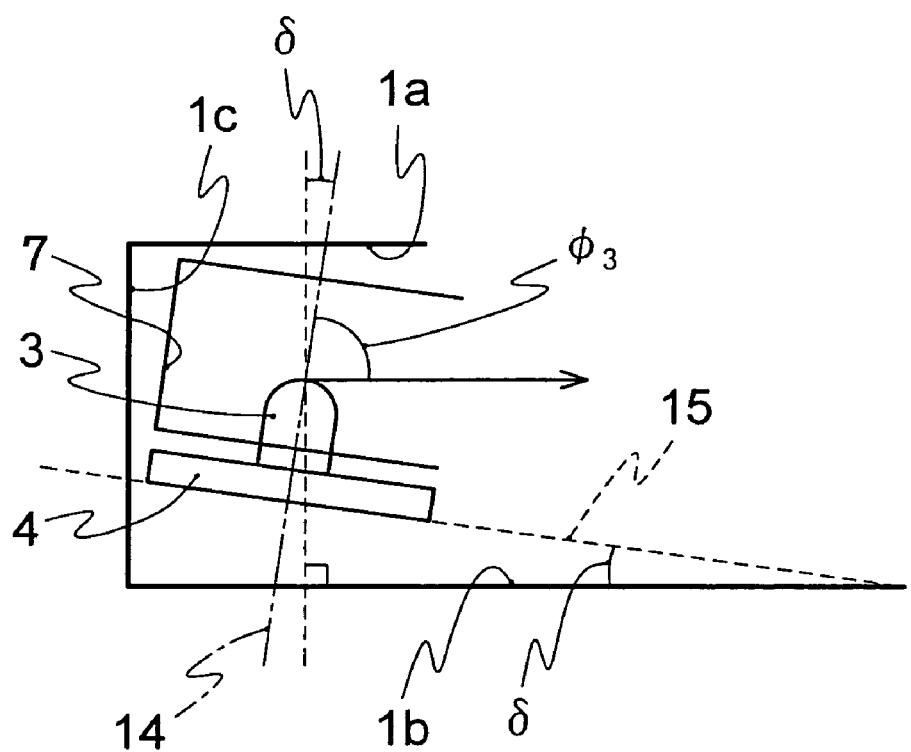
FIG. 59 is an illustration view for illustrating the positional relation between the substrate of point light sources and the bottom face of the housing related to Embodiment 11.

FIG. 58 is a partial section view of a planar light source device related to Embodiment 11 of the present invention. FIG. 59 is an illustration view for illustrating the positional relation between the substrate 4 of point light sources and the bottom face of the housing. In FIGS. 58 and 59, the same numerals as FIGS. 1 to 57(b) show the same portions or equivalent portions, and their illustration is abbreviated. The substrate 4 of the point light sources is provided in the housing 1 so that the planes 15 which are perpendicular to the central axis 14 of the point light sources 3 and the bottom face 1b of the housing 1 form an angle δ.

Embodiment 11 is different from Embodiments 1 to 4 only in a point that the refractive element is not provided in the planar light source device and the substrate 4 of the point light sources is slanted against the bottom face 1b of the housing 1 or the scattering plate 2 so that the planes 15 which are perpendicular to the central axis 14 of the point light sources 3 and the bottom face 1b of the housing 1 form an angle δ. It exhibits the similar action effect as Embodiments 1 to 4 other than the action effect according to the substrate 4 of the point light sources which is described later.

Radiating light to all directions from the point light sources 3 exists, but the radiating light with an angle $\phi_3$ ($-90° \leq \phi_3 \leq 90°$) at which luminance is the maximum among light distribution of the radiating light from the point light sources 3 for the central axis 14 of the point light sources 3 is radiated to the bottom face 1b of the housing 1; therefore the radiating light from the scattering plate 2 nearby the light source is reduced, and the unevenness of bright portion nearby the light source can be improved. In particular, most of lights is radiated from the scattering plate 2 through the reflecting plate 5 and further, the radiating light from the scattering plate 2 nearby the light source can be reduced by directing the light in which luminance is the maximum among light distribution of the radiating lights from the point light sources 3, to the bottom face 1b of the housing 1, namely, by slanting the substrate 4 of the point light sources so that the light in which luminance is the maximum is horizontal or less. Further, since the propagation distance of light in the hollow space 6 is increased, the color mixing and mixing of lights are accelerated, and it is preferable because the unevenness of luminance and the unevenness of chromaticity can be reduced.

As shown in FIG. 59, there is illustrated below a case that the radiating light with an angle $\phi_3$ at which luminance is the maximum among light distribution of the radiating light from the point light sources 3 relative to the central axis 14 of the point light sources 3 is horizontal against the bottom face 1b of the housing 1.

The following formula (15) is required to be satisfied so that light radiated from the point light sources 3 at a radiating angle $\phi_3$ is horizontal against the bottom face 1b of the housing 1.

$$\delta+\phi_3=90° \quad (15)$$

The following inequality (16) is required to be satisfied so that the light radiated from the point light sources 3 at a radiating angle $\phi_3$ is radiated for the bottom face 1b of the housing 1.

$$\delta+\phi_3 \geq 90° \quad (16)$$

Hereat, LEDs being the point light sources 3 control the directivity of the radiating light by sealing LED elements with a lens shaped resin. For example, as shown in FIG. 5, when right rotation from an upper side perpendicular to the central axis of arrangement direction of the LED elements is referred to as positive and LEDs which have the light distribution in which luminance is the maximum when the angle of the radiating light from LEDs is at ±80° are used as the point light sources 3, the angle $\phi_3$ is 80°, and an angle $\delta$ which is formed between the planes 15 which are perpendicular to the central axis 14 of the point light sources 3 and the bottom face 1b of the housing 1 can reduce the bright portion nearby the light source and improve the distribution of luminance by satisfying $\delta \geq 10°$ by the inequality (16).

As shown in FIG. 58, a horizontal distance until the center $O_i$ of the opening portion id of the housing 1 is set as $L_1$ based on a position $S_1$ at which the radiating light in which luminance is the maximum among light distribution of the radiating light from the point light sources 3 relative to the central axis 14 of the point light sources 3 is radiated, and a vertical distance from the center $O_1$ of the opening portion 1d of the housing 1 to the reflecting plate 5 which is arranged at the bottom face 1b side of the housing 1 is set as $d_1$. Hereat, the radiating light which is radiated from the position $S_1$ can be firstly reflected on the reflecting plate 5 at the center of the bottom face 1b of the housing 1 by satisfying the following formula (17), and it is preferable because the luminance at the center of a display surface can be heightened in comparison with the surrounding of the point light sources.

$$\text{Tan}^{-1}(d_1/L_1)=\delta+\phi_3-90° \quad (17)$$

It is preferable because light from the light source can be efficiently radiated to the bottom face 1b side of the housing 1 by making the reflector 7 having a shape by which with respect to light which reaches directly from the point light sources 3 to the hollow space 6, an incident angle at which luminance is the maximum among light distribution of the irradiating light for a hypothetical plane being a boundary between the hollow space and a zone surrounded by the reflector 7 from the point light sources 3 coincides with an incident angle at which luminance is the maximum among light distribution of the irradiating light for a hypothetical plane being a boundary between the hollow space and a zone surrounded by the reflector 7, with respect to light which is reflected on the reflector 7 from the point light sources 3 and reaches to the hollow space 6.

In Embodiment 11, the radiating light in which luminance is the maximum among light distribution of the radiating light from the point light sources 3 for the central axis 14 of the point light sources 3 can be radiated to the bottom face 1b side of the housing 1 by satisfying the inequality (16); therefore luminance nearby the point light sources is not heightened in comparison with luminance at a position far from the point light sources and the unevenness of luminance at the display surface can be improved.

Further, since the refractive element which intervened between the point light sources 3 and the hollow space 6 is not provided, the reflection loss of light at the irradiated plane, side planes and radiating plane of the refractive element is not generated and the planar light source device with high utilization efficiency can be obtained.

Further, since the planar light source device is not required to provide the refractive element, the reduction of the number of members and the reduction of member cost can be carried out.

EMBODIMENT 12

Figure 60:
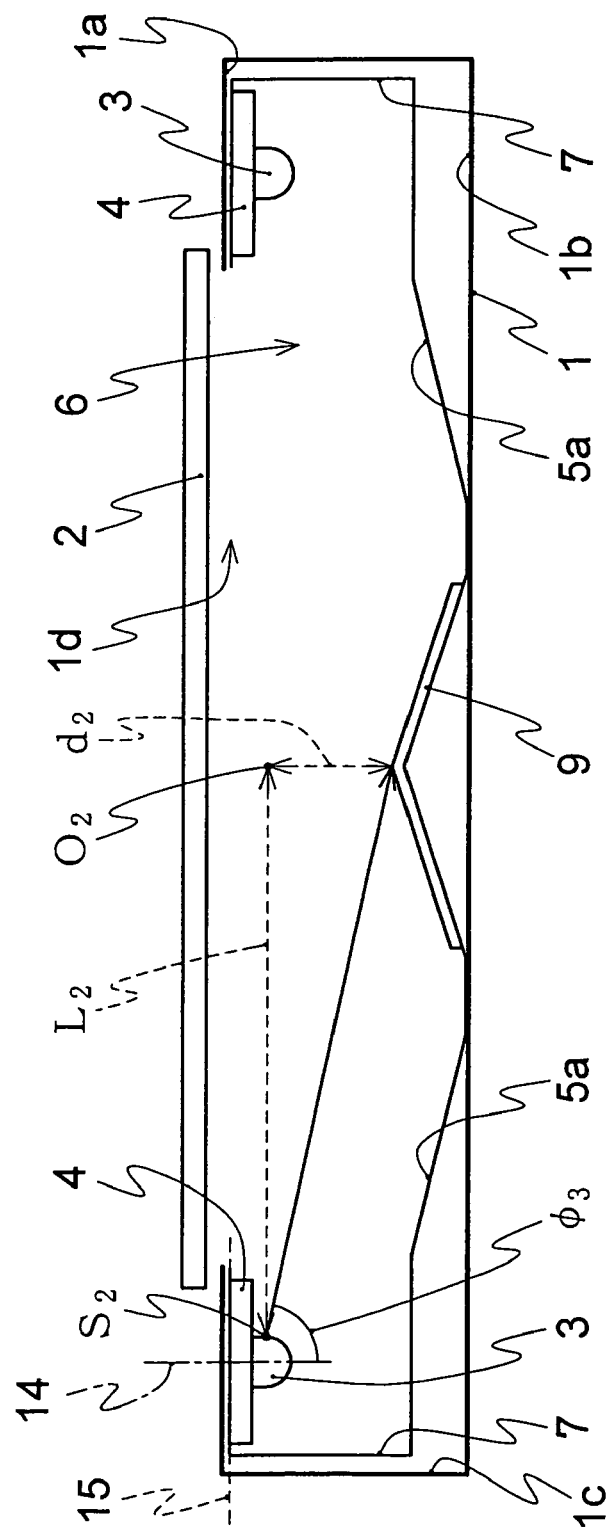
FIG. 60 is a partial section view of a planar light source device related to Embodiment 12 of the present invention.

FIG. 60 is a partial section view of the planar light source device related to Embodiment 12 of the present invention. In FIG. 60, the same numerals as FIGS. 1 to 59 show the same portions or equivalent portions, and their illustration is abbreviated. The substrate 4 of the point light sources is provided in the housing 1 so that the planes 15 which are perpendicular to the central axis 14 of the point light sources 3 and the bottom face 1b of the housing 1 form an angle $\delta$ of 180°, namely, so that the point light sources 3 are situated at the top face 1a side of the housing 1.

Further, Embodiment 12 is different from Embodiment 11 only in a point that the substrate 4 of the point light sources is provided in the housing 1 so that the point light sources 3 are situated at the top face 1a side of the housing 1. It exhibits the similar action effect as Embodiment 11 other than the action effect according to the substrate 4 of the point light sources which is described later.

In Embodiment 12, since the point light sources 3 are situated at the top face 1a side of the housing 1, nearly all of radiating lights from the point light sources 3 can be radiated to the bottom face 1b side of the housing 1; therefore luminance nearby the point light sources is not heightened in comparison with luminance at a position far from the point light sources and the unevenness of luminance at the display surface can be suppressed.

Further, as shown in FIG. 60, the radiating angle of the radiating light in which luminance is the maximum among light distribution of the radiating light from the point light sources 3 for the central axis 14 of the point light sources 3 is set as $\phi_3$ ($-90°<\phi_3<0°$), a horizontal distance until the center $O_2$ of the opening portion 1d of the housing 1 is set as $L_2$ based on a position $S_2$ at which the radiating light in which luminance is the maximum among light distribution of the radiating light from the point light sources 3 for the central axis 14 of the point light sources 3 is radiated, and a vertical distance from the center $O_2$ of the opening portion 1d of the housing 1 to the reflecting plate 5 which is arranged at the bottom face 1b side of the housing 1 is set as $d_2$. Hereat, the radiating light which is radiated from the position $S_2$ can be firstly reflected on the reflecting plate 5 at the center of the bottom face 1b of the housing 1 by satisfying the following formula (18), and it is preferable because the luminance at the center of a display surface can be heightened in comparison with the surrounding of the point light sources.

$$\text{Tan}^{-1}(d_2/L_2)=90°+\phi_3 \quad (18)$$

As illustrated above, effects by respective members are obtained by individually using the refractive element with various shapes, the reflector, the scattering reflection portion, the reflection plate having the first slant portions or the second slant portions, or the scattering plate having a light shielding pattern, but further effects can be expected by combining a plurality of kind of members.

INDUSTRIAL APPLICABILITY

As illustrated above, the present invention has the refractive element which exists extendedly to the arrangement direction of a plurality of point light sources between the point light sources and the hollow space, and the refractive element can radiate a greater part of lights among radiating lights from the refractive element to the bottom face side of the housing by refracting light with an incident angle at which luminance is the maximum among light distribution of the irradiating light against the irradiated plane of the refractive element, to the bottom face side of the housing. Consequently, luminance nearby the point light sources is not heightened in comparison with luminance at a position far from the point light sources and the unevenness of luminance at the display surface can be improved.

The invention claimed is:

1. A planar light source device comprising:
   a housing having an opening portion on a top face and having a hollow space;
   a scattering plate provided at the opening portion;
   a reflecting plate provided at the bottom portion of the hollow space of the housing;
   a plurality of point light sources arranged in series along at least one side of the housing; and
   a refractive element, arranged in parallel with the plurality of point light sources and between the plurality of point light sources and the hollow space, that refracts irradiating light from the plurality of point light sources.

2. The planar light source device according to claim 1, further comprising:
   a reflector surrounding the plurality of point light sources excluding the side to the hollow space; and
   a second reflector provided at a gap between the top face of the reflector and the top face of the housing; wherein:
   an edge of the reflector exists extendedly inside of an effective display zone to the hollow space.

3. The planar light source device according to claim 1, wherein an irradiated plane of the refractive element is slanted to the hollow space from the bottom face of the housing to the top face of the housing.

4. The planar light source device according to claim 1, wherein:
   a refractive index of the refractive element is referred to as n (n>1);
   a slant angle of irradiated planes of the refractive element is referred to as $\theta_1$ ($0<\theta_1\leq90°$);
   a slant angle of radiating planes of the refractive element is referred to as $\theta_2$ ($0<\theta_2\leq90°$);
   an incident angle at which luminance is the maximum among light distribution of irradiating light for the irradiated plane of the refractive element is referred to as $\Phi_i$ ($-90°<\Phi_i<90°$); and
   $\mathrm{Sin}^{-1}(n\times\mathrm{Sin}(180°-\theta_1-\theta_2-\mathrm{Sin}^{-1}((1/n)\times\mathrm{Sin}\Phi_1)))-(90°-\theta_2)\geq0°$ is satisfied.

5. The planar light source device according to claim 1, wherein the refractive element has
   a bottom face;
   an irradiated plane, passing first cristas of the bottom face to the side of point light sources, which is slanted from the first cristas in a prescribed angle against the bottom face at the other side with the bottom face of the housing;
   a plurality of nearly parallel planes to the bottom face; and
   a plurality of radiating planes,
   each of the plurality of radiating planes, passing corresponding cristas of corresponding one among the plurality of nearly parallel plane, which are slanted from the cristas in a prescribed angle against the corresponding one among the plurality of nearly parallel planes.

6. The planar light source device according to claim 1, wherein the refractive element has a means for giving to irradiated light extension in direction of length hand of the refractive element.

7. The planar light source device according to claim 1, wherein the refractive element has a light scattering means at the bottom face.

8. The planar light source device according to claim 1, wherein the refractive element has at least one side plane, combining an irradiated plane with a radiating plane, which reflects totally irradiating light from point light sources.

9. The planar light source device according to claim 1, wherein the reflecting plate has a first slant portion in which a gap between the scattering plate and the reflecting plate is increased from the plurality of point light sources to a facing side planes at the hollow space side.

10. The planar light source device according to claim 1, wherein the reflecting plate has a second slant portion in which a gap between the scattering plate and the reflecting plate is decreased from the plurality of point light sources to a facing side planes at the hollow space side.

11. The planar light source device according to claim 1, wherein the refractive element has a bottom face, combining an irradiated plane facing the plurality of point light sources with a radiating plane facing the hollow space, which inclines like approaching the bottom face of the housing while going away from the irradiated plane.

12. A display device comprising:
   the planar light source device as recited in claim 1,
   a display arranged on the planar light source device.

* * * * *